United States Patent
Tasaka et al.

(10) Patent No.: US 9,534,727 B2
(45) Date of Patent: Jan. 3, 2017

(54) CHOLESTERIC LIQUID CRYSTAL MIXTURE, FILM, IR REFLECTION PLATE, LAMINATE, AND LAMINATED GLASS

(71) Applicant: FUJIFILM Corporation, Tokyo (JP)

(72) Inventors: Tomoki Tasaka, Ashigarakami-gun (JP); Masaomi Kimura, Ashigarakami-gun (JP); Masao Nakajima, Ashigarakami-gun (JP); Taro Hashizume, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 140 days.

(21) Appl. No.: 14/497,767

(22) Filed: Sep. 26, 2014

(65) Prior Publication Data
US 2015/0010761 A1 Jan. 8, 2015

Related U.S. Application Data

(63) Continuation of application No. PCT/JP2013/059096, filed on Mar. 27, 2013.

(30) Foreign Application Priority Data

Mar. 28, 2012 (JP) ................................. 2012-073023

(51) Int. Cl.
*G02B 5/26* (2006.01)
*C09K 19/56* (2006.01)
(Continued)

(52) U.S. Cl.
CPC .............. *F16L 59/028* (2013.01); *B32B 17/10* (2013.01); *C09K 19/3475* (2013.01);
(Continued)

(58) Field of Classification Search
CPC .................. C09K 19/56; C09K 19/586; C09K 2019/0448; C09K 2019/0429; C09K 2019/2078; C09K 2219/03; G02B 5/208; G02B 5/26
See application file for complete search history.

(56) References Cited

U.S. PATENT DOCUMENTS 6,733,689 B1 5/2004 Meyer et al.
6,800,337 B1 10/2004 Siemensmeyer et al.
(Continued)

FOREIGN PATENT DOCUMENTS

JP 2002-536529 A 10/2002
JP 2003-207642 A 7/2003
(Continued)

OTHER PUBLICATIONS

English translation by machine for JP 2008-19434 by J-PlatPat.*
(Continued)

*Primary Examiner* — Shean C Wu
(74) *Attorney, Agent, or Firm* — Birch, Stewart, Kolasch & Birch, LLP

(57) ABSTRACT

A cholesteric liquid crystal mixture containing a compound represented by $Z^1$—$Y^1$-$A^1$-$Y^3$-$M^1$-$Y^4$-$A^2$-$Y^2$—$Z^2$, a compound represented by $Z^3$—$Y^5$-$A^3$-$Y^7$-$M^2$-P, and a tri- or higher functional polymerizable monomer suppresses deposition of a liquid crystal at the time of forming a film, exhibits a wide characteristic reflection bandwidth of the film. $Z^1$ to $Z^3$ represent a polymerizable group; $A^1$ to $A^3$ represent an alkylene spacer having a chain of 1 to 30 atoms; $M^1$ and $M^2$ represent $(-T^1-Y^8)_n$-$T^2$-; n indicates a natural number; $T^1$ and $T^2$ represent a hydrocarbon or heterocyclic ring; $Y^1$ to $Y^5$, $Y^7$ and $Y^8$ represent a single bond, —O—, —CO—, —O—CO—, —CO—O— or —O—CO—O—; and P represents a hydrogen atom or an alkyl group.

14 Claims, 2 Drawing Sheets

(51) Int. Cl.
    *C09K 19/58*     (2006.01)
    *C09K 19/20*     (2006.01)
    *F16L 59/02*     (2006.01)
    *C09K 19/34*     (2006.01)
    *G02B 1/04*     (2006.01)
    *G02B 1/10*     (2015.01)
    *G02B 5/20*     (2006.01)
    *B32B 17/10*     (2006.01)
    *C09K 19/04*     (2006.01)

(52) U.S. Cl.
    CPC ............ *C09K 19/56* (2013.01); *C09K 19/588* (2013.01); *G02B 1/04* (2013.01); *G02B 1/10* (2013.01); *G02B 5/208* (2013.01); *C09K 2019/0429* (2013.01); *C09K 2019/0448* (2013.01); *C09K 2019/2078* (2013.01); *C09K 2219/03* (2013.01); *G02B 5/26* (2013.01); *Y10T 428/3163* (2015.04); *Y10T 428/31859* (2015.04)

(56) References Cited

U.S. PATENT DOCUMENTS

| | | | |
|---|---|---|---|
| 6,899,824 | B2 | 5/2005 | Meyer et al. |
| 7,068,345 | B2 | 6/2006 | Kashima |
| 7,524,436 | B2 | 4/2009 | Harding et al. |
| 2004/0130670 | A1 | 7/2004 | Kashima |
| 2004/0140451 | A1 | 7/2004 | Meyer et al. |
| 2006/0033861 | A1 | 2/2006 | Kashima |
| 2007/0134444 | A1 | 6/2007 | Harding et al. |
| 2009/0195734 | A1 | 8/2009 | Hayashi et al. |
| 2010/0307670 | A1 | 12/2010 | Silverman et al. |
| 2011/0097562 | A1 | 4/2011 | Brill et al. |

FOREIGN PATENT DOCUMENTS

| | | | | |
|---|---|---|---|---|
| JP | 2007-45963 | A | | 2/2007 |
| JP | 2007-177241 | A | | 7/2007 |
| JP | 2008-19434 | A | | 1/2008 |
| JP | 2010286644 | A | * | 12/2010 |
| JP | 2011-138147 | A | | 7/2011 |

OTHER PUBLICATIONS

English translation by machine for JP 2010-286644 by J-PlatPat.*
Japanese Office Action for corresponding Japanese Application No. 2012-073023, dated Jan. 6, 2015, with a partial English translation.
Chinese Office Action and Search Report, dated May 28, 2015, for Chinese Application No. 201380023019.1, with a partial translation.
International Search Report, issued in PCT/JP2013/059096, dated May 28, 2013.
Written Opinion of the International Searching Authority, issued in PCT/JP2013/059096, dated May 28, 2013.
International Preliminary Report on Patentability dated Oct. 9, 2014, issued in PCT/JP2013/059096 (Forms PCT/IB/326, PCT/IB/373, PCT/ISA/237 and PCT/IB/338).
Extended European Search Report, dated Dec. 4, 2015, for corresponding European Application No. 13768704.2.

* cited by examiner

CHOLESTERIC LIQUID CRYSTAL MIXTURE, FILM, IR REFLECTION PLATE, LAMINATE, AND LAMINATED GLASS

CROSS-REFERENCE TO RELATED APPLICATIONS

This application is a continuation application of International Application No. PCT/JP2013/059096, filed Mar. 27, 2013, which in turn claims the benefit of priority from Japanese Application No. 2012-073023, filed Mar. 28, 2012, the disclosures of which applications are incorporated by reference herein in their entirety.

BACKGROUND OF THE INVENTION

Field of the Invention

The present invention relates to a cholesteric liquid crystal mixture, a film, an IR reflection plate, a laminate, and laminated glass.

Background Art

Laminated glass with a heat-shielding film sandwiched between two glass plates is used for windshields of vehicles and for windowpanes of buildings. The heat-shielding film for use in these applications is required to be flat (not having unevenness) and fixed so that the heat-shielding film is not to be shifted in the laminated glass.

As the heat-shielding film, one that includes a liquid crystal film formed by fixing a cholesteric liquid crystal phase is known. The liquid crystal film of the type may be prepared, for example, by applying a coating liquid that contains a polymerizable cholesteric liquid crystal compound and drying it, followed by polymerization to thereby fix the cholesteric liquid crystal layer. Here, there often occurs a problem of solid deposition that contains the liquid crystal or the liquid crystal compound during coating and drying when a coating type cholesteric liquid crystal heat-shielding film is prepared. Particularly, the deposition that contains a liquid crystal brings about a trouble of optical unevenness of the obtained heat-shielding film, and is therefore desired to be solved.

As a coating liquid containing a polymerizable cholesteric liquid crystal compound, or a liquid crystal mixture in which two kinds of monomers that exhibit liquid crystallinity are blended as a liquid crystal compound, and to which a horizontal alignment agent, a polymerization initiator, a chiral agent, and the like are added (see Patent Literatures 1 and 2) is known. In these references, there is disclosed a liquid crystal mixture that uses liquid crystal compounds in a form of a mixture each satisfying the general formula (Ia) and the general formula (Ib) described therein.

Further, in a case where the heat-shielding film having a liquid crystal film obtained by fixing the cholesteric liquid crystal phase is sandwiched between the laminated glass to be used for windshields of vehicles and glass of buildings, as a method of fixing a heat-shielding film so as not to be shifted in the laminated glass, a method of heating and pressing a heat-shielding film, an interlayer film, and glass at 120° C. for 30 minutes using a sheet such as PVB (polyvinyl butyral) as an interlayer film can be used. However, the example of heating and pressing a heat-shielding film having a liquid crystal film obtained by fixing the cholesteric liquid crystal phase in the related art with such a configuration is unknown.

CITATION LIST

Patent Literatures

Patent Literature 1: JP-T-2002-536529
Patent Literature 2: JP-A-2011-138147
Patent Literature 3: JP-A-2003-207642

SUMMARY OF INVENTION

The present inventors of the present invention investigated the characteristics of the liquid crystal mixtures described in Patent Literatures 1 and 2, and have known that blending these liquid crystal compounds makes it possible to prevent solid deposition that contains the liquid crystal compounds.

However, as a result of investigation of characteristics conducted by the present inventors of the present invention related to the liquid crystal compound satisfying the general formulae (Ia) and (Ib) disclosed in these references, in a case where the heat-shielding film having a liquid crystal film manufactured by using the liquid crystal compound with a configuration described in Patent Literatures 1 and 2 is simply inserted into laminated glass, a serious problem related to heat-shielding performance caused by a characteristic reflection spectrum is considered, but it is understood that the characteristic reflection width of the cholesteric liquid crystal phase is reduced during heating and pressing and the heat-shielding performance is degraded in a case where laminated glass to which the liquid crystal film is sufficiently fixed to glass using a PVB sheet for the interlayer film is manufactured. Accordingly, it is understood that the liquid crystal composition disclosed in Patent Literatures 1 and 2 cannot be used for manufacturing the heat-shielding film in which lamination with an interlayer film such as windshields of vehicles and windowpanes of buildings is required.

In addition, nothing is investigated in Patent Literatures 1 and 2 relating to an application to a heat-shielding film with a cholesteric liquid crystal layer fixed therein.

On the other hand, Patent Literature 3 discloses a phase difference layer laminate having a phase difference layer in which a polymerizable liquid crystal material is cured on a support with cholesteric regularity, and discloses that the phase difference layer laminate is obtained by being subjected to heat treatment at a predetermined temperature, and various optical characteristics are stabilized even with respect to heating at the time of manufacturing optical equipment such as an image display device by the configuration whose retardation reduction rate of the phase difference layer defined by "(Ra–Rb)/Ra" is 5% or less when a retardation value of the phase difference layer after the heat treatment is set to Ra and the retardation value of the phase difference layer after the phase difference layer laminate is heated at a temperature of the heat treatment again for 60 minutes is set to Rb. In Patent Literature 3, it is discussed that heat resistance is caused by promoting thermal polymerization in the heat treatment, but there is almost no discussion on the composition of a liquid crystal mixture, and addition of other polymerizable monomers other than a polymerizable liquid crystal monomer and a polymerizable chiral agent is not discussed. Further, in Patent Literature 3, manufacturing laminated glass whose liquid crystal film is laminated with glass through an interlayer film is not discussed at all.

As described above, practically, there is no discussion on the problem in that a reflection bandwidth of a characteristic reflection peak is changed after heating and pressing with the interlayer film in regard to the heat-shielding film manufactured by using the liquid crystal mixture.

An object of the present invention is to solve the above-described problems and to improve the characteristics that have heretofore been discussed in the related art. That is, the problem to be solved by the present invention is to provide a cholesteric liquid crystal mixture in which deposition of a liquid crystal at the time of forming a film can be suppressed, a characteristic reflection bandwidth of a film to be obtained is wide, and a change of a reflection bandwidth caused when laminated glass is manufactured by laminating a liquid crystal film obtained by fixing a cholesteric liquid crystal phase of a film to be obtained with an interlayer film can be suppressed.

As a result of thorough investigation by the present inventors of the present invention for solving the above-described problems, they found that a cholesteric liquid crystal mixture, which can solve the above-described problems by combining liquid crystal compounds having a specific structure which is further limited than the general formulae (Ia) and (Ib) described in Patent Literatures 1 and 2 to be used and by mixing tri- or higher functional polymerizable monomers, is obtained.

The present invention that provides means for solving the above-described problems is as follows:

[1] A cholesteric liquid crystal mixture, containing a compound represented by the following general formula (Ia), a compound represented by the following general formula (Ib), a tri- or higher functional polymerizable monomer:

   General Formula (Ia)

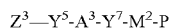   General Formula (Ib)

(in the general formulae (Ia) and (Ib), $Z^1$, $Z^2$ and $Z^3$ each independently represent a polymerizable group; $A^1$, $A^2$ and $A^3$ each independently represent a spacer having an atom-bonding chain length of 1 to 30 (provided that the spacer represents an alkylene group, or a linking group of multiple alkylene groups bonding to each other via —O— or —CO—); $M^1$ and $M^2$ each independently represent $(-T^1-Y^8)_n-T^2-$; n indicates a natural number; when n is 2 or more, multiple $(-T^1-Y^8)$'s may be the same or different; $T^1$ and $T^2$ each independently represent a saturated or unsaturated hydrocarbon ring, or a saturated or unsaturated heterocyclic ring (provided that the hydrocarbon ring and the heterocyclic ring may have a substituent); $Y^1$, $Y^2$, $Y^3$, $Y^4$, $Y^5$, $Y^7$ and $Y^8$ each independently represent a single bond, —O—, —CO—, —O—CO—, —CO—O— or —O—CO—O—; and P represents a hydrogen atom or an alkyl group having 1 to 15 carbon atoms).

[2] In the cholesteric liquid crystal mixture according to [1], it is preferable that the content of the tri- or higher polymerizable monomer be 0.1% by mass to 10% by mass with respect to the total amount of the liquid crystal compound contained in the cholesteric liquid crystal mixture.

[3] It is preferable that the cholesteric liquid crystal mixture according to [1] or [2] further include a polymerization initiator.

[4] In the cholesteric liquid crystal mixture according to any one of [1] to [3], it is preferable that $T^1$ and $T^2$ in the general formulae (Ia) and (Ib) each independently represent a saturated or unsaturated hydrocarbon ring, or a saturated or unsaturated heterocyclic ring (provided that the hydrocarbon ring and the heterocyclic ring may have an alkyl group or an alkoxy group as a substituent).

[5] In the cholesteric liquid crystal mixture according to any one of [1] to [4], it is preferable that the compound represented by the general formula (Ia) be a compound in which at least one hydrocarbon ring or heterocyclic ring of the hydrocarbon ring and the heterocyclic ring represented by $T^1$ and $T^2$ has an alkyl group or an alkoxy group, and the compound represented by the general formula (Ib) be a compound in which the hydrocarbon ring and the heterocyclic ring represented by $T^1$ and $T^2$ each are an unsubstituted hydrocarbon ring or heterocyclic ring.

[6] In the cholesteric liquid crystal mixture according to any one of [1] to [5], it is preferable that, in the compound represented by the general formula (Ia), n that indicates $M^1$ be 2 to 4.

[7] A film including a liquid crystal film obtained by fixing a cholesteric liquid crystal phase formed by polymerizing the cholesteric liquid crystal mixture according to any one of [1] to [6].

[8] It is preferable that the film according to [7] further include two or more liquid crystal films obtained by fixing the cholesteric liquid crystal phase therein.

[9] It is preferable that the film according to [7] or [8] exhibit a selective reflection characteristic in an IR wavelength region.

[10] An IR reflection plate including the film according to any one of [7] to [9].

[11] It is preferable that the IR reflection plate according to [10] include a λ/2 plate.

[12] A laminate which is formed by the use of the IR reflection plate according to [10] or [11] and includes an interlayer film on any one of an outmost layer of a liquid crystal film obtained by fixing the cholesteric liquid crystal phase of the IR reflection plate.

[13] In the laminate according to [12], it is preferable that the interlayer film be a resin interlayer film containing polyvinyl butyral as a main component.

[14] A laminated glass including the laminate according to [12] or [13]; and at least two sheets of glass plates, in which the laminate is inserted into the two sheets of glass.

[15] It is preferable that the laminated glass according to [14] be used for a windshield for vehicles and glass for building materials.

According to the present invention, it is possible to provide a cholesteric liquid crystal mixture in which deposition of a liquid crystal at the time of forming a film can be suppressed, a characteristic reflection bandwidth of a film to be obtained is wide, and a change of a reflection bandwidth caused when laminated glass is manufactured by laminating a liquid crystal film obtained by fixing a cholesteric liquid crystal phase of a film to be obtained with an interlayer film can be suppressed.

DESCRIPTION OF EMBODIMENTS

Figure 1:
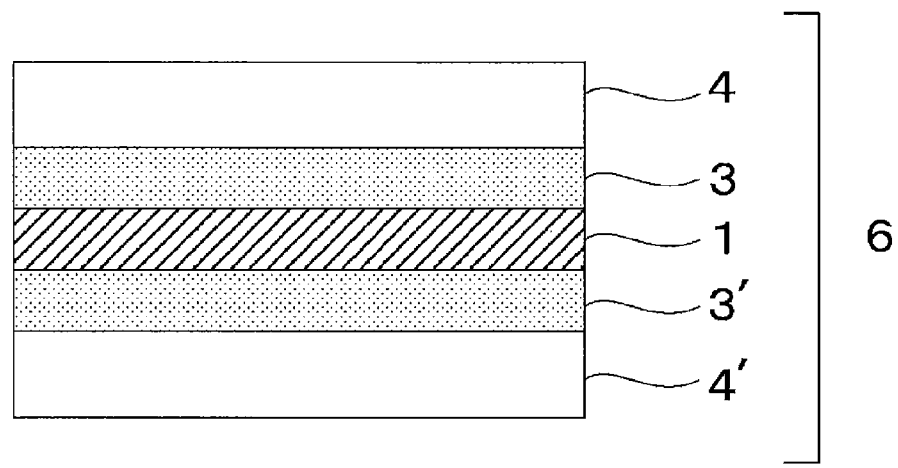
FIG. 1 is a schematic view showing a cross section of one example of the laminated glass of the present invention.

The present invention is described in detail hereinunder.

The description of the constitutive elements of the present invention given hereinunder is for some typical embodiments of the present invention, to which, however, the present invention should not be limited. In this description, the numerical range expressed by the wording "a number to another number" means the range that falls between the former number indicating the lower limit of the range and the latter number indicating the upper limit thereof.

In this description, the solid that contains a liquid crystal compound may include the crystal of the liquid crystal compound, or may be a non-crystalline amorphous one. The solid may contain any other component such as a polymerization initiator, a chiral agent, etc. All or a part of these may be mixed in the solid.

[Cholesteric Liquid Crystal Mixture]

The cholesteric liquid crystal mixture of the present invention contains a compound represented by the following general formula (Ia), a compound represented by the following general formula (Ib), and a tri- or higher function polymerizable monomer.

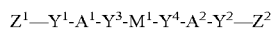    General Formula (Ia)

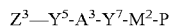    General Formula (Ib)

(In the general formulae (Ia) and (Ib), $Z^1$, $Z^2$ and $Z^3$ each independently represent a polymerizable group; $A^1$, $A^2$ and $A^3$ each independently represent a spacer having an atom-bonding chain length of from 1 to 30 (provided that the spacer represents an alkylene group, or a linking group of multiple alkylene groups bonding to each other via —O— or —CO—); $M^1$ and $M^2$ each independently represent (-$T^1$-$Y^8$)$_n$-$T^2$-; n indicates a natural number; when n is 2 or more, then multiple (-$T^1$-$Y^8$)'s may be the same or different; $T^1$ and $T^2$ each independently represent a saturated or unsaturated hydrocarbon ring, or a saturated or unsaturated heterocyclic ring (provided that the hydrocarbon ring and the heterocyclic ring may have a substituent); $Y^1$, $Y^2$, $Y^3$, $Y^4$, $Y^5$, $Y^7$ and $Y^8$ each independently represent a single bond, —O—, —CO—, —O—CO—, —CO—O— or —O—CO—O—; P represents a hydrogen atom or an alkyl group having from 1 to 15 carbon atoms.)

With such a configuration, in the cholesteric liquid crystal mixture of the present invention, deposition of a liquid crystal at the time of forming a film can be suppressed, a characteristic reflection bandwidth of a film to be obtained is wide, and a change of a reflection bandwidth caused when laminated glass is manufactured by laminating a liquid crystal film obtained by fixing a cholesteric liquid crystal phase of a film to be obtained with an interlayer film can be suppressed.

Hereinafter, each component of the cholesteric liquid crystal mixture of the present invention will be described.

<(1) Tri- or Higher Functional Polymerizable Monomer>

The cholesteric liquid crystal mixture of the present invention contains a tri- or higher functional polymerizable monomer.

The tri- or higher functional polymerizable monomer is not particularly limited within a range not departing from the scope of the present invention.

The tri- or higher functional polymerizable monomer is preferably a compound other than the compound represented by the general formula (Ia) or the compound represented by the general formula (Ib). In addition, since the amount of the tri- or higher functional polymerizable monomer to be added is small, the liquid crystallinity may or may not be exhibited. As the liquid crystal compound, a liquid crystal having a tri- or higher functional polymerizable group, for example, a swallow tail-type liquid crystal compound is preferable.

In addition, the kinds of polymerizable functional groups of the tri- or higher functional polymerizable monomer may each be independently different kinds of polymerizable functional groups from each other. Alternatively, two or more polymerizable functional groups which are the same as each other may be included. Of these, it is preferable that the kinds of polymerizable functional groups included in the tri- or higher functional polymerizable monomer be the same as each other.

The number of the polymerizable functional groups of the tri- or higher functional polymerizable monomer is not particularly limited, but the number thereof is preferably tri- to decafunctional groups, more preferably tri- to hexafunctional groups, and particularly preferably tri- to tetrafunctional groups.

The structure other than the polymerizable functional group of the tri- or higher functional polymerizable monomer is not particularly limited, but a linear or branched structure is preferable (that is, not including a cyclic structure) and a branched structure is more preferable.

The kinds of polymerizable functional group of the tri- or higher functional polymerizable monomer are not particularly limited within the range not departing from the scope of the present invention, but, for example, the following polymerizable functional groups can be exemplified: a (meth)acryloyl group, a vinyl ether group, an epoxide group, an oxetane group, a carboxyl group, a sulfonic acid group, a thiirane group, an aziridine group, an isocyanate group, and an isothiocyanate group.

Among these, the polymerizable functional group of the tri- or higher functional polymerizable monomer is more preferably a (meth)acryloyl group from a viewpoint of excellent reactivity of a film to be obtained, and particularly preferably an acryloyl group.

In addition, in the present specification, "(meth)acrylate" expresses acrylate and methacrylate; "(meth)acryl" expresses acryl and methacryl; and "(meth)acryloyl" expresses acryloyl and methacryloyl. Further, in the present specification, "monomer" in Chinese characters and "monomer" in Katakana have the same definition as each other. The monomer of the present specification is differentiated from oligomer and polymer and is a compound having a weight average molecular weight of 1000 or less.

Specific examples of the tri- or higher functional (meth) acrylate monomer used for the present invention will be described below, but the present invention is not limited to the examples.

Examples include: epichlorohydrin (hereinafter, referred to as "ECH")-modified glycerol tri(meth)acrylate, ethylene oxide (hereinafter, referred to as "EO")-modified glycerol tri(meth)acrylate, propylene oxide (hereinafter, referred to as "PO")-modified glycerol tri(meth)acrylate, pentaerythritol tri(meth)acrylate, EO-modified phosphoric acid tri(meth) acrylate, trimethylolpropane tri(meth)acrylate, caprolactone-modified trimethylolpropane tri(meth)acrylate, EO-modified trimethylolpropane tri(meth)acrylate, PO-modified trimethylolpropane tri(meth)acrylate, dipentaerythritol hexa(meth)acrylate, caprolactone-modified dipentaerythritol hexa(meth)acrylate, dipentaerythritol hydroxypenta(meth)acrylate, alkyl-modified dipentaerythritol penta(meth)acrylate, dipentaerythritol hexa(meth)acrylate, alkyl-modified dipentaerythritol tri(meth)acrylate, ditrimethylolpropane tetra(meth)acrylate, pentaerythritol ethoxytetra(meth)acrylate, and pentaerythritol tetra(meth) acrylate.

Among these, EO-modified trimethylolpropane tri(meth) acrylate, dipentaerythritol hexa(meth)acrylate, and pentaerythritol tetra(meth)acrylate are more preferable, EO-modified trimethylolpropane tri(meth)acrylate, dipentaerythritol hexa(meth)acrylate, and pentaerythritol tetra(meth)acrylate are particularly preferable, and acrylate of these compounds is more particularly preferable.

On the other hand, specific examples of the tri- or higher functional polymerizable monomer used for the present invention other than the tri- or higher functional (meth) acrylate monomer will be described below, but the present invention is not limited to the examples.

The examples include: ECH-modified glycerol triacrylate, EO-modified glycerol triacrylate, EO-modified phosphoric acid triacrylate, HPA (heteropoly acid)-modified trimethylol propane triacrylate, trimethylol propane triacrylate, caprolactone-modified trimethylolpropane triacrylate, PO-modified trimethylolpropane triacrylate, trimethylol propane benzoate acrylate, alkoxy-modified trimethylol propane triacrylate, caprolactone-modified dipentaerythritol hexaacrylate, dipentaerythritol hydroxypentaacrylate, alkyl-modified dipentaerythritol pentaacrylate, dipentaerythritol polyacrylate, ditrimethylolpropane tetraacrylate, pentaerythritol ethoxytetraacrylate, silicone hexaacrylate, and lactone-modified flexible acrylate.

In the cholesteric liquid crystal mixture of the present invention, the content of the tri- or higher functional polymerizable monomer is preferably 0.1% by mass to 10% by mass, more preferably 0.2% by mass to 5% by mass, and particularly preferably 0.5% by mass to 2% by mass with respect to the total amount of the liquid crystal compound contained in the cholesteric liquid crystal mixture. Particularly, it is preferable that the content of the tri- or higher functional polymerizable monomer be lower than or equal to the upper limit with respect to the total amount of the liquid crystal compound contained in the cholesteric liquid crystal mixture from a viewpoint of maintaining the reflection bandwidth without deteriorating the crystallinity of the mixture. Meanwhile, it is preferable that the content of the tri- or higher functional polymerizable monomer be higher than or equal to the lower limit with respect to the total amount of the liquid crystal compound contained in the cholesteric liquid crystal mixture from a viewpoint of sufficiently acquiring effects of suppressing the change of the reflection bandwidth caused when the laminated glass is manufactured by laminating the liquid crystal film obtained by fixing the cholesteric liquid crystal phase of a film to be obtained with the interlayer film.

<(2) Compound Represented by General Formula (Ia) and Compound Represented by General Formula (Ib)>

The cholesteric liquid crystal mixture of the present invention contains a compound represented by the above-described general formula (Ia) and a compound represented by the above-described general formula (Ib). First described are these compounds.

($Z^1$, $Z^2$ and $Z^3$)

In the above general formulae (Ia) and (Ib), $Z^1$, $Z^2$ and $Z^3$ each independently represent a polymerizable group.

In relation to the crosslinking component of $Y^1$ to $Y^8$, the polymerizable group of $Z^1$ to $Z^4$ corresponds to, for example, the following:

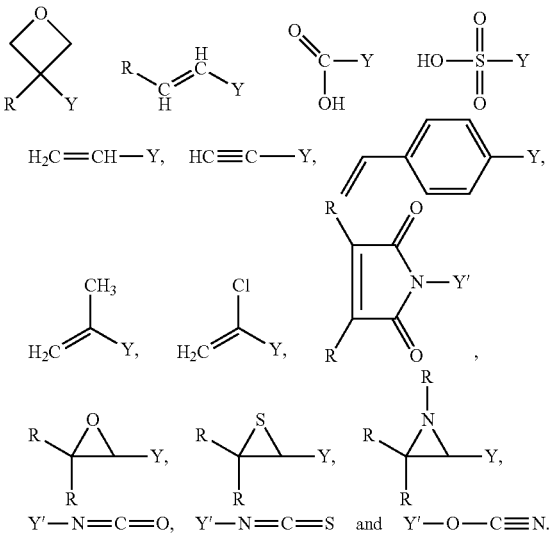

[chem. 1]

[In the formulae, Y represents the definition of the crosslinking groups $Y^1$ to $Y^8$, or that is, a chemical single bond, oxygen, sulfur, —O—CO—, —CO—O—, —O—CO—O—, —CO—NR—, —NR—CO—, —O—CO—NR—, —NR—CO—O— or —NR—CO—NR—; R represents hydrogen or $C_1$-$C_4$-alkyl, or that is, methyl, ethyl, n-propyl, i-propyl, n-butyl, i-butyl, sec-butyl or t-butyl; and Y' represents a chemical single bond (in the following, the polymerizable group of $Z^1$ to $Z^4$ is represented as a polymerizable unit and as Z—Y and/or Z—Y' in relation to the crosslinking component of $Y^1$ to $Y^8$).]

Of those polymerizable units, the cyanate can be spontaneously trimerized into a cyanurate. The maleinimide group is especially suitable for radical copolymerization with the liquid crystal compound of the formula Ia and/or Ib having a styryl group as the polymerizable group therein.

The compound of the formula Ia and/or Ib having any of an epoxide group, an oxetane group, a carboxyl group, a sulfonic acid group, a thiirane group, an aziridine group, an isocyanate group and an isothiocyanate group needs any other compound having a complementary reactive unit for polymerization. Specifically, for example, a suitable isocyanate may polymerize with an alcohol to give a urethane, or may polymerize with an amine to give a urea derivative. The same may apply to the corresponding thiirane and aziridine.

The complementary reactive unit may be contained in the liquid crystal compound that is composed of a liquid crystal compound similar to the formula Ia and/or Ib of the component A) in the liquid crystal substance mixture. However, in place of the group $Z^1$—$Y^1$—, $Z^2$—$Y^2$—, $Z^3$—$Y^5$— and/or $Z^4$—$Y^6$—, these compounds contain a hydroxyl group, a mercapto group or an NHR group, in which the last R means hydrogen or $C_1$-$C_4$-alkyl. Further, the complementary reactive unit may also be contained in the auxiliary compound that is brought in the liquid crystal substance mixture.

Depending on the matter whether or not the component A) may contain a liquid crystal compound of the formula Ib that contains one or two polymerizable units, or in relation to the proportion of these compounds as the case may be, especially above all, in relation to the ratio of the amount of the polymerizable unit-having liquid crystal compound to the amount of the complementary unit-having liquid crystal compound, as well as to the ratio of the amount of the polymerizable unit-having liquid crystal compound to the amount of the complementary unit-having auxiliary compound, polymer products may be obtained that are cross-linked in a different degree and that can therefore satisfy the corresponding requirements.

($A^1$, $A^2$ and $A^3$)

In the above-described general formulae (Ia) and (Ib), $A^1$, $A^2$ and $A^3$ each independently represent a spacer having an atom-bonding chain length of from 1 to 30 (provided that the spacer represents an alkylene group, or a linking group of multiple alkylene groups bonding to each other via —O— or —CO—).

Preferably, $A^1$, $A^2$ and $A^3$ each are independently a spacer having an atom-bonding chain length of from 1 to 12. More preferably, $A^1$, $A^2$ and $A^3$ each are independently a spacer having from 1 to 12 carbon atoms (provided that the spacer is an unsubstituted alkylene group), even more preferably a spacer having from 2 to 8 carbon atoms (provided that the spacer is an unsubstituted alkylene group).

The spacer of $A^1$ and $A^2$ generally has from 1 to 30 carbon atoms but advantageously from 1 to 12 carbon atoms, and is mainly composed of a linear aliphatic group. Further, the carbon chain may be interrupted by one or more methyl, fluorine, chlorine or bromine and/or oxygen in an ether functional group or sulfur in a thioether functional group, or by a non-neighboring imino group or a $C_1$-$C_4$-alkylimino group. Methyl, ethyl, n-propyl, i-propyl, n-butyl, i-butyl, sec-butyl and t-butyl correspond to the $C_1$-$C_4$-alky group for the latter.

Typical spacers include, for example:

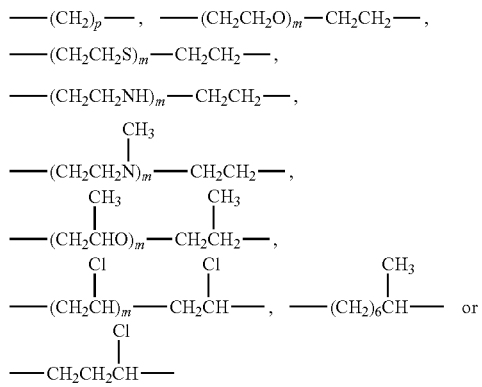

[In the formulae, p indicates an integer of from 1 to 30, advantageously 1, 2, 3, 4, 5, 6, 7, 8, 9, 10, 11 or 12; and m indicates an integer of from 1 to 14, advantageously 1, 2 or 3.]

(P)

In the above general formula (Ib), P represents a hydrogen atom or an alkyl group having from 1 to 15 carbon atoms.

The $C_1$-$C_{15}$-alkyl for P is advantageously a non-branched alkyl group, for example, corresponding to methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl or n-pentadecyl.

Of those, P is preferably an alkyl group having from 1 to 15 carbon atoms. The $C_1$-$C_{15}$-alkyl group may be substituted with one or more and generally up to three substituents of methyl, fluorine, chlorine and bromine. Accordingly, for example, P includes i-propyl ("1-methylethyl"), sec-butyl ("1-methylpropyl"), i-butyl ("2-methylpropyl"), t-butyl ("1,1-dimethylethyl"), 1-methylbutyl, 2-methylbutyl, 3-methylbutyl, 2,2-dimethylpropyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1,1,2-trimethylpropyl, 1,2,2-trimethylpropyl, or n-methyl, n-heptyl, n-octyl, n-nonyl, n-decyl, n-undecyl, n-dodecyl, n-tridecyl, n-tetradecyl or n-pentadecyl group substituted with one, two or three methyl groups, as well as their isomers. External substitution of the methyl group in the exemplified substituents with fluorine, chlorine or bromine gives corresponding halogen-substituted $C_1$-$C_{15}$-alkyl groups.

Of the above compounds represented by the general formula (Ib) in the present invention, preferred are those in which P is an unsubstituted alkyl group having from 1 to 15 carbon atoms, more preferably an unsubstituted alkyl group having from 2 to 8 carbon atoms, even more preferably an unsubstituted alkyl group having from 5 to 8 carbon atoms.

Different from the compounds represented by the general formulae described in JP-T 2002-129162 and JP-A 2011-138147, in the compounds represented by the general formula (Ib) in the present invention, the non-neighboring group $CH_2$— in the $C_1$-$C_{15}$-alkyl group of P is not interrupted by oxygen, sulfur, —CO—, —O—CO—, —CO—O— or —O—CO—O—. When such a compound in which P is $C_1$-$C_{15}$-alkyl with the non-neighboring group $CH_2$— therein is interrupted by oxygen, sulfur, —CO—, —O—CO—, —CO—O— or —O—CO—O— is used in film formation, then the formed film would have a small reflection width. In addition, the compound represented by the general formula (Ib) where P contains a sulfur atom tends to be poor in light fastness.

($M^1$ and $M^2$)

In the general formulae (Ia) and (Ib), $M^1$ and $M^2$ each independently represent $(-T^1-Y^8)_n-T^2-$.

n indicates a natural number; when n is 2 or more, then multiple $(-T^1-Y^8)$'s may be the same or different.

In the cholesteric liquid crystal mixture of the present invention, n in $M^1$ in the above general formula (Ia) is preferably from 1 to 5, more preferably from 2 to 5, even more preferably from 2 to 4, still more preferably 2 or 3, further more preferably 2.

n in $M^2$ in the above general formula (Ib) is preferably from 1 to 5, more preferably from 2 to 4, even more preferably 2 or 3, still more preferably 2.

The group of $T^1$ and $T^2$ may have a substituent within a possible range, and for example, the group may be substituted with the same or different, three or less substituents selected from $C_1$-$C_{20}$-alkyl, $C_1$-$C_{20}$-alkoxy, $C_1$-$C_{20}$-alkoxycarbonyl, $C_1$-$C_{20}$-monoalkylaminocarbonyl, $C_1$-$C_{20}$-alkylcarbonyl, $C_1$-$C_{20}$-alkylaminocarbonyloxy, $C_1$-$C_{20}$-alkylcarbonylamino, formyl, halogen, cyano, hydroxy or nitro. The hydrocarbon ring and the heterocyclic ring preferably have an alkyl group or an alkoxy group as the substituent. Advantageously, however, the substituent of $T^1$ and/or $T^2$ is mono-substituted In particular, the group of $T^1$ and $T^2$ corresponds to the following:

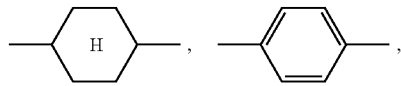

-continued

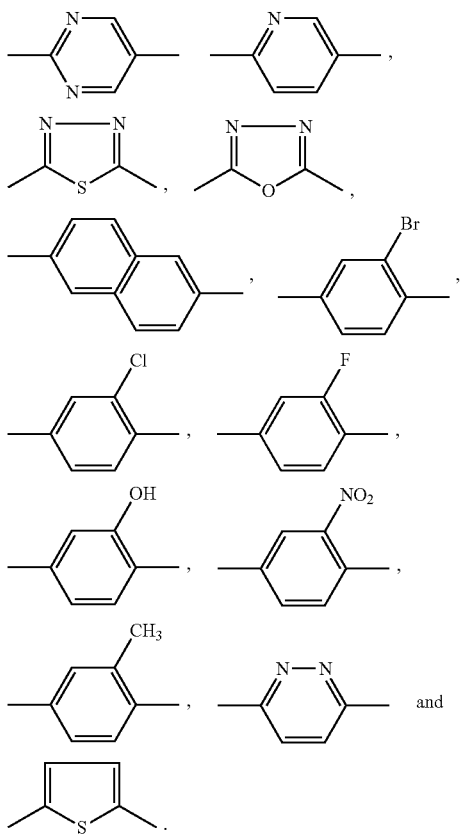

Especially advantageously, the mesogen group of $M^1$ and $M^2$ each independently represent the following formula:

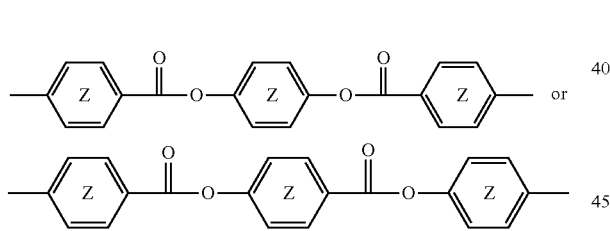

In the above, the ring Z independently may have the same or different, three or less substituents selected from $C_1$-$C_{20}$-alkyl, $C_1$-$C_{20}$-alkoxy, $C_1$-$C_{20}$-alkoxycarbonyl, $C_1$-$C_{20}$-monoalkylaminocarbonyl, $C_1$-$C_{20}$-alkylcarbonyl, $C_1$-$C_{20}$-alkylcarbonyloxy, $C_1$-$C_{20}$-alkylcarbonylamino, formyl, halogen, cyano, hydroxy or nitro.

Advantageous substituents for the aromatic ring Z include fluorine, chlorine, bromine, cyano, formyl, hydroxy, a short-chain aliphatic group (preferably having from 1 to 4 carbon atoms, for example, methyl, ethyl, n-propyl, i-propyl, n-butyl, i-butyl, t-butyl), as well as an alkoxy group, an alkoxycarbonyl group, an alkylcarbonyl group, an alkylcarbonyloxy group, an alkylcarbonylamino group and a monoalkylaminocabonyl group containing such an alkyl group.

An especially advantageous benzene ring Z for $M^1$, and an especially advantageous benzene ring Z for $M^2$ may advantageously have the following substituent pattern:

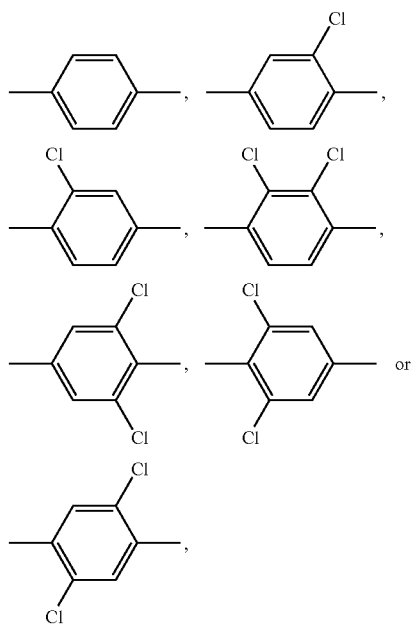

In place of Cl, the above may also be substituted with any of F, Br, an alkyl group (preferably an alkyl group having from 1 to 4 carbon atoms, more preferably $CH_3$), an alkoxy group (preferably an alkoxy group having from 1 to 4 carbon atoms, more preferably $OCH_3$), CHO, $COCH_3$, $OCOCH_3$ or CN. Optionally, the ring may be substituted with two or more such substituents. Also preferred is the following structure:

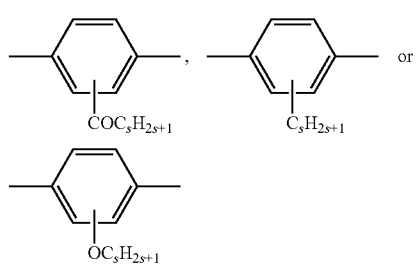

In the above, s indicates an integer of from 2 to 20, advantageously 8, 9, 10, 11, 12, 13, 14 or 15.

More advantageous substituents for the benzene ring Z for $M^1$ and the benzene ring for $M^2$ include the following:

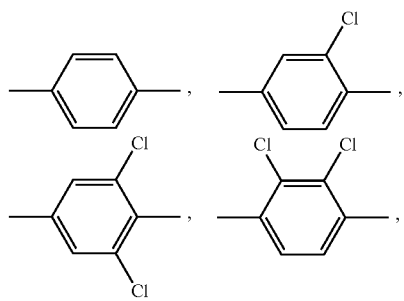

-continued

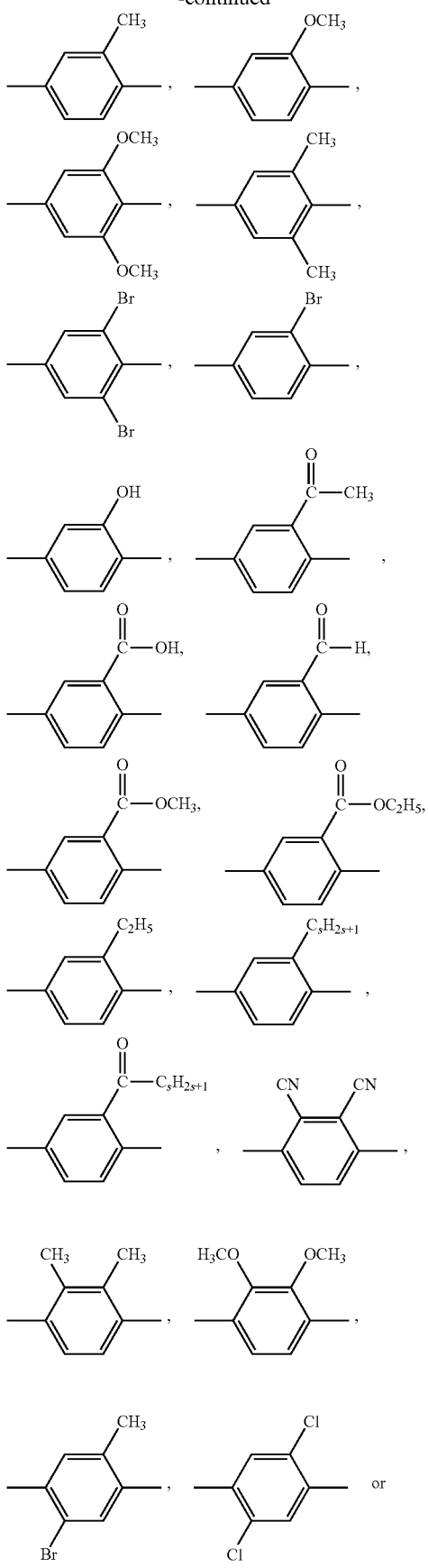

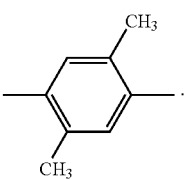

Preferably, in cholesteric liquid crystal mixture of the present invention, the compound represented by the above general formula (Ia) is a compound in which at least one hydrocarbon ring or heterocyclic ring of the hydrocarbon ring and the heterocyclic ring represented by $T^1$ and $T^2$ has an alkyl group or an alkoxy group.

More preferably above all, the compound represented by the above general formula (Ia) is a compound in which one hydrocarbon ring or heterocyclic ring of the hydrocarbon ring and the heterocyclic ring represented by $T^1$ and $T^2$ has an alkyl group or an alkoxy group. Even more preferred is a compound in which one hydrocarbon ring has an alkyl group (preferably an alkyl group having from 1 to 4 carbon atoms, more preferably $CH_3$) or an alkoxy group (preferably, an alkoxy group having from 1 to 4 carbon atoms, more preferably $OCH_3$); and still more preferred is a compound in which one hydrocarbon ring or heterocyclic ring has an alkyl group.

In case where n in $M^1$ in the compound represented by the general formula (Ia) is 2, preferably, the central one hydrocarbon ring or heterocyclic ring of the hydrocarbon rings and the heterocyclic rings has an alkyl group or an alkoxy group, and more preferred ranges of the case are the same as described above.

On the other hand, it is also desirable that, in the cholesteric liquid crystal mixture of the present invention, the compound represented by the above general formula (Ib) is a compound in which both the hydrocarbon ring and the heterocyclic ring represented by $T^1$ and $T^2$ are unsubstituted hydrocarbon rings or heterocyclic rings.

($Y^1$, $Y^2$, $Y^3$, $Y^4$, $Y^5$, $Y^7$ and $Y^8$)

In the above general formulae (Ia) and (Ib), $Y^1$, $Y^2$, $Y^3$, $Y^4$, $Y^5$, $Y^7$ and $Y^8$ each independently represent a single bond, —O—, —CO—, —O—CO—, —CO—O— or —O—CO—O—.

Advantageously, in the compound of the formulae (Ia) and (Ib), $Y^1$ to $Y^5$, $Y^7$, $Y^9$ and $Y^{10}$ and optionally $Y^6$ and $Y^8$ each independently represent oxygen, —O—CO—, —CO—O— or —O—CO—O—.

Advantageously, the liquid crystal substance mixture and its advantageous embodiments include compounds of the formula (Ia) and/or (Ib) where the polymerizable unit of $Z^1$—$Y^1$—, $Z^2$—$Y^2$—, $Z^3$—$Y^5$— and optionally $Z^4$—$Y^6$— is selected from methacryloyloxy, acryloyloxy and vinyloxy.

Specific examples of the compound represented by the above general formula (Ia) and the compound represented by the above general formula (Ib) are shown below. However, the compound represented by the above general formula (Ia) and the compound represented by the above general formula (Ib) that are employable in the present invention should not be limitatively interpreted by the following specific examples.

Compounds represented by General Formula (Ia)
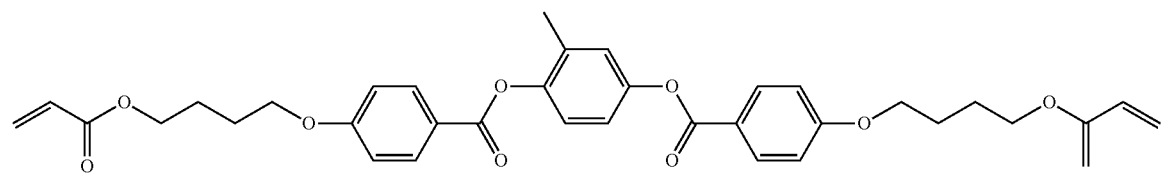
IV-1
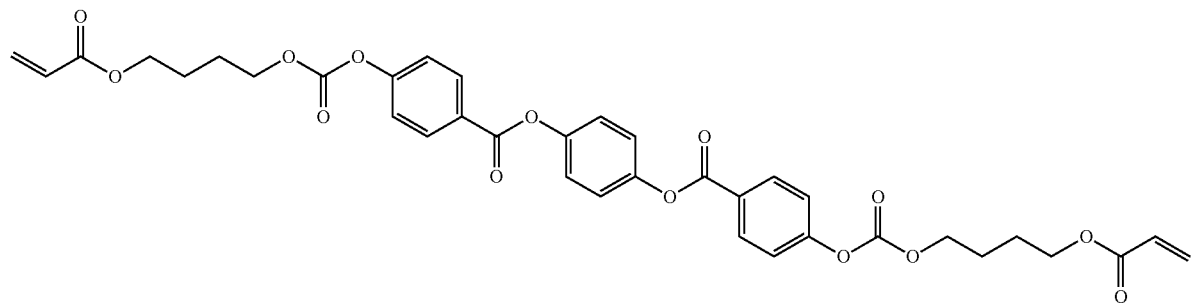
IV-2
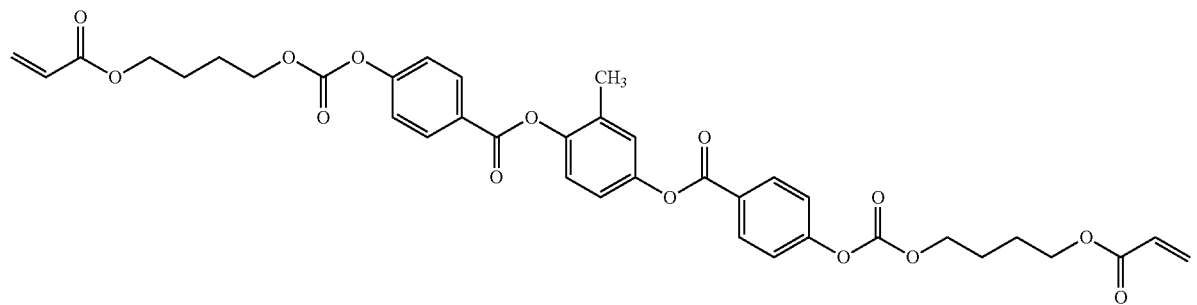
IV-3
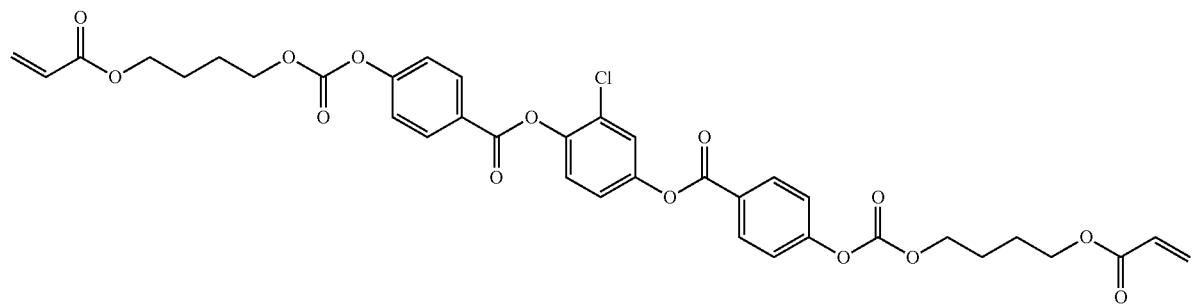
IV-4
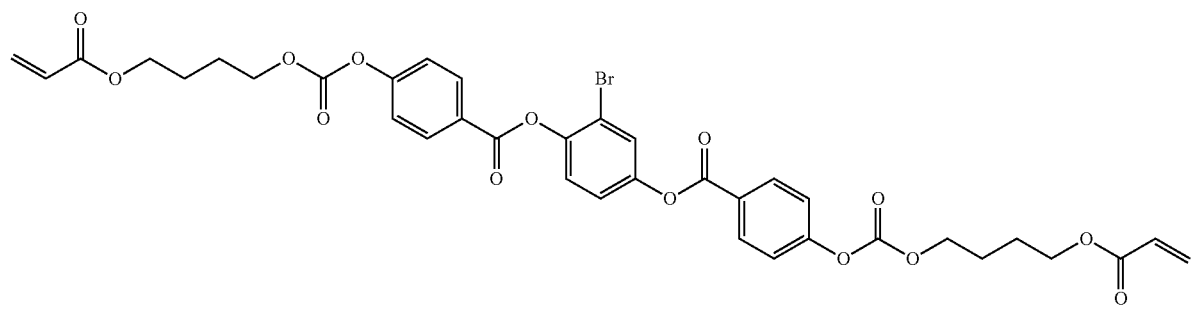

-continued
IV-5
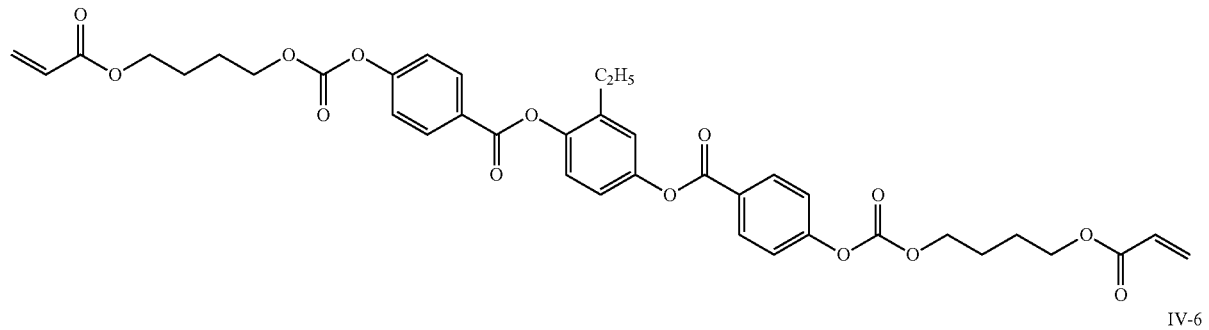
IV-6
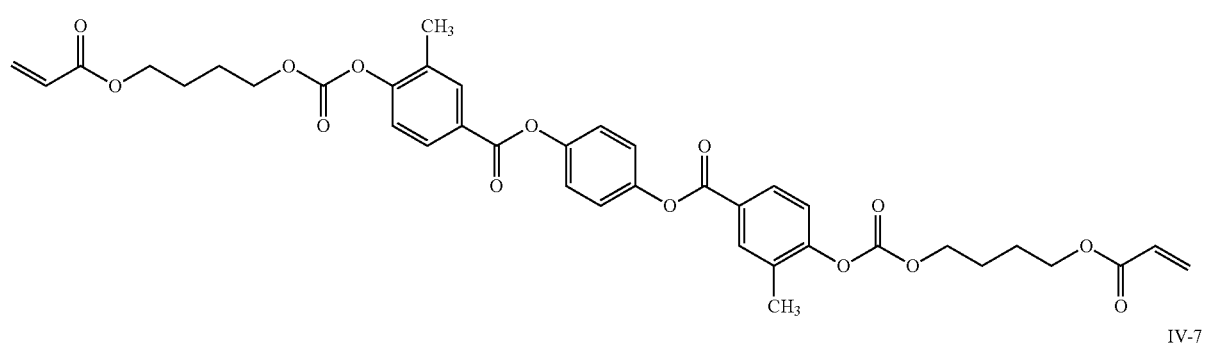
IV-7
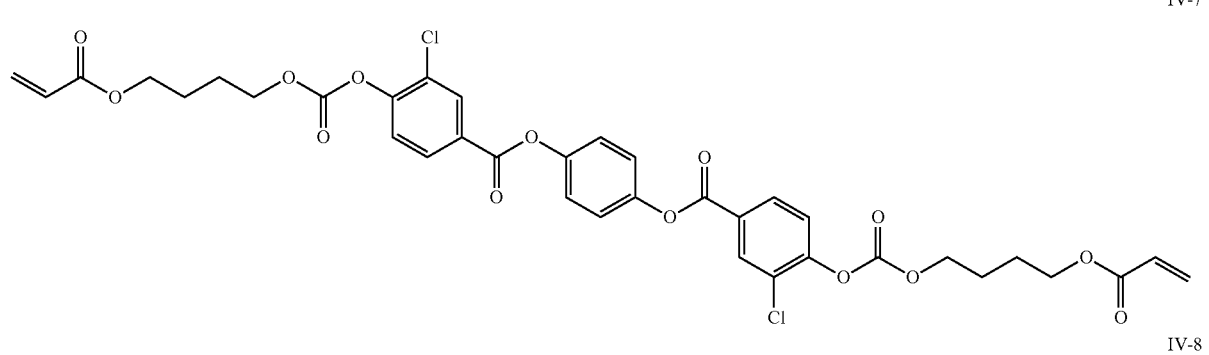
IV-8
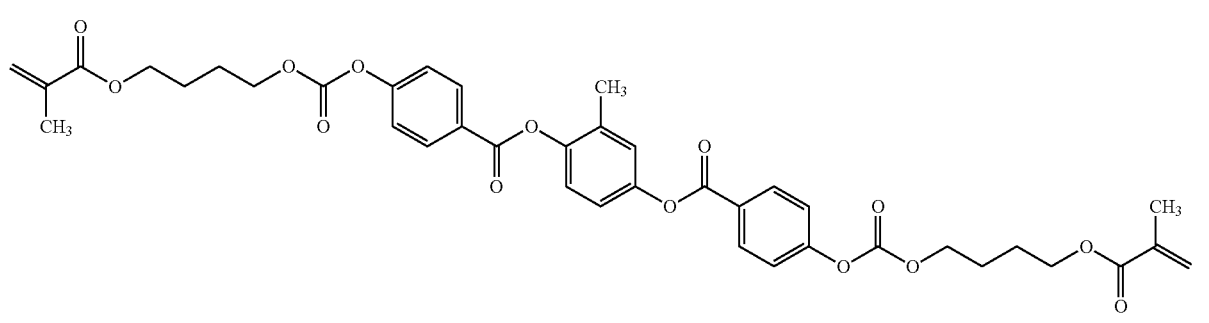
IV-9
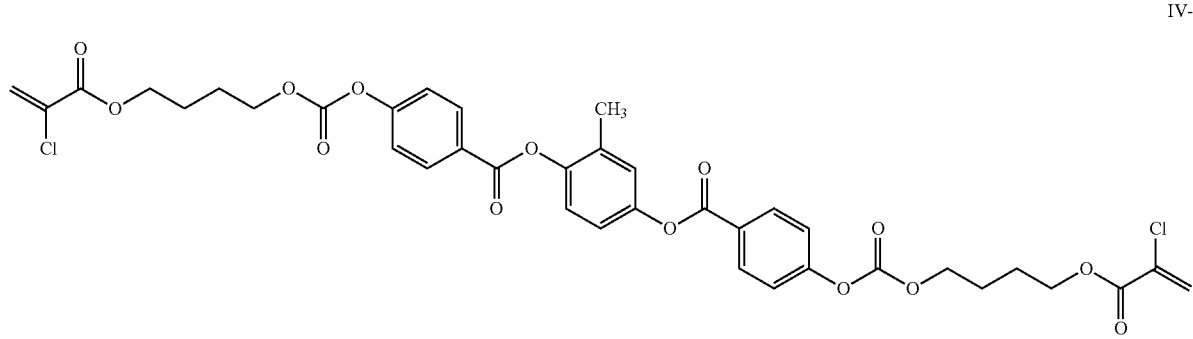

-continued
IV-10
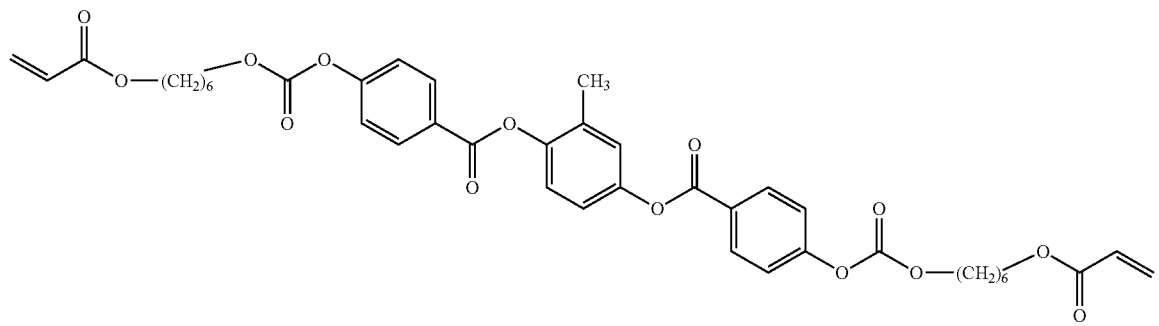
IV-11
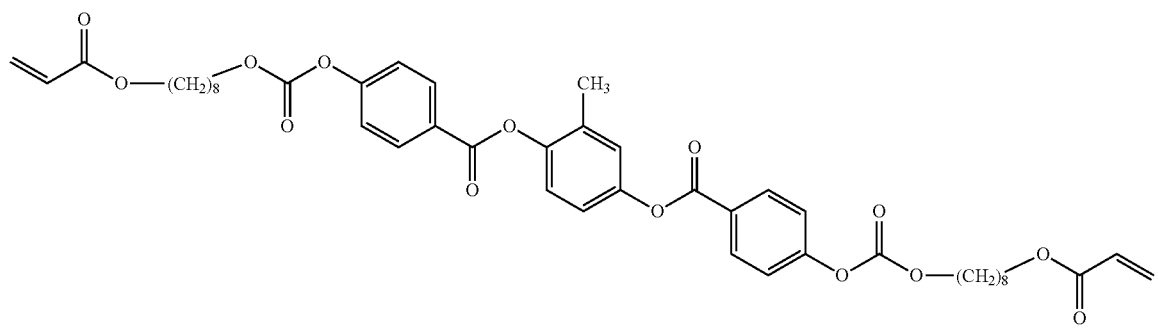
IV-12
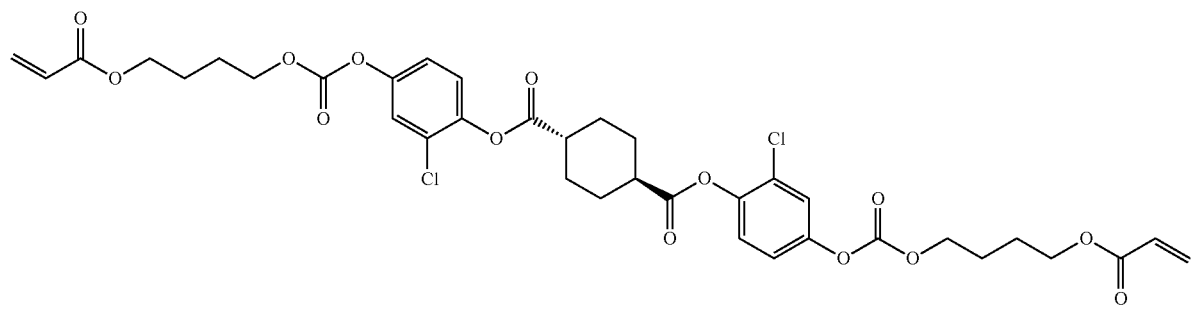
IV-13
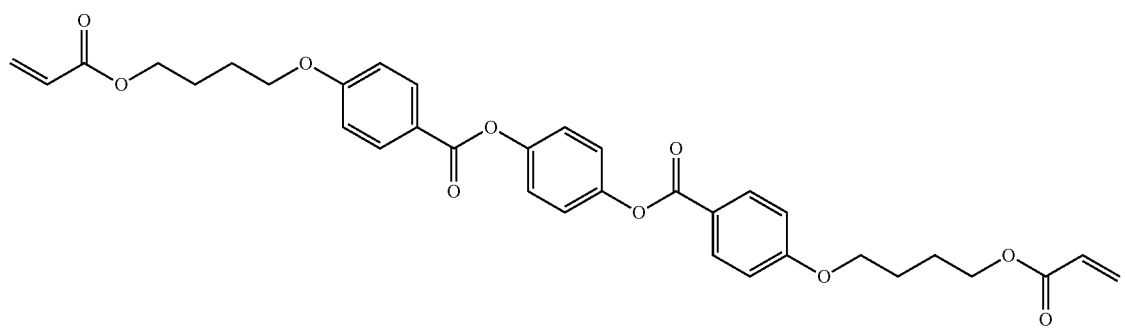

IV-14
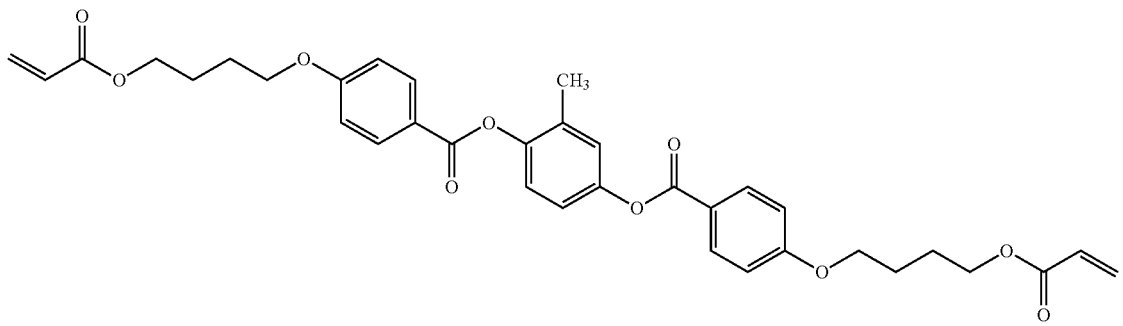
IV-15
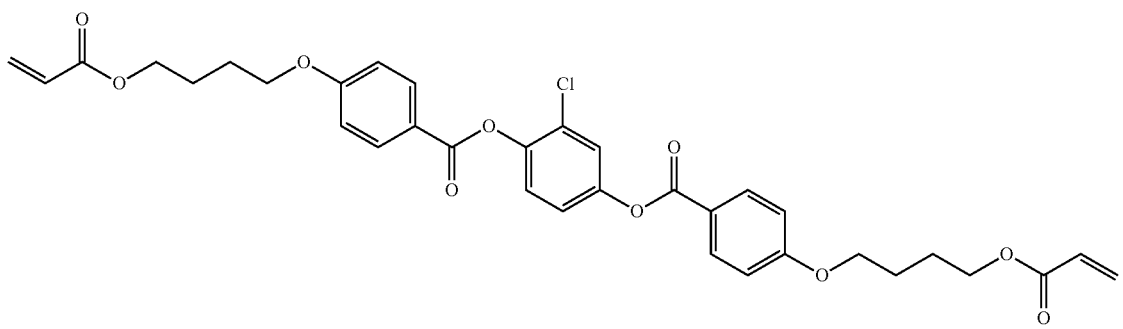
IV-16
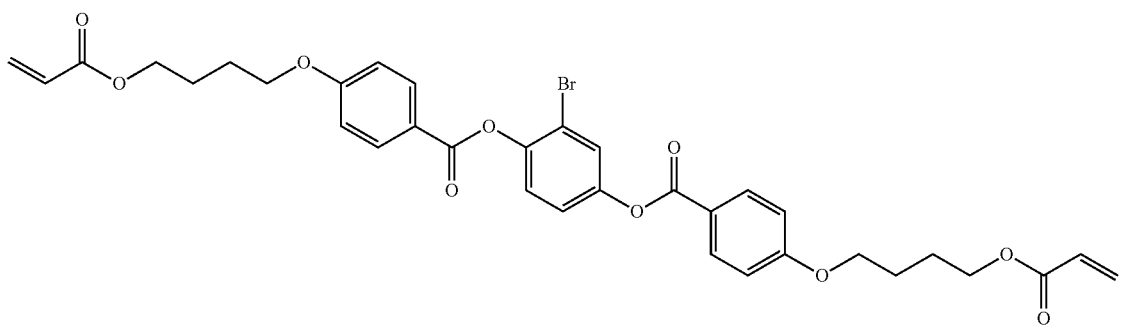
IV-17
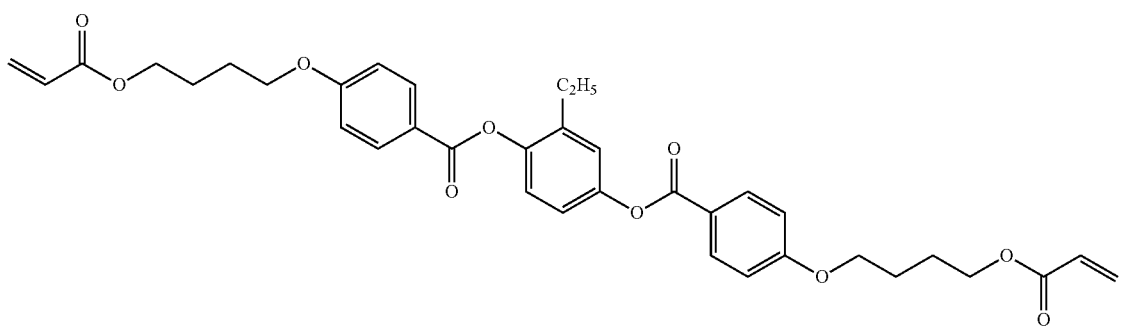

IV-18
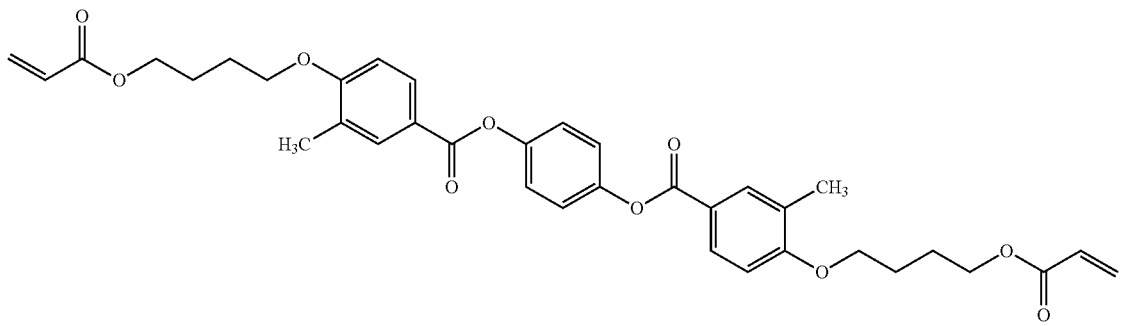
IV-19
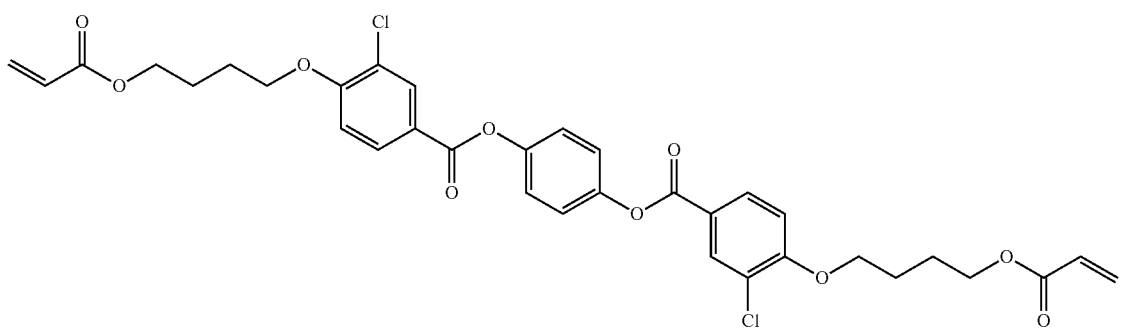
IV-20
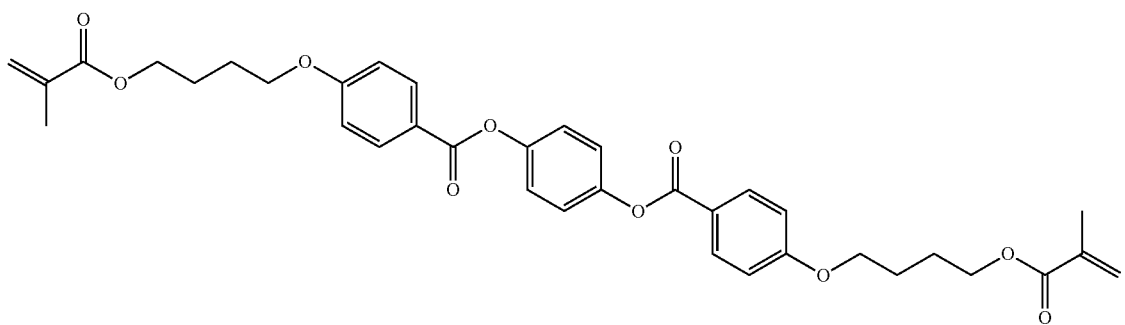
IV-21
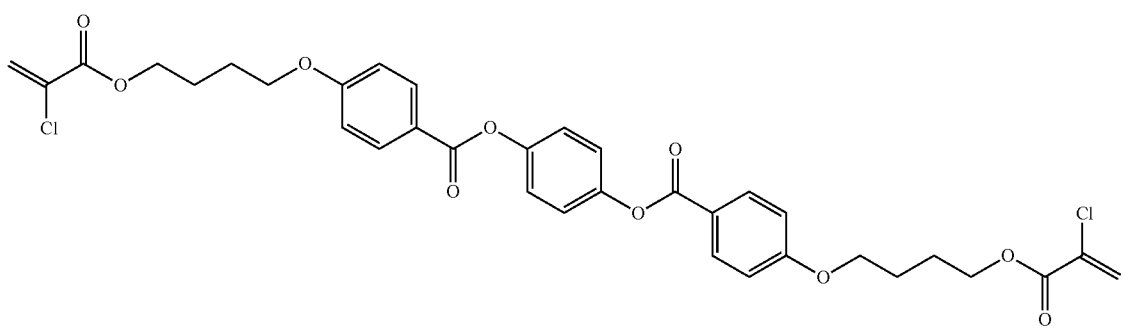

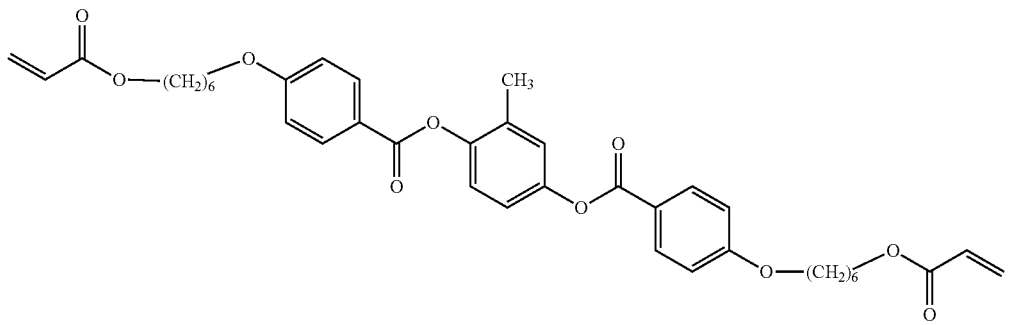
IV-22
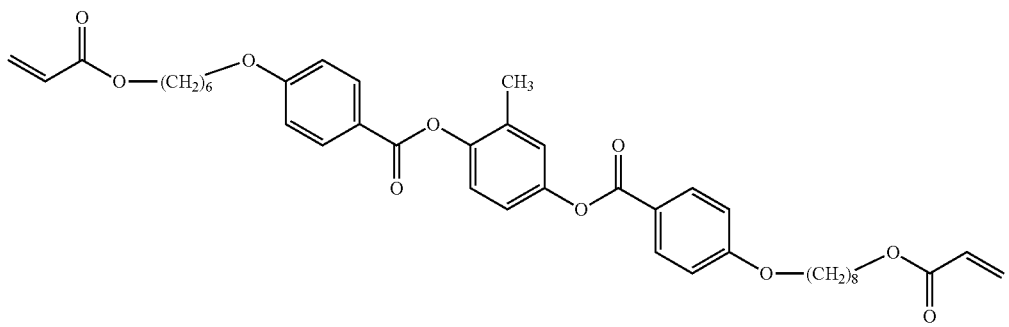
IV-23
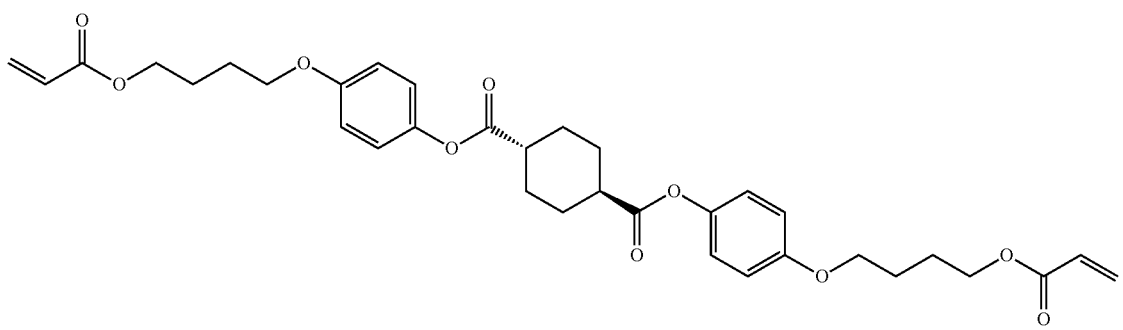
IV-24
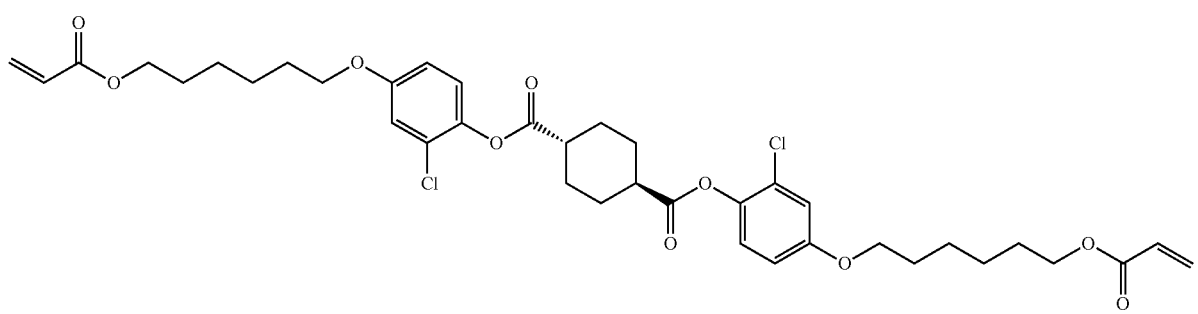
IV-25
Compounds represented by General Formula (Ib)
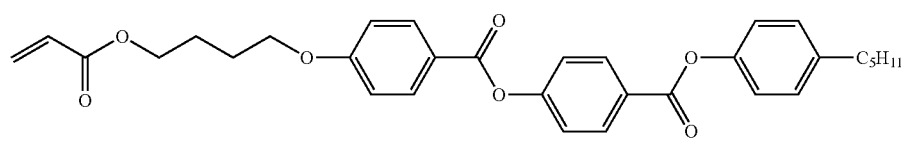

-continued
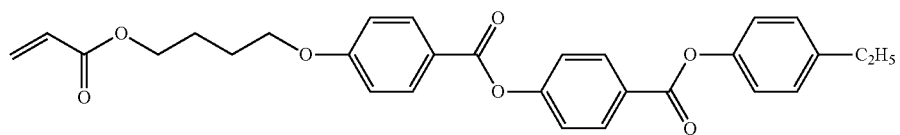
(I-1)
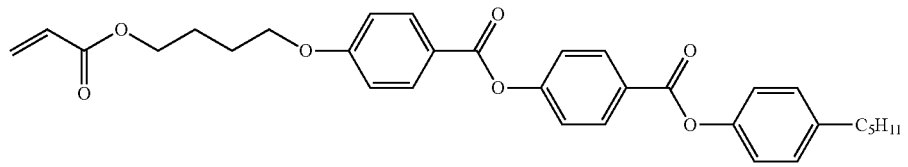
(I-2)
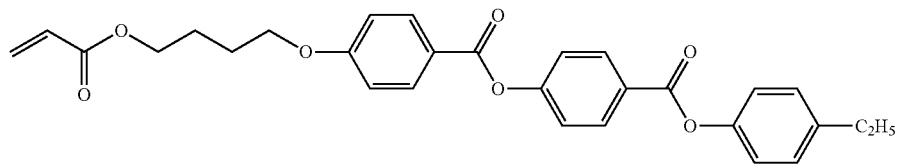
(I-3)
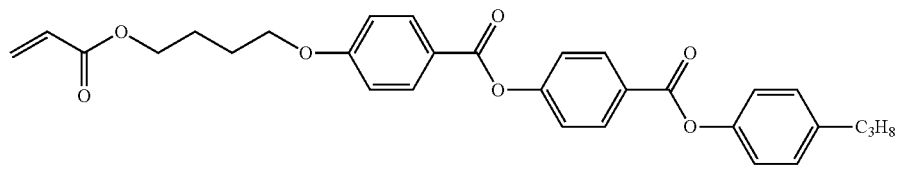
(I-4)
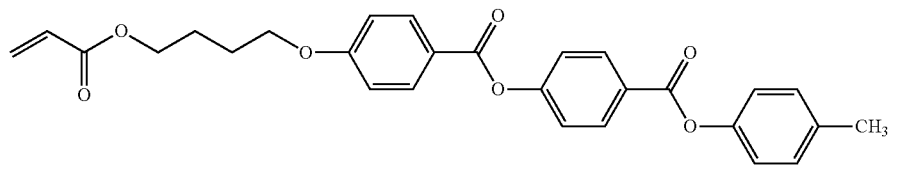
(I-5)
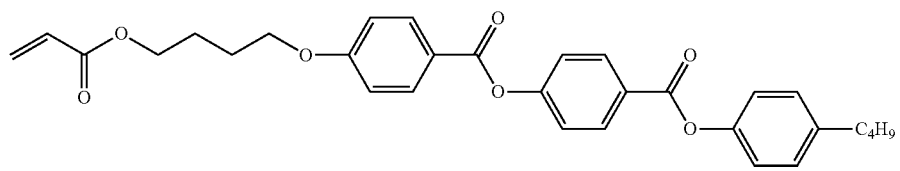
(I-6)
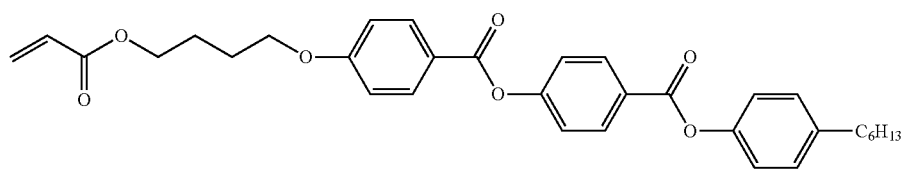
(I-7)
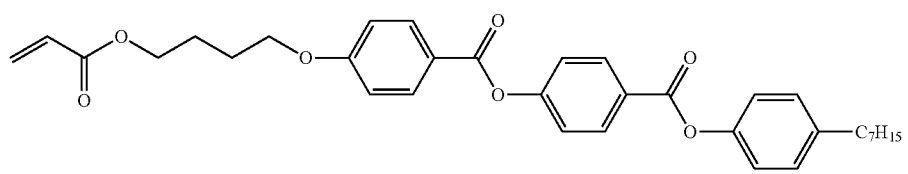
(I-8)
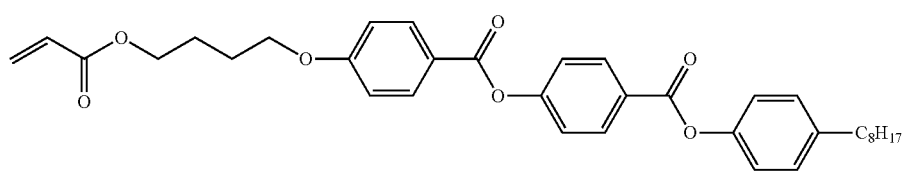

-continued
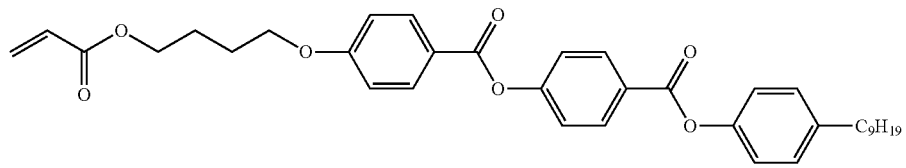
(I-9)
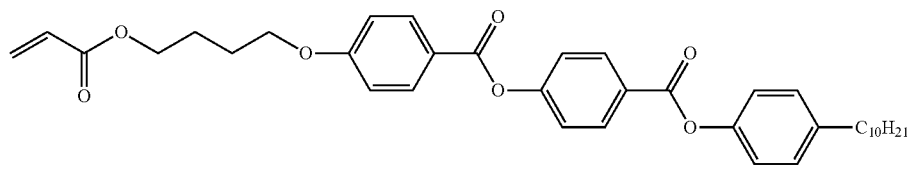
(I-10)
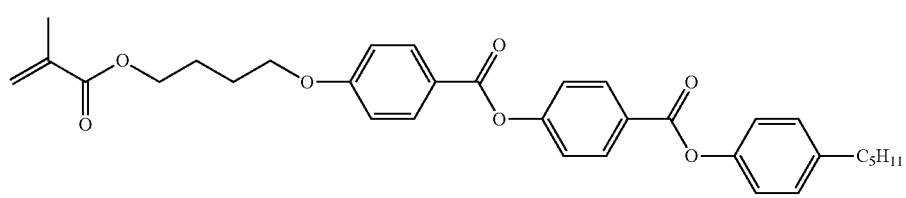
(I-11)
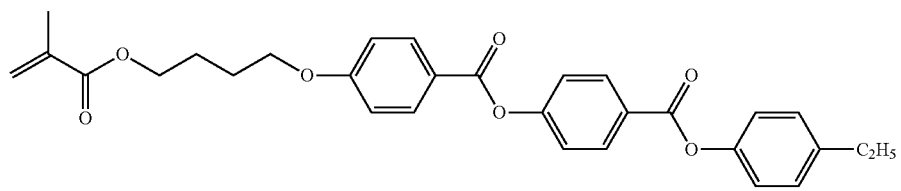
(I-12)
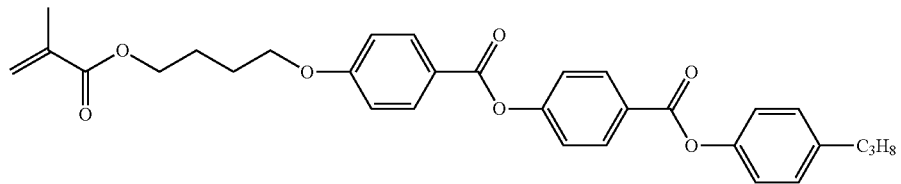
(I-13)
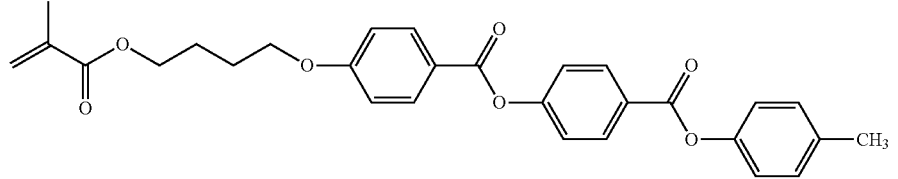
(I-14)
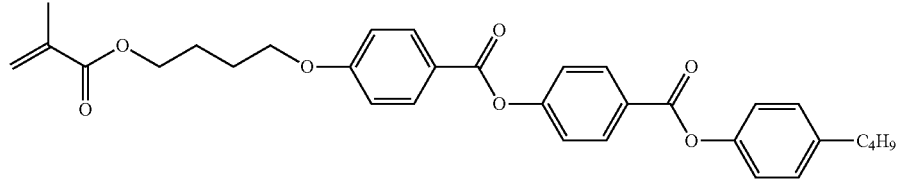
(I-15)
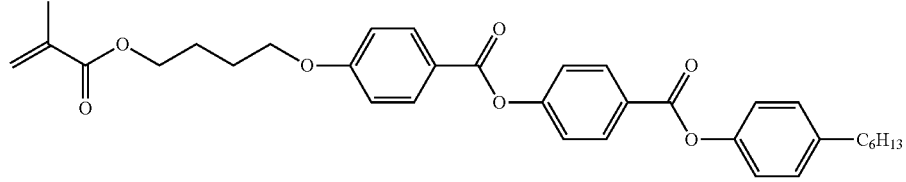
(I-16)

-continued
(I-17)
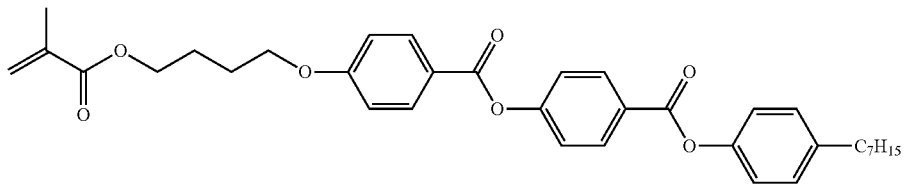
(I-18)
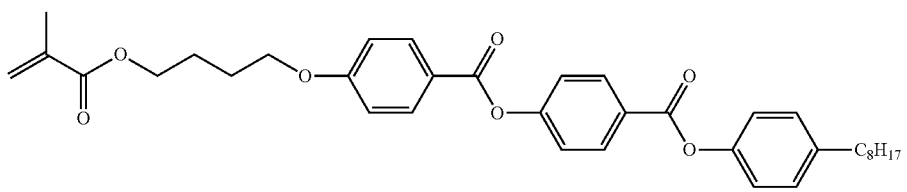
(I-19)
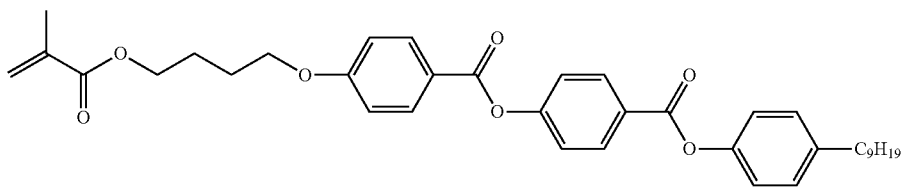
(I-20)
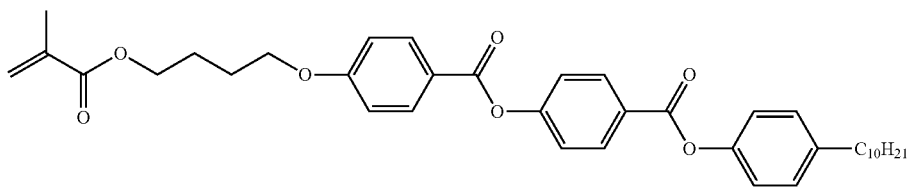
(I-21)
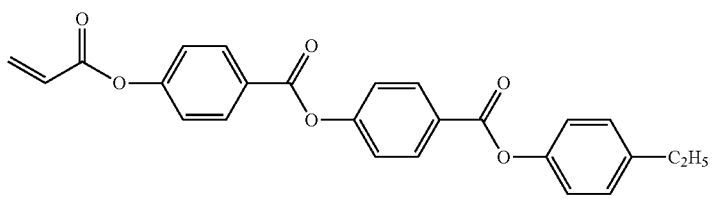
(I-22)
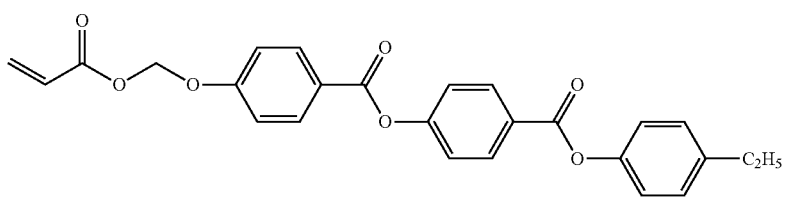
(I-23)
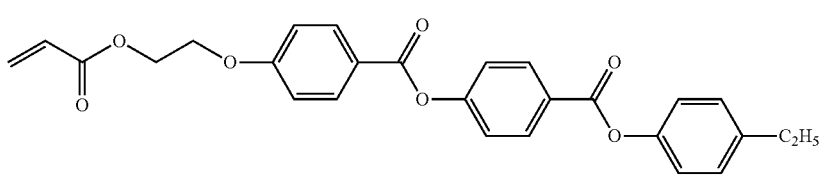
(I-24)
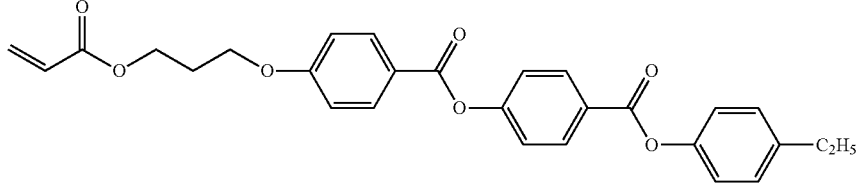

-continued
(I-25)
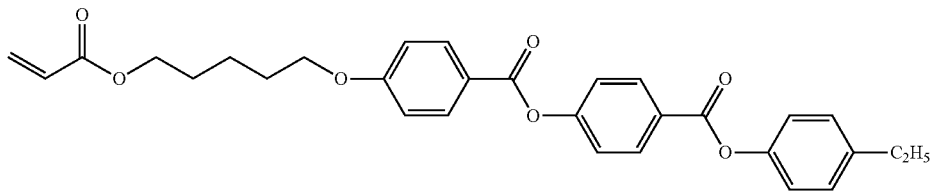
(I-26)
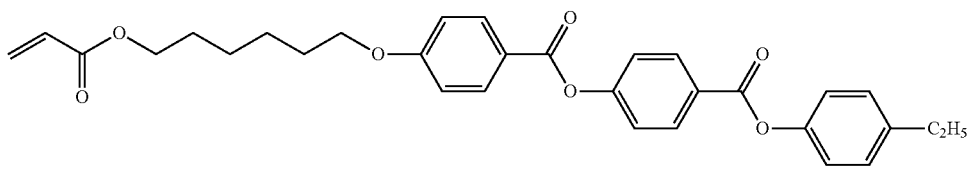
(I-27)
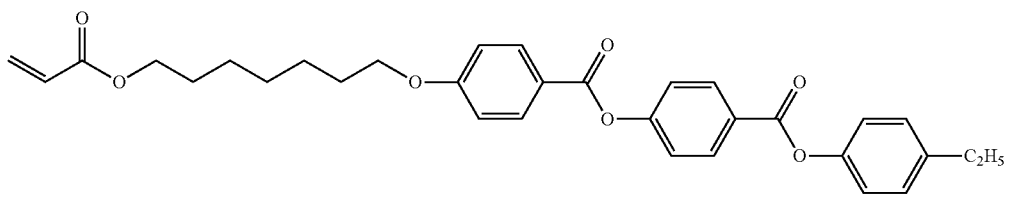
(I-28)
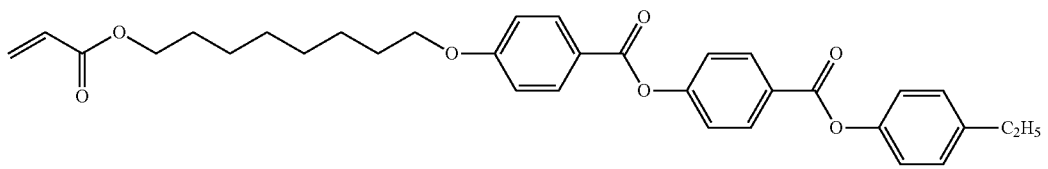
(I-29)
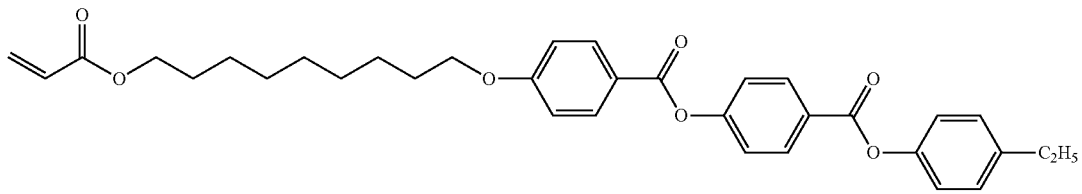
(I-30)
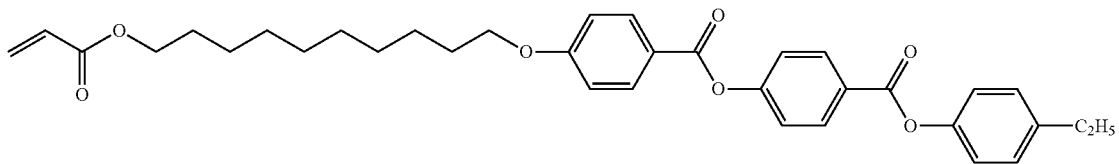
(I-31)
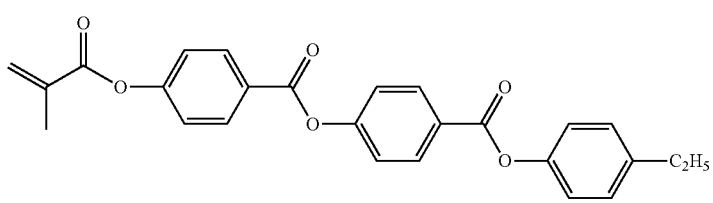
(I-32)
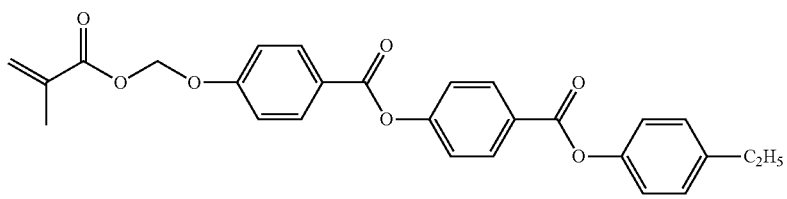

-continued
(I-33)
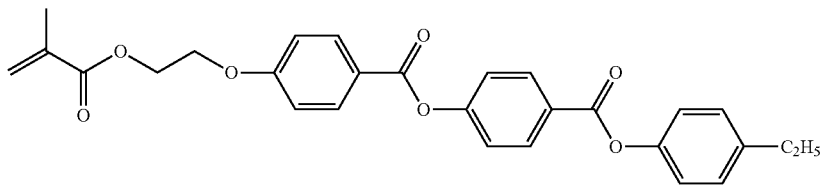
(I-34)
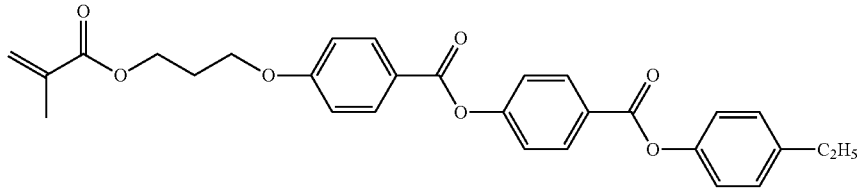
(I-35)
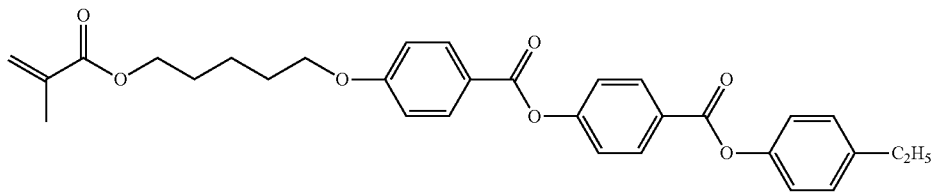
(I-36)
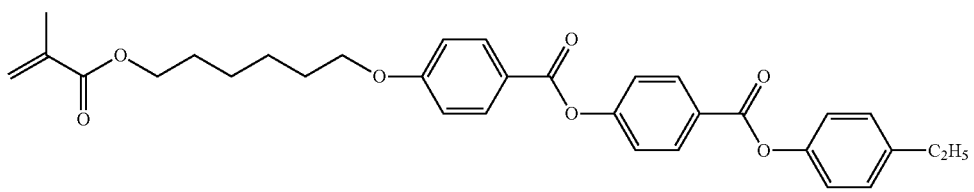
(I-37)
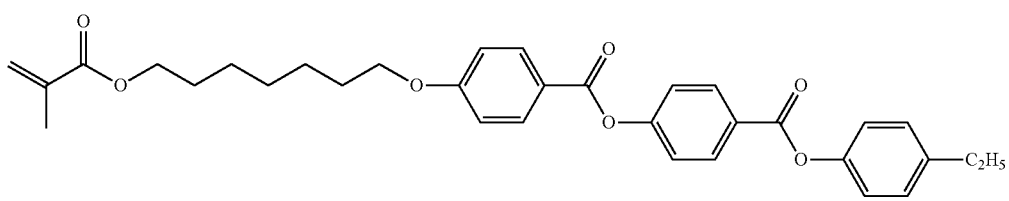
(I-38)
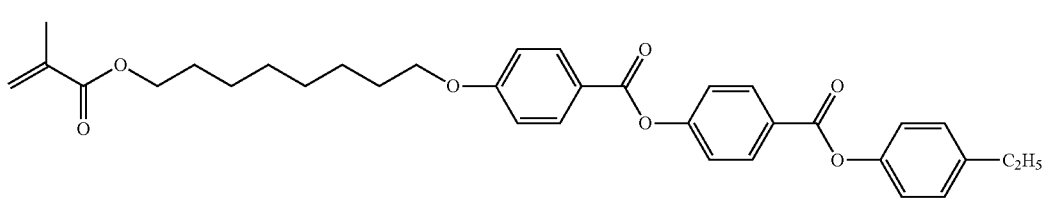
(I-39)
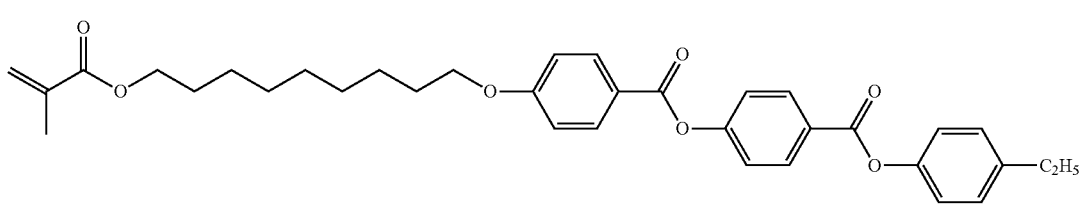
(I-40)
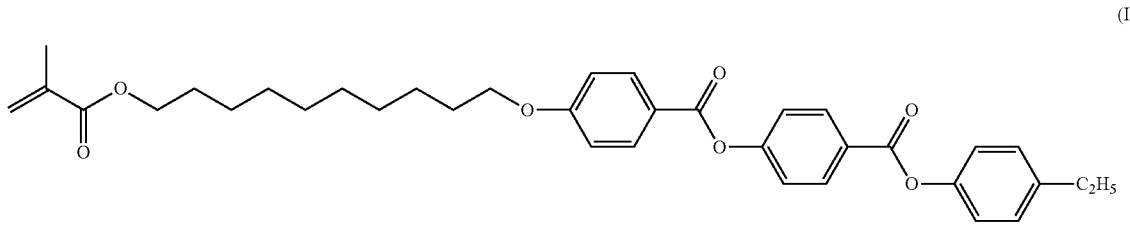

-continued
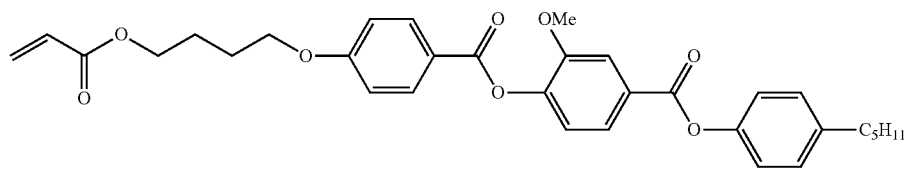
(I-41)
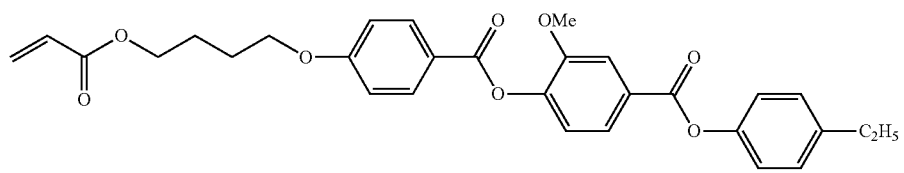
(I-42)
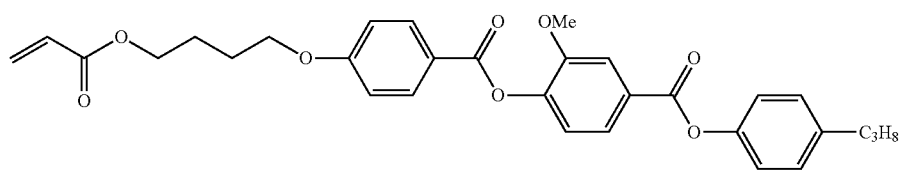
(I-43)
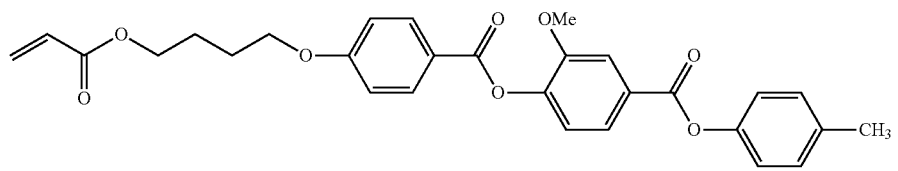
(I-44)
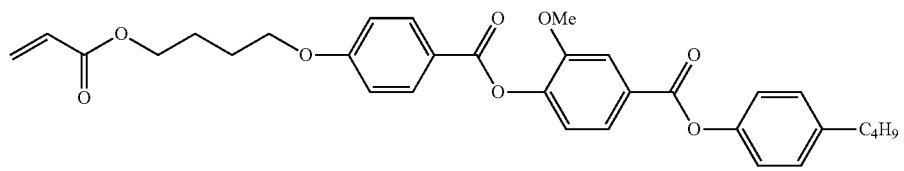
(I-45)
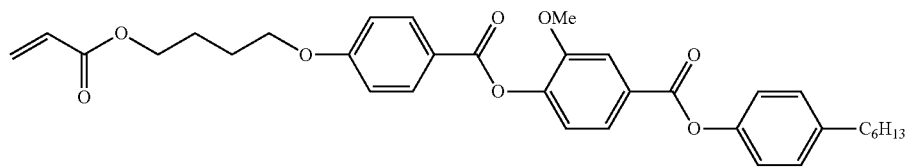
(I-46)
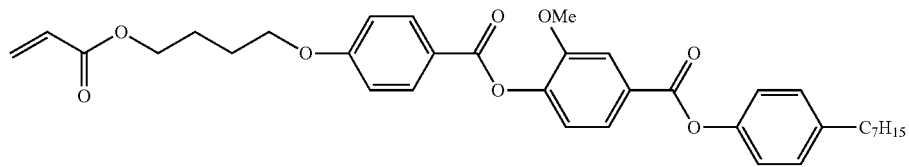
(I-47)
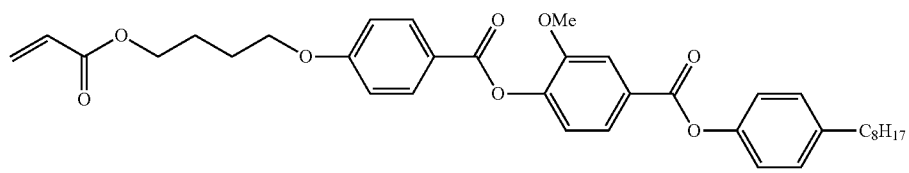
(I-48)
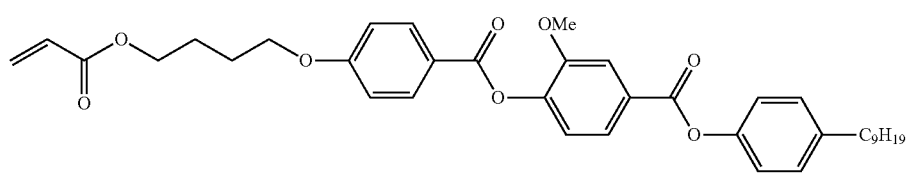
(I-49)

-continued
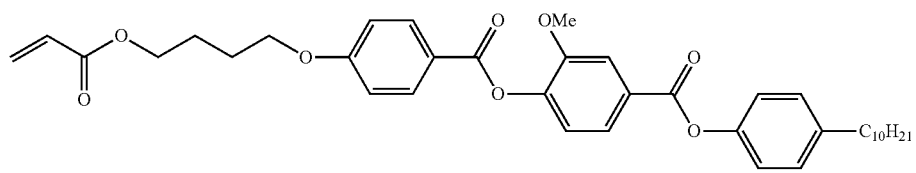
(I-50)
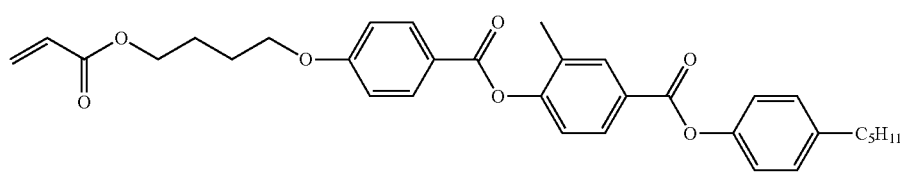
(I-51)
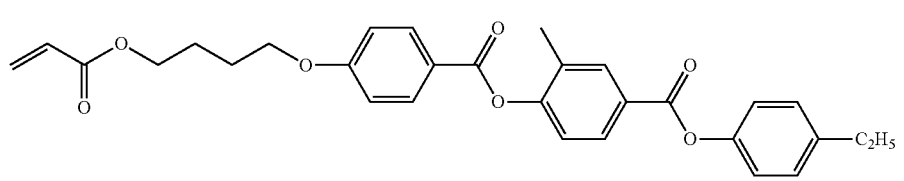
(I-52)
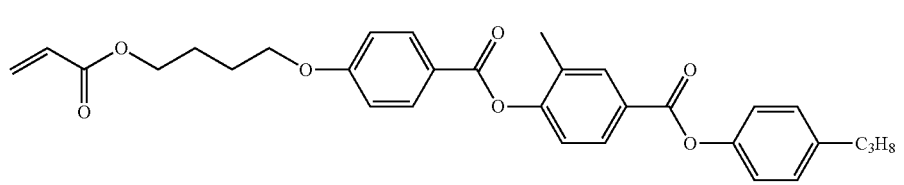
(I-53)
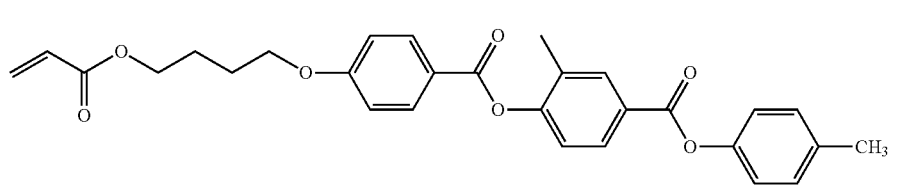
(I-54)
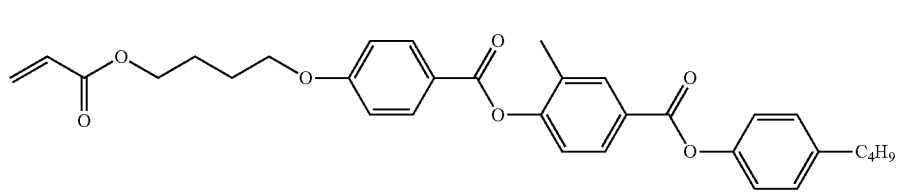
(I-55)
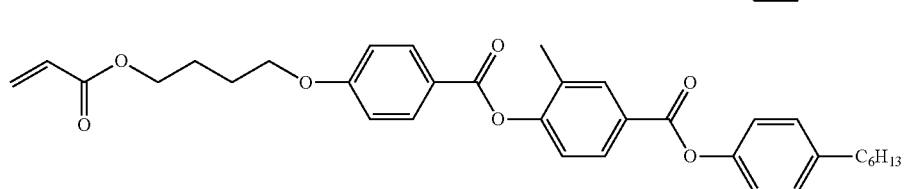
(I-56)
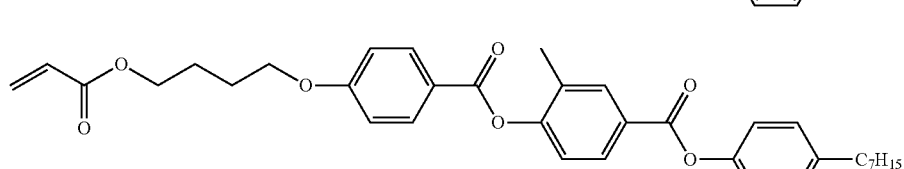
(I-57)
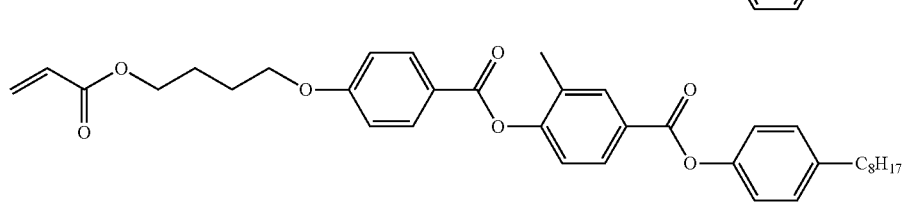
(I-58)

-continued
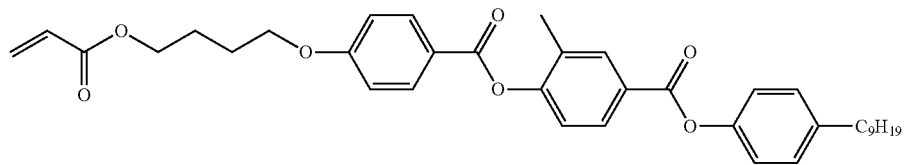
(I-59)
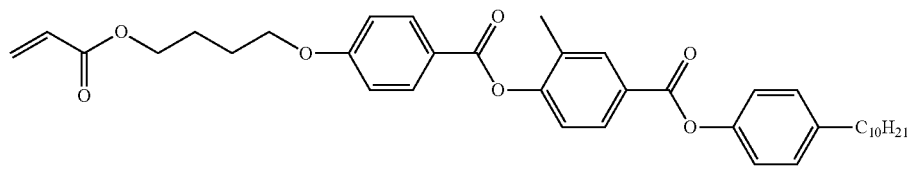
(I-60)
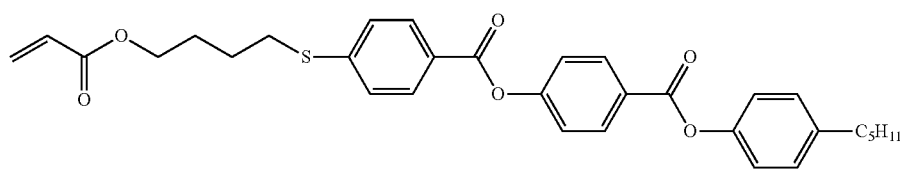
(I-81)
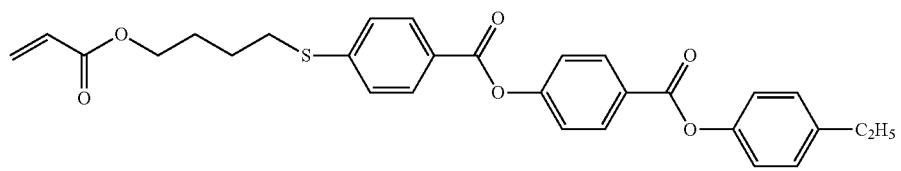
(I-82)
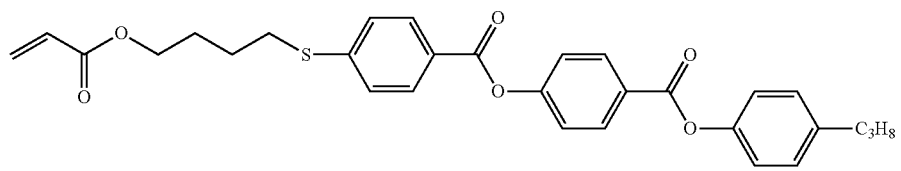
(I-83)
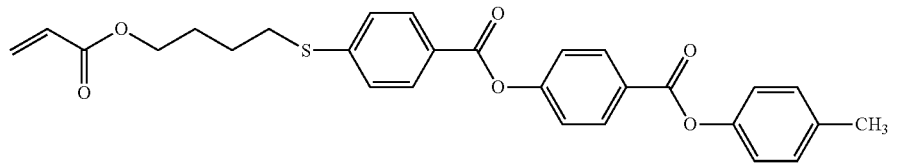
(I-84)
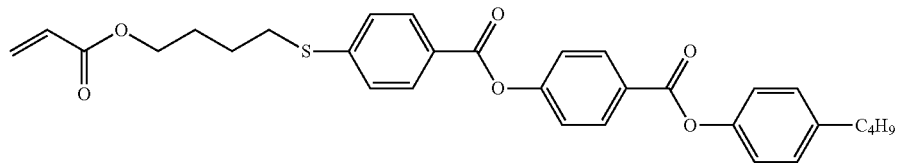
(I-85)
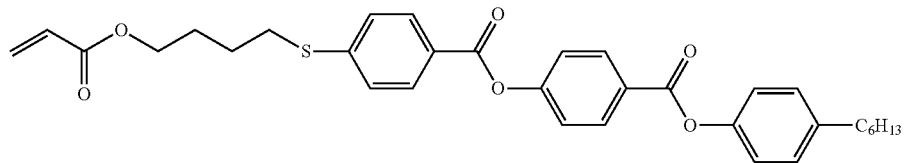
(I-86)
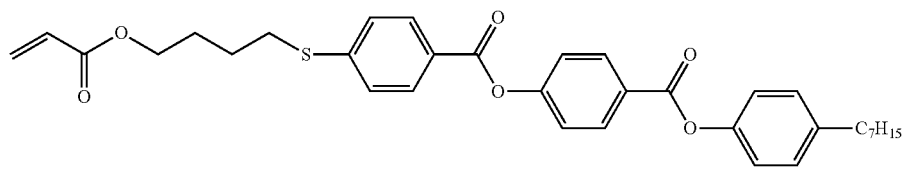
(I-87)

-continued
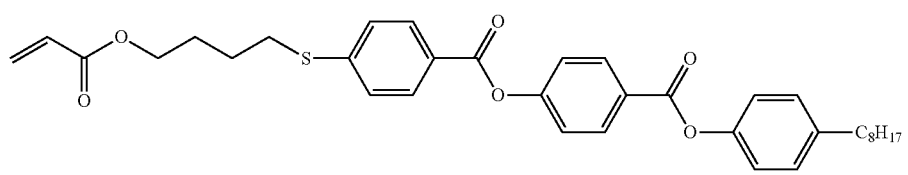
(I-88)
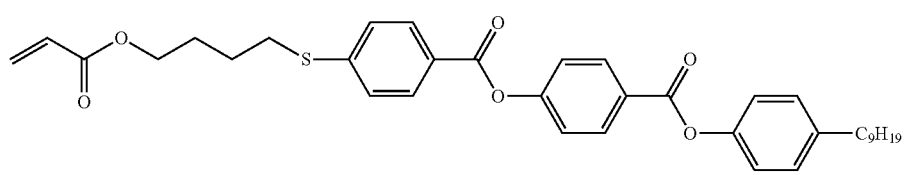
(I-89)
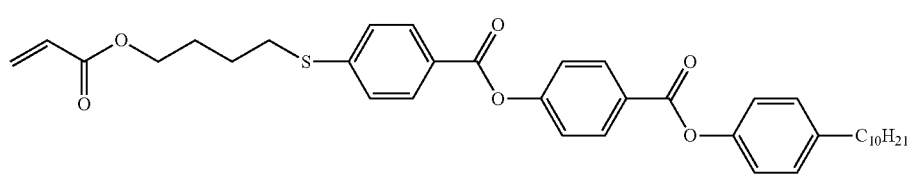
(I-90)
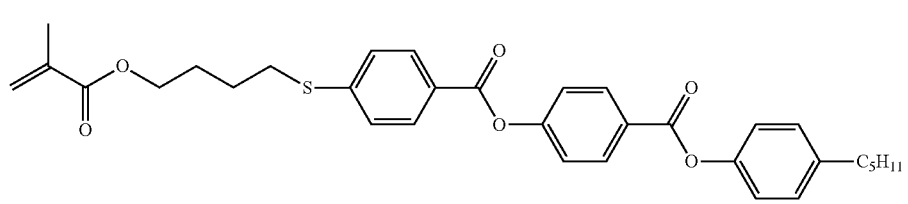
(I-91)
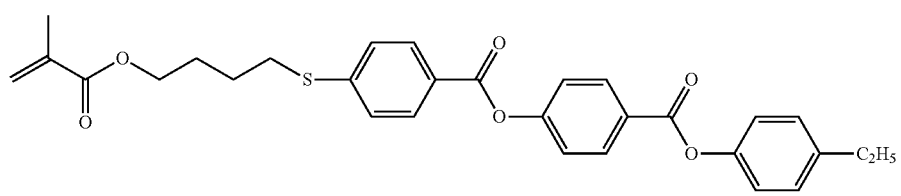
(I-92)
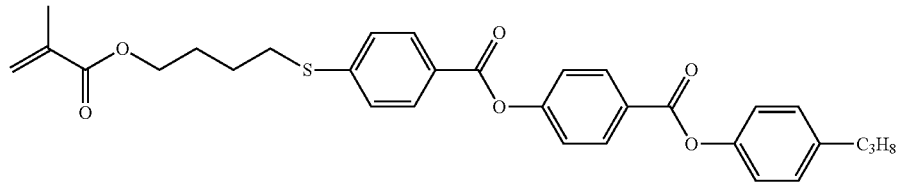
(I-93)
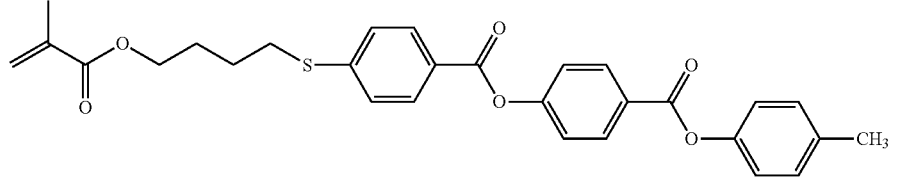
(I-94)
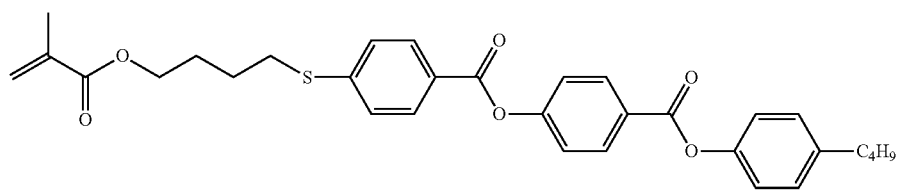
(I-95)

-continued
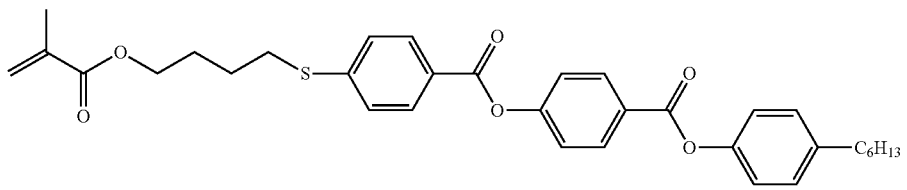
(I-96)
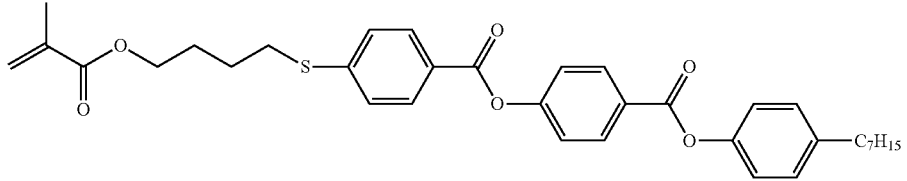
(I-97)
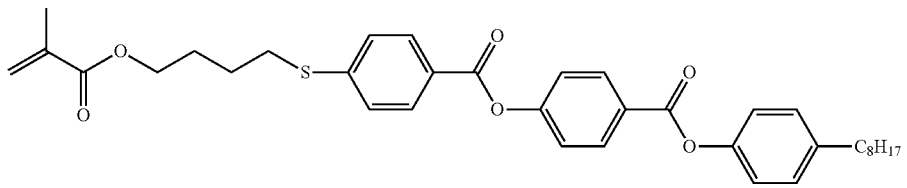
(I-98)
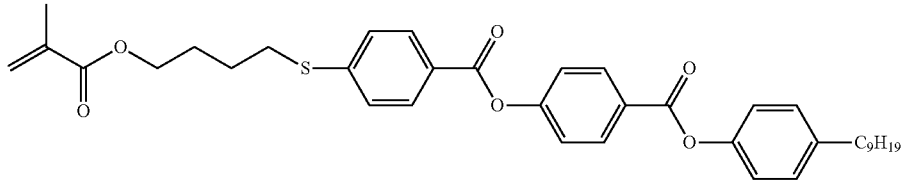
(I-99)
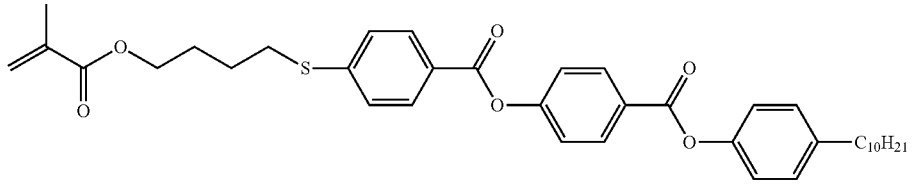
(I-100)
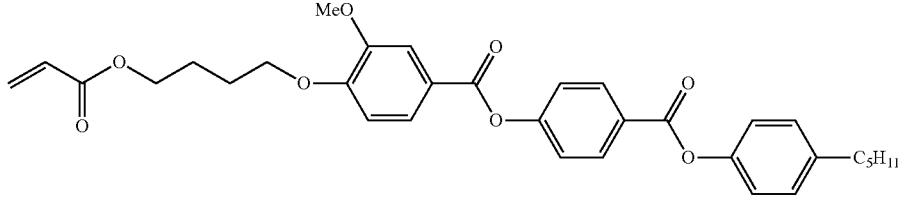
(I-101)
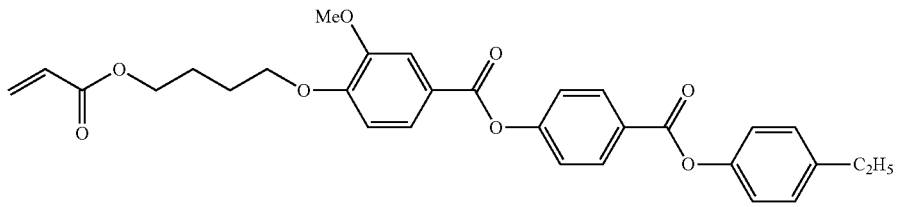
(I-102)
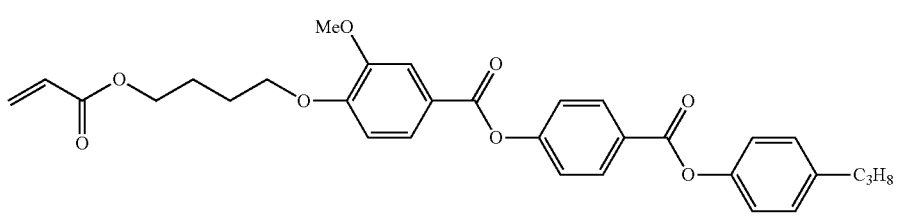
(I-103)

-continued
(I-104)
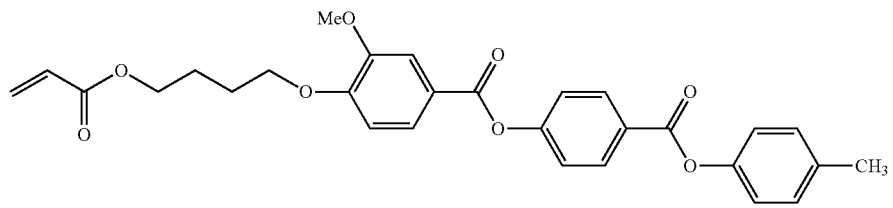
(I-105)
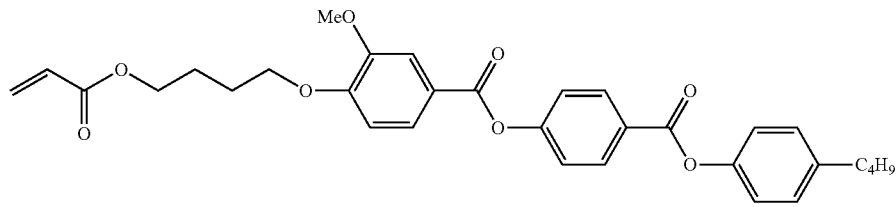
(I-106)
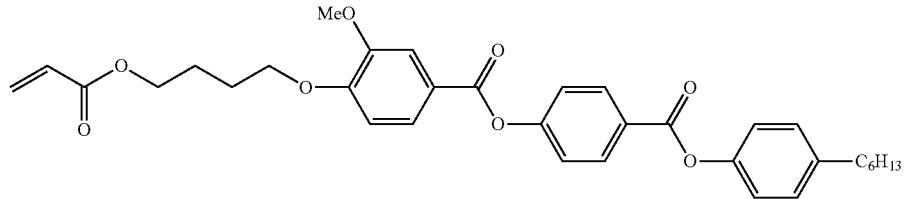
(I-107)
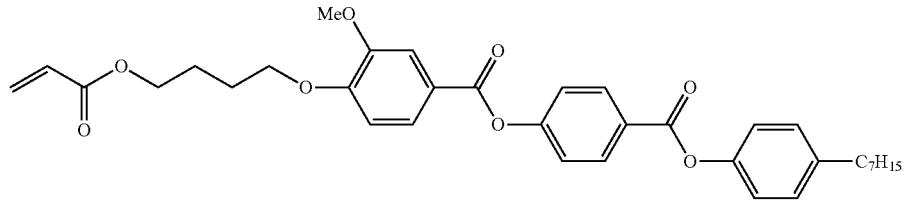
(I-108)
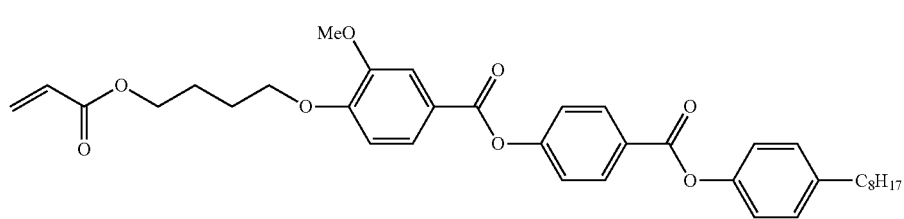
(I-109)
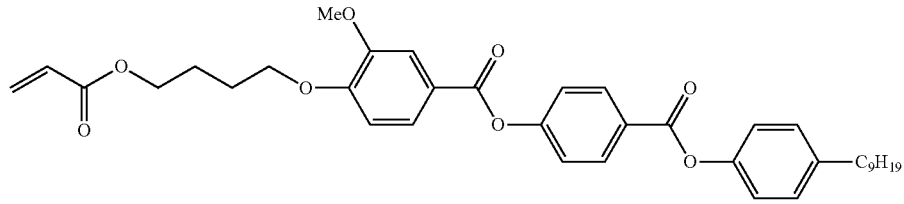
(I-110)
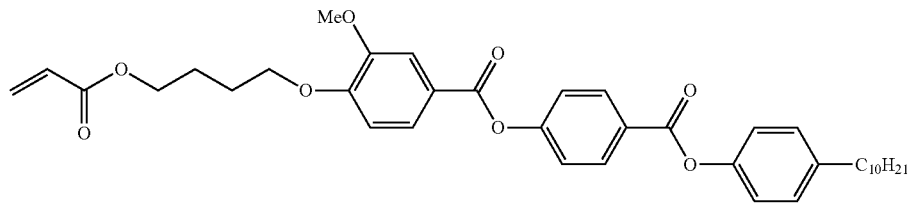

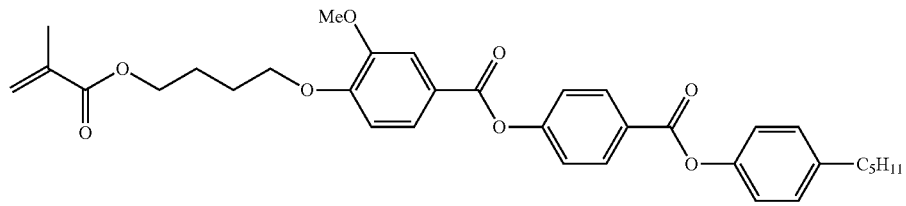
(I-111)
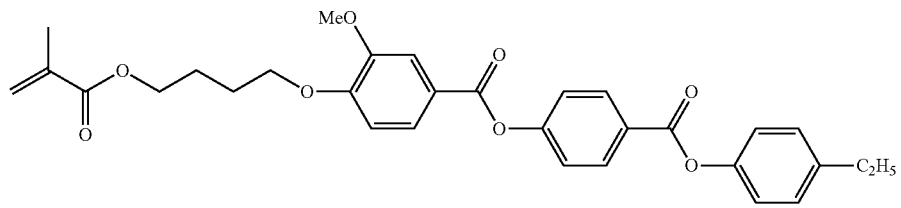
(I-112)
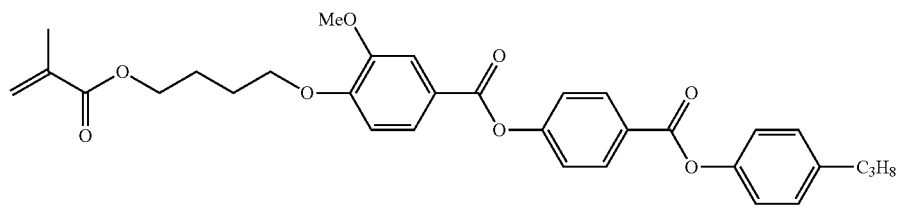
(I-113)
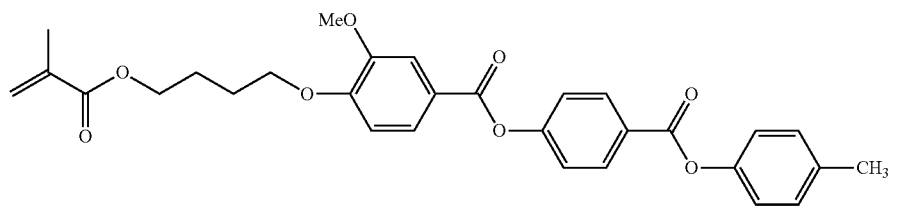
(I-114)
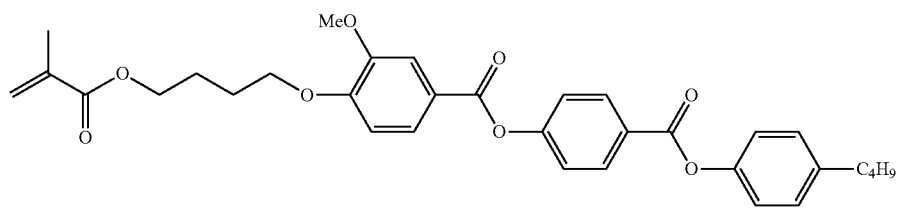
(I-115)
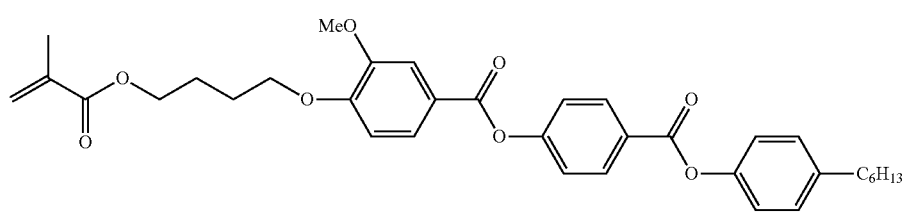
(I-116)
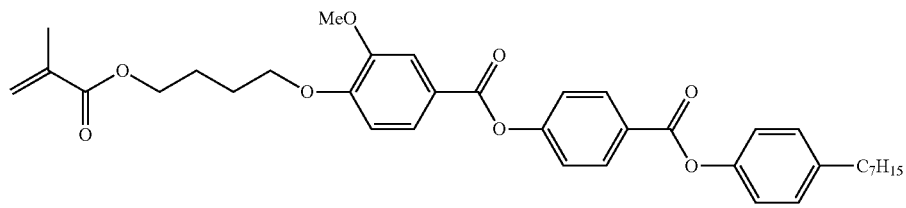
(I-117)

(I-118)
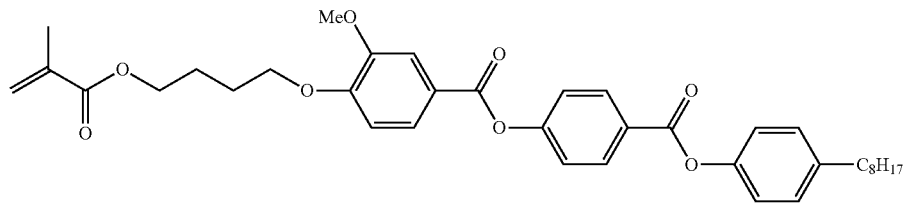
(I-119)
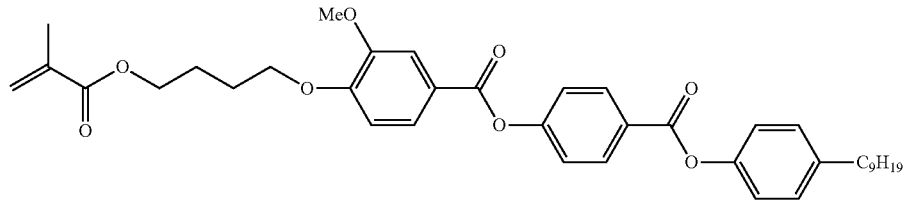
(I-120)
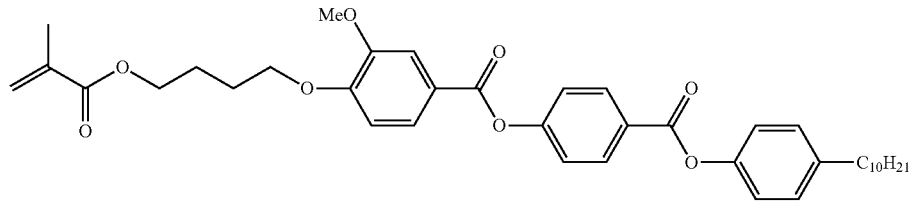
(I-121)
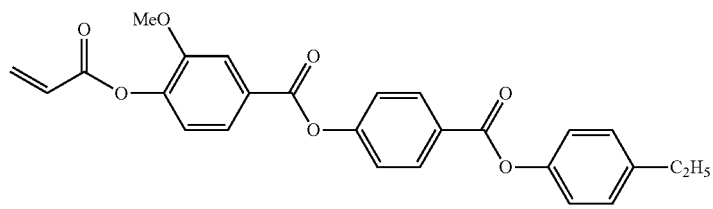
(I-122)
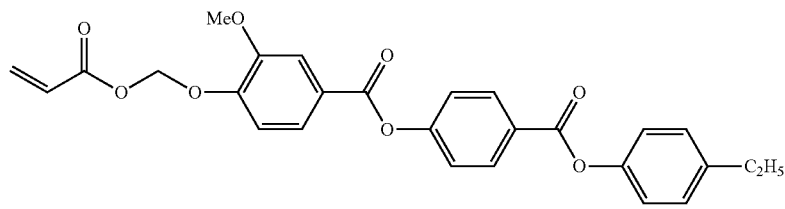
(I-123)
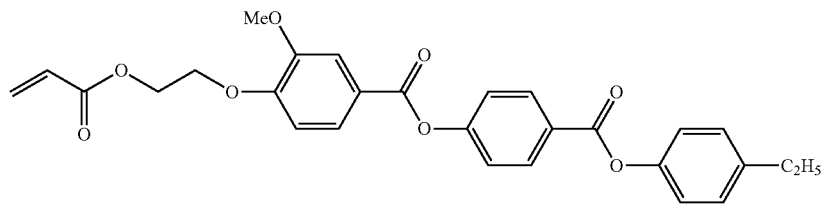
(I-124)
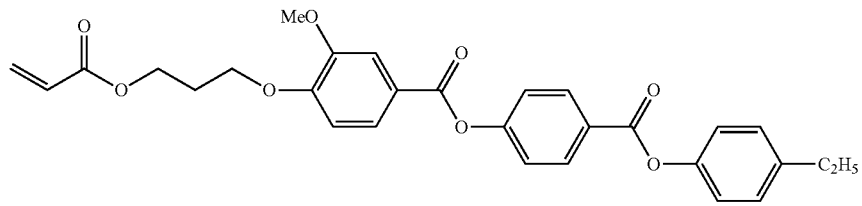

(I-125)
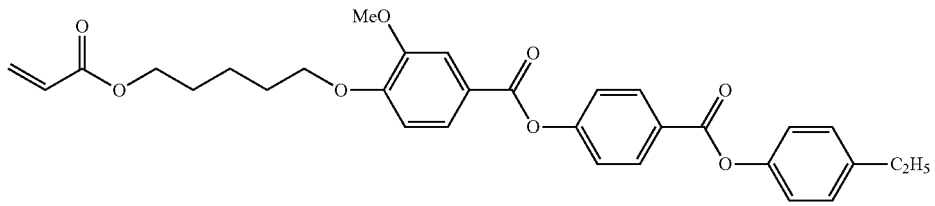
(I-126)
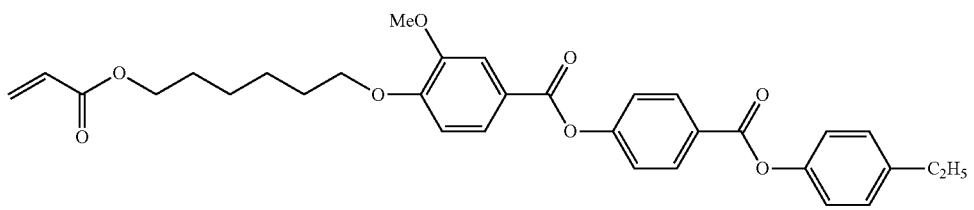
(I-127)
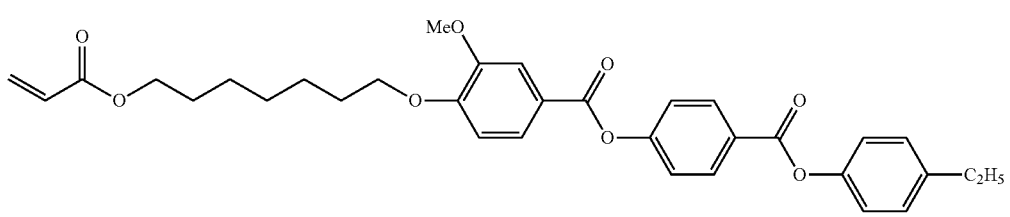
(I-128)
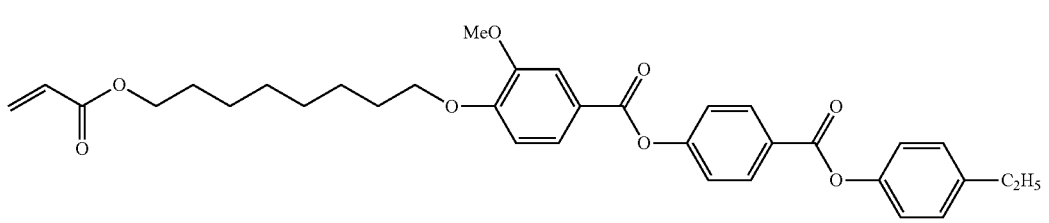
(I-129)
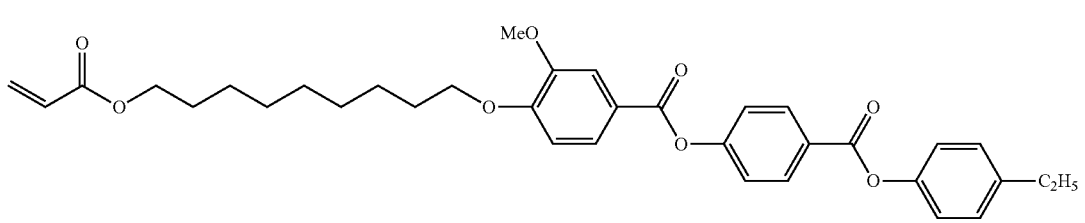
(I-130)
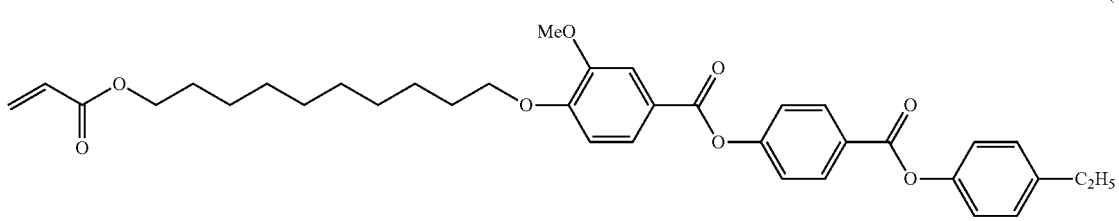
(I-131)
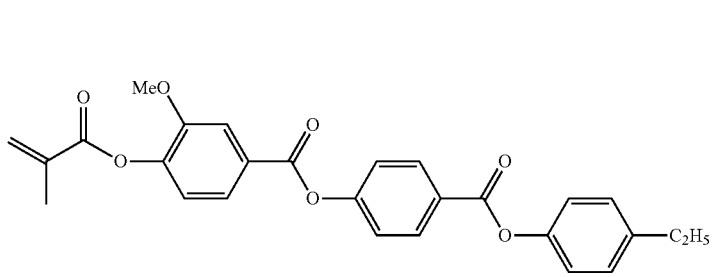

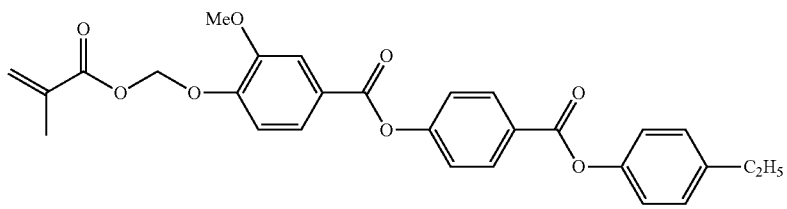
(I-132)
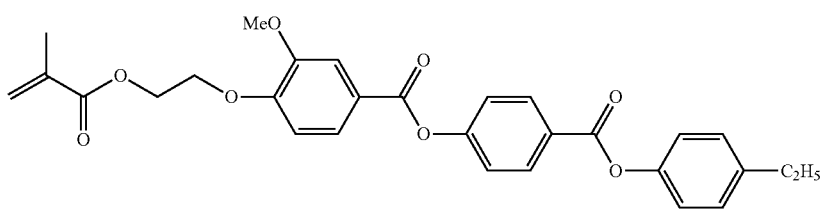
(I-133)
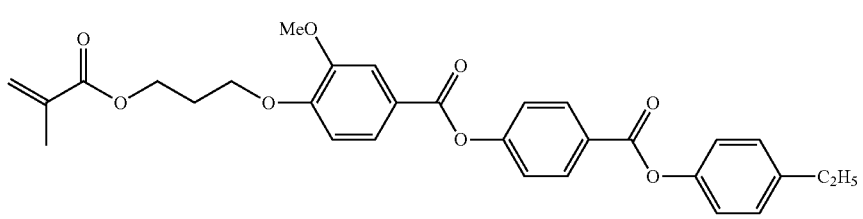
(I-134)
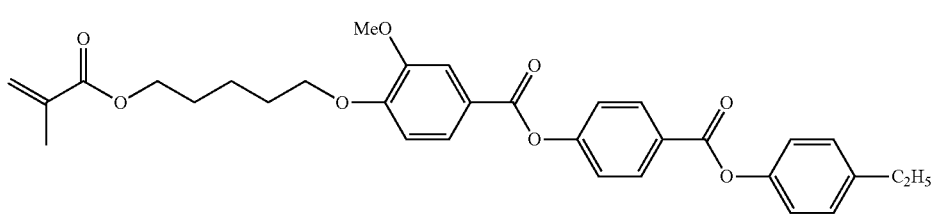
(I-135)
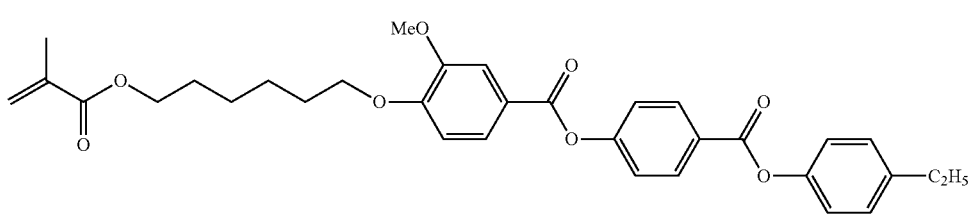
(I-136)
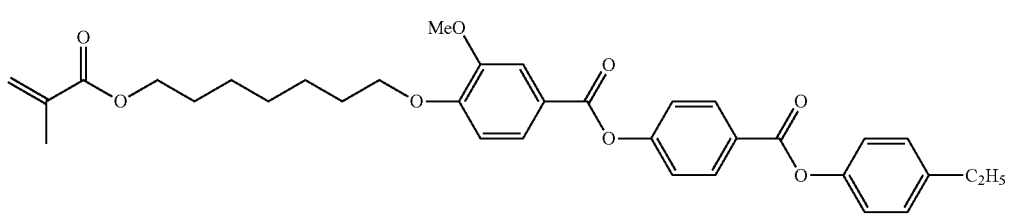
(I-137)
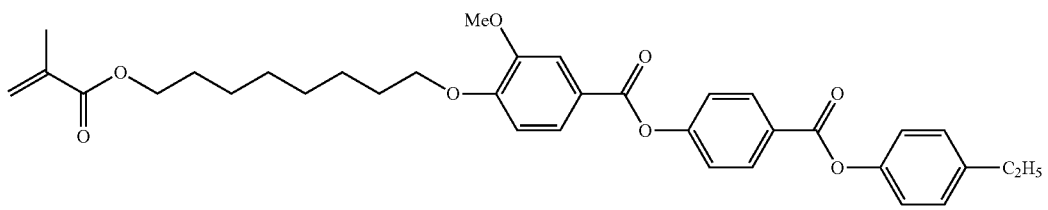
(I-138)

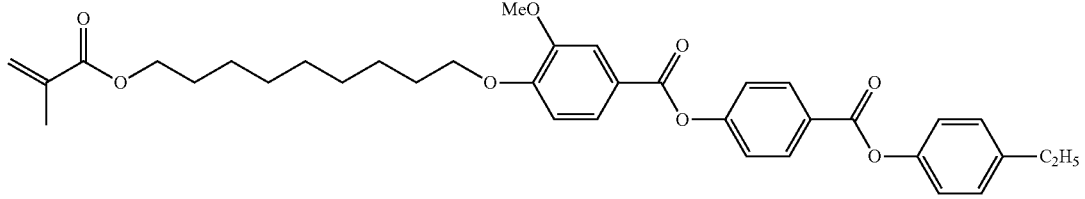
(I-139)
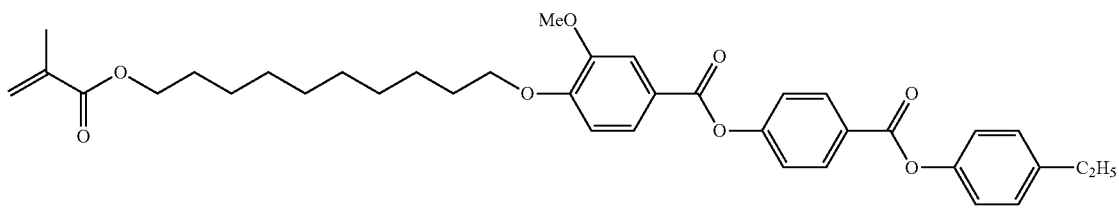
(I-140)
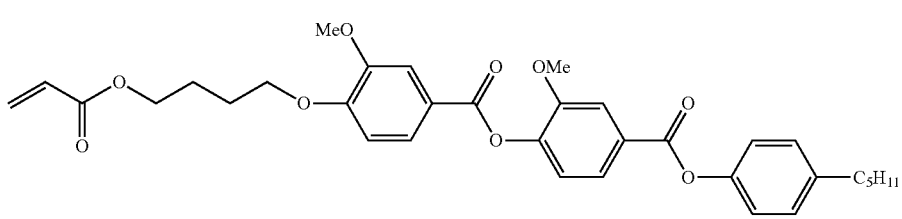
(I-141)
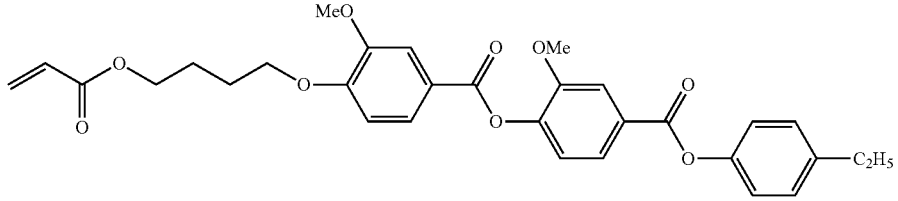
(I-142)
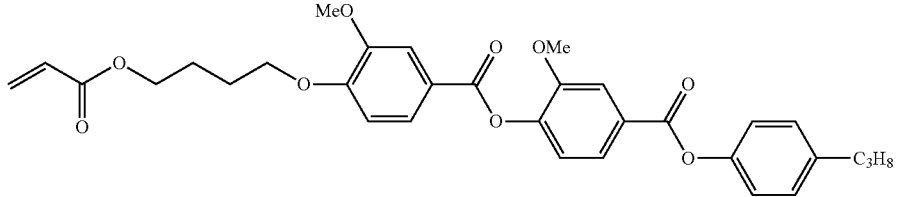
(I-143)
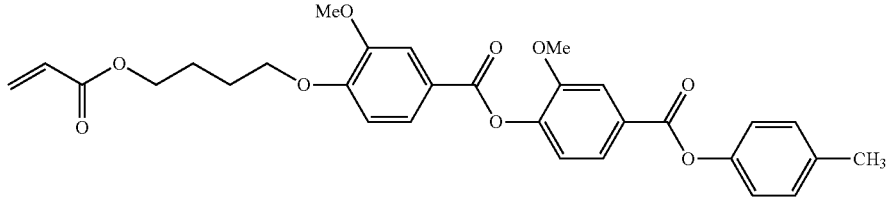
(I-144)
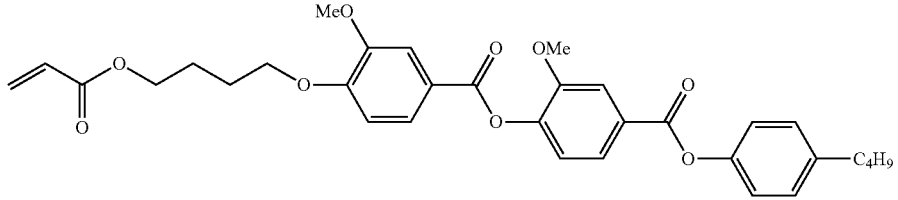
(I-145)

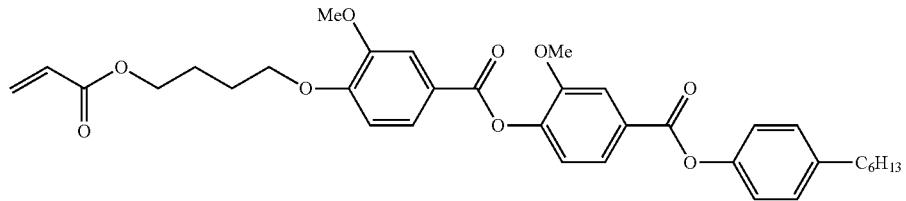
(I-146)
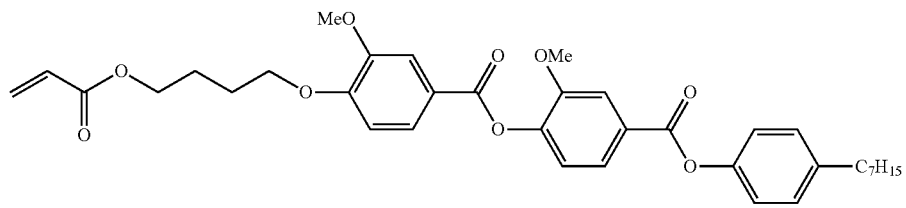
(I-147)
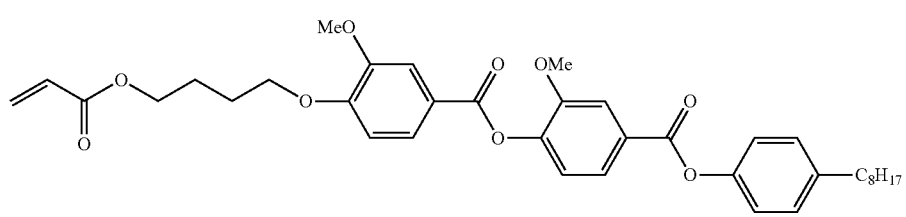
(I-148)
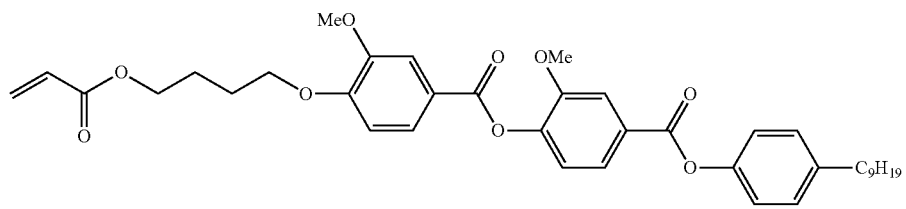
(I-149)
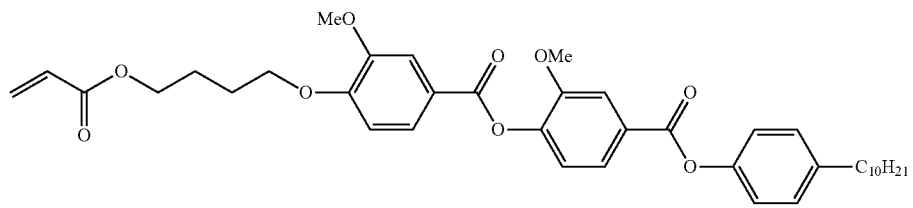
(I-150)
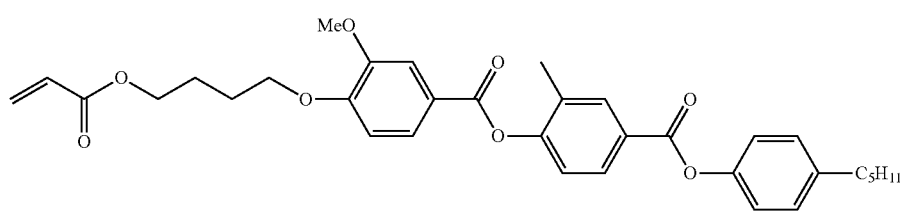
(I-151)
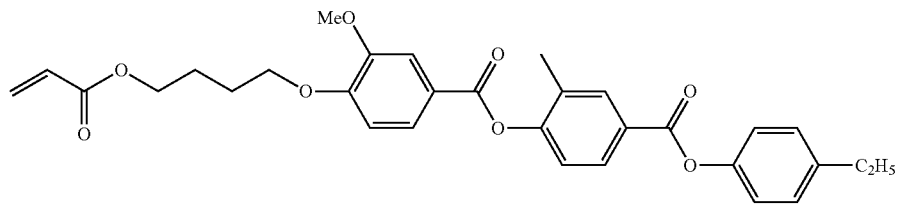
(I-152)

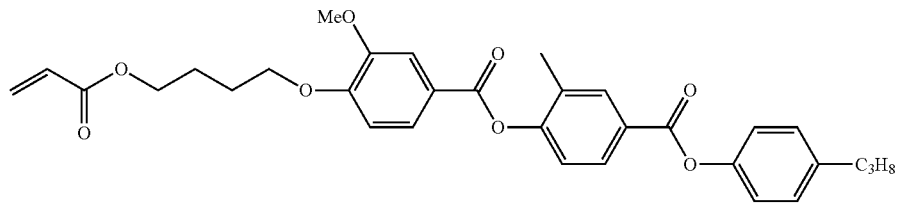
(I-153)
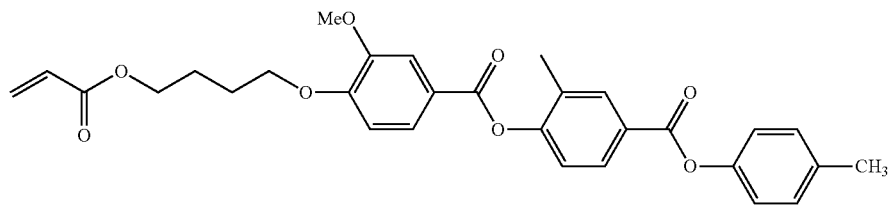
(I-154)
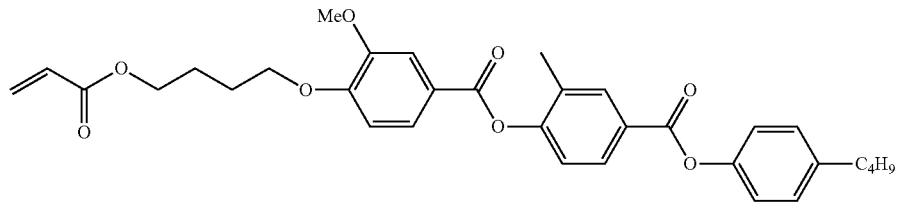
(I-155)
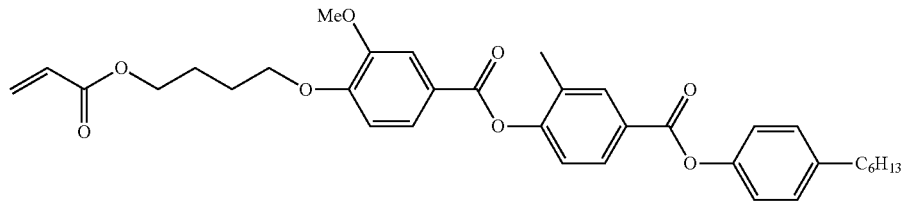
(I-156)
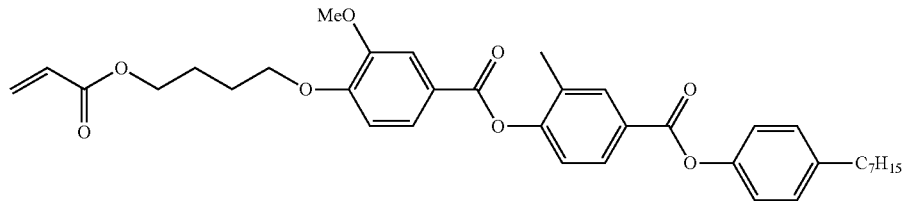
(I-157)
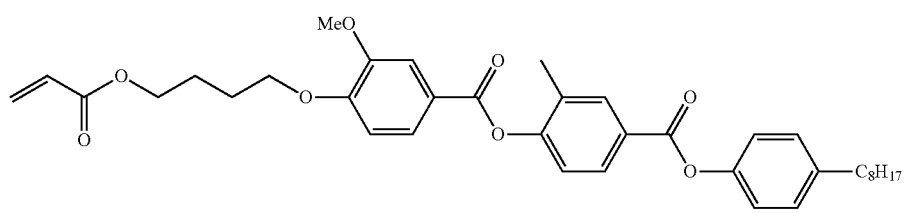
(I-158)
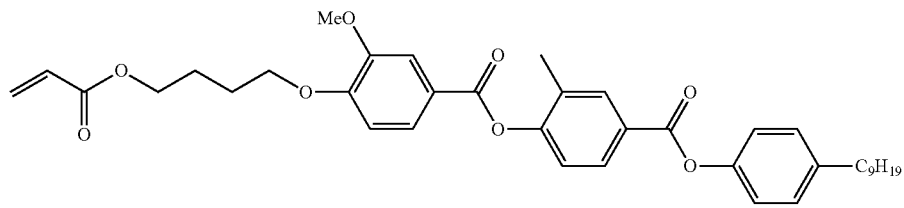
(I-159)

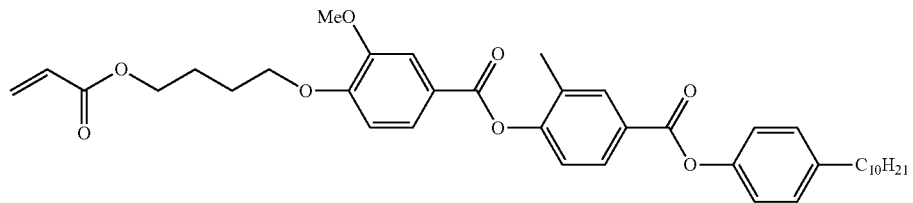
(I-160)
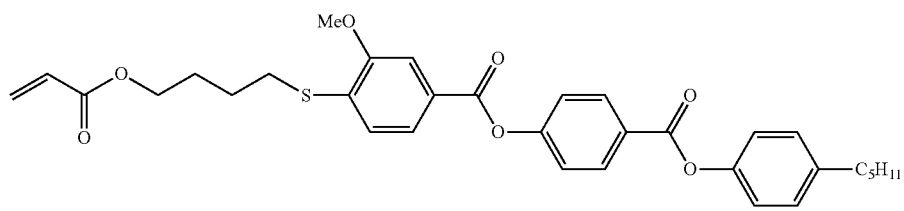
(I-181)
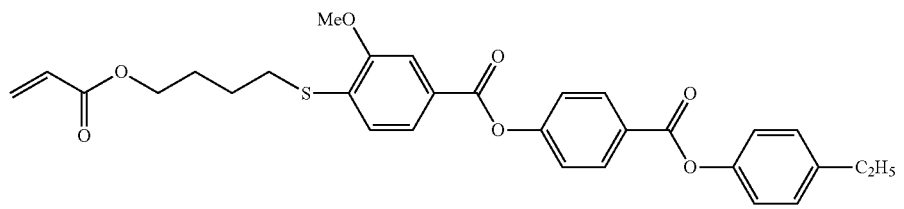
(I-182)
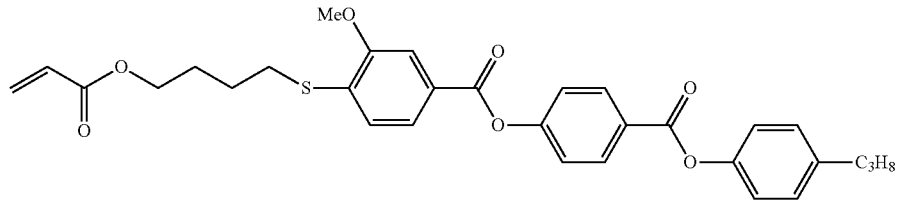
(I-183)
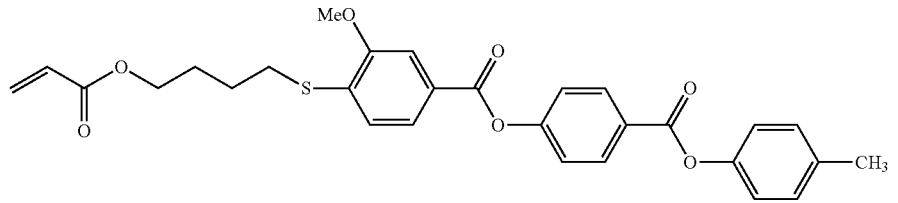
(I-184)
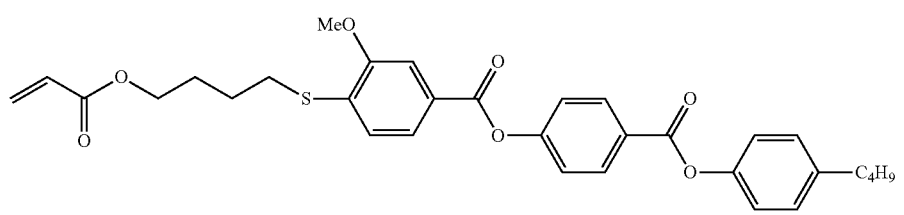
(I-185)
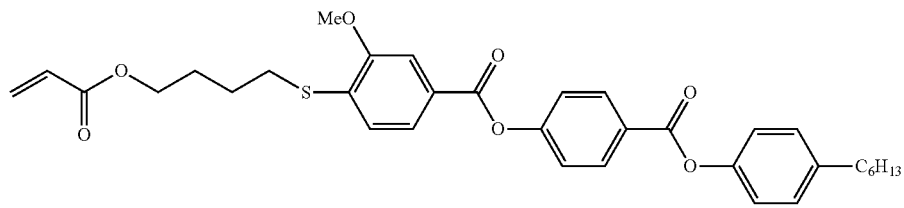
(I-186)

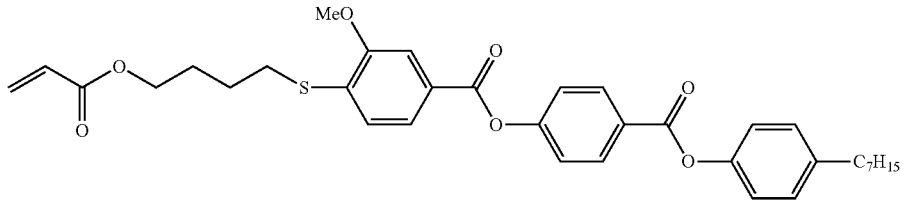
(I-187)
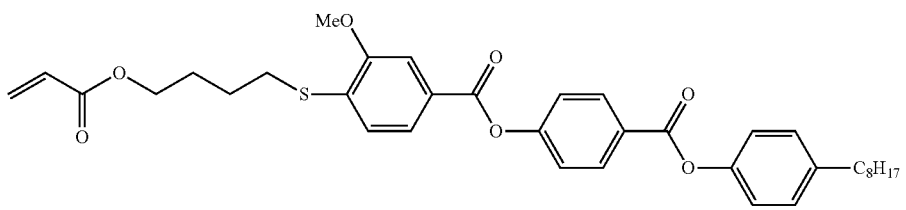
(I-188)
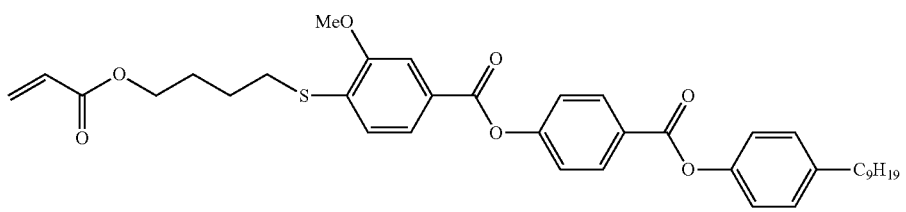
(I-189)
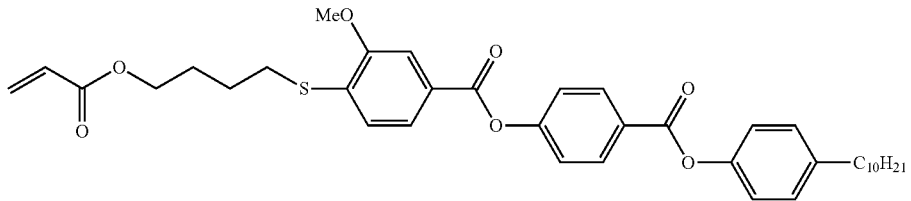
(I-190)
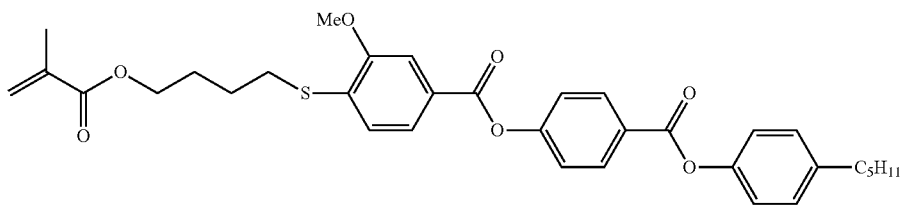
(I-191)
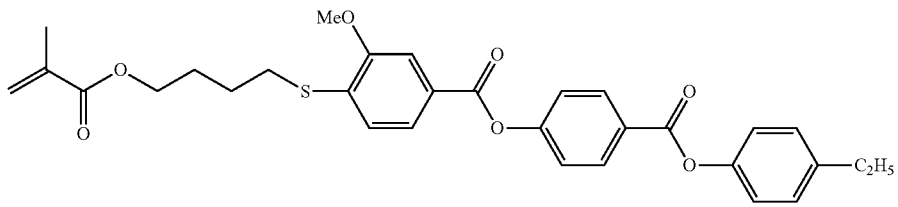
(I-192)
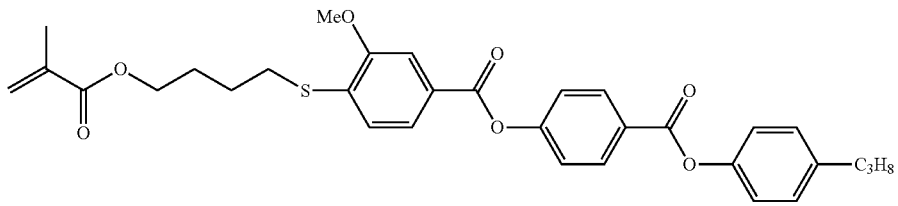
(I-193)

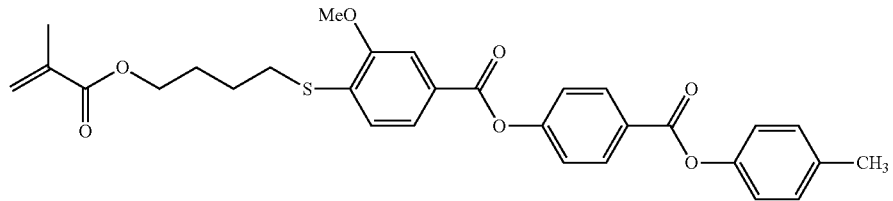
(I-194)
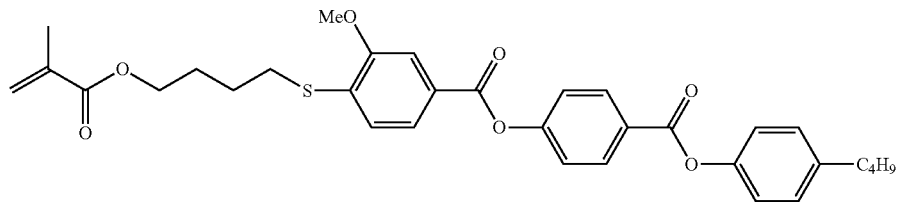
(I-195)
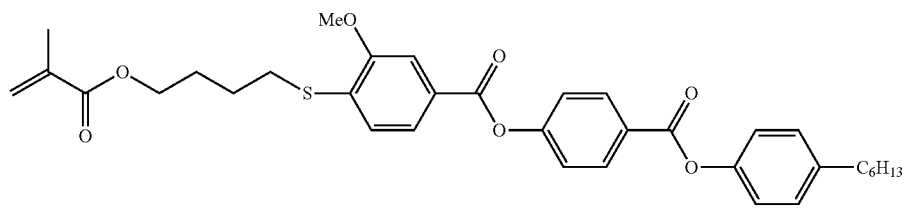
(I-196)
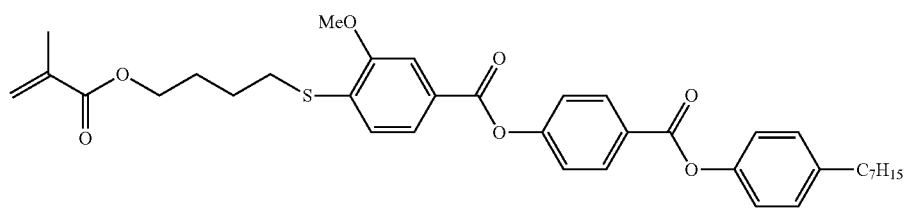
(I-197)
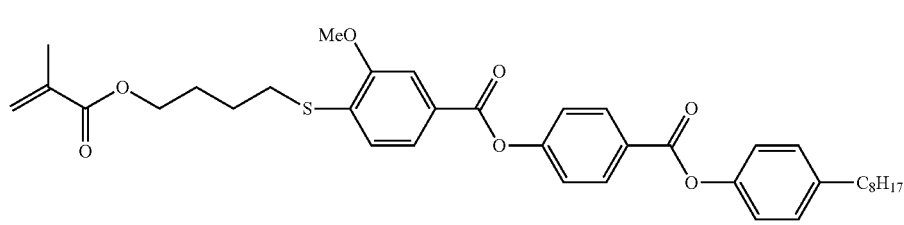
(I-198)
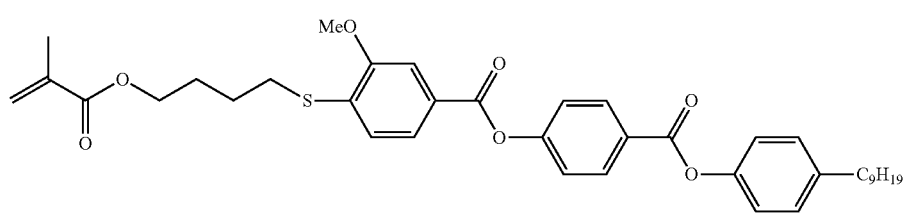
(I-199)
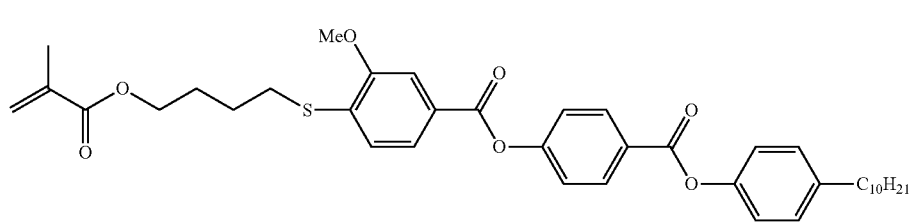
(I-200)

Preferably, in the cholesteric liquid crystal mixture of the present invention, the content of the compound represented by the above general formula (Ib) to the content of the compound represented by the above general formula (Ia) is from 5 to 40% by mass, more preferably from 10 to 30% by mass from the viewpoint of haze reduction, and even more preferably from 15 to 25% by mass. The mixture may contain any other liquid crystal compound than those of the general formula (Ia) and the general formula (Ib).

(3) Polymerization Initiator

Preferably, the composition of the present invention contains a polymerization initiator. For example, in an embodiment of promoting the curing reaction through irradiation with UV rays to give a cured film, the polymerization initiator to be used is preferably a photopolymerization initiator capable of initiating polymerization through irradiation with UV rays. Examples of the photopolymerization initiator include α-carbonyl compounds (described in U.S. Pat. Nos. 2,367,661, 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127, 2,951,758), a combination of triarylimidazole dimer and p-aminophenylketone (described in U.S. Pat. No. 3,549,367), acridine and phenazine compounds (described in JP-A 60-105667, U.S. Pat. No. 4,239,850), oxadiazole compounds (described in U.S. Pat. No. 4,212,970), acylphosphine oxide compounds (described in JP-B 63-40799, JP-B 5-29234, JP-A 10-95788, JP-A 10-29997), etc.

The amount of the photopolymerization initiator to be used is preferably from 0.1% by mass to 20% by mass of the composition (in case where the composition is a coating liquid, the solid content thereof), and more preferably from 1% by mass to 8% by mass.

<(4) Fluorine-Containing Horizontal Alignment Agent>

It is preferable that a fluorine-based alignment control agent that contributes toward stable and rapid formation of a liquid crystal phase (for example, cholesteric liquid crystal phase) be added to the cholesteric liquid crystal mixture of the present invention from a viewpoint of reducing the haze of the film to be obtained.

Examples of the fluorine-containing alignment control agent include fluoro(meth)acrylate polymers. The mixture may contain two or more fluorine-containing alignment control agents. The fluorine-containing alignment control agents may reduce the tilt angle of the molecules of a liquid crystal compound or may align the molecules thereof substantially horizontally in the air interface of the layer. In this description, "horizontal alignment" means that the major axis of the liquid crystal molecule is parallel to the film surface, but does not require that the two are strictly parallel to each other. In this description, the alignment means that the tilt angle of the molecule to the horizontal plane is less than 20 degrees. In case where a liquid crystal compound is horizontally aligned near the air interface, alignment defect would hardly occur and therefore the transparency in the visible light region could be high. On the other hand, when the molecules of a liquid crystal compound are aligned at a large tilt angle, for example, in a cholesteric liquid crystal phase, then the helical axis thereof may deviate from the normal line of the film plane and, as a result, the reflectance may lower and there may be formed finger print patterns to thereby unfavorably cause haze increase and diffraction.

Examples of the fluoro(meth)acrylate polymer usable as the above-described fluorine-containing alignment control agent are described in JP-A 2007-272185, [0018] to [0043], etc.

Examples of a liquid crystal alignment promoter that includes a discotic core and has, at the terminal thereof, a long-chain fluoroalkyl group and that is also usable as the above-described fluorine-containing alignment control agent are described in JP-A 2002-129162.

As the fluorine-containing alignment control agent, also preferred here are compounds represented by the following general formula (1):

General Formula (1)

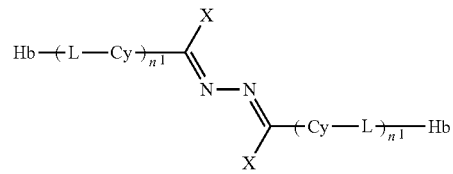

In the general formula (1), X independently represents a hydrogen atom, or an alkyl group having from 1 to 4 carbon atoms; Cy independently represents a cyclic structure-having divalent group which may optionally have a substituent; L independently represents a single bond, —O—, —CO—, —S—, —NR— (R represents a hydrogen atom or an alkyl group having from 1 to 6 carbon atoms), —SO$_2$—, —C=N—, —C=C—, —C≡C—, an alkylene group or a fluoroalkylene group, or a group of a combination of these; Hb independently represents a fluoroalkylene group having from 2 to 30 carbon atoms; n1 independently indicates 1 or 2. In the formula, multiple Hb's, L's, Cy's, X's and n1's each may be the same or different.

Preferred are compounds represented by the following general formula (2):

General Formula (2)

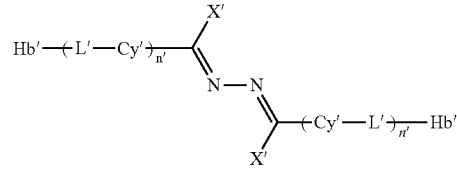

In the general formula (2), X' independently represents a hydrogen atom, or an alkyl group having from 1 to 4 carbon atoms; Cy' independently represents a cyclic structure-having divalent group which may optionally have a substituent; L' independently represents a single bond, —O—, —CO—, —S—, —NR'— (R' represents a hydrogen atom or an alkyl group having from 1 to 6 carbon atoms), —SO$_2$—, —C=N—, —C=C—, —C≡C—, an alkylene group or a fluoroalkylene group, or a group of a combination of these; Hb' independently represents a fluoroalkylene group having from 2 to 6 carbon atoms; n' independently indicates 1 or 2. In the formula, multiple (Hb')s, (L')s, (Cy')s, (X')s and (n')s each may be the same or different.

Preferred ranges of L', Cy', X', n' and R' in the general formula (2) are the same as the preferred ranges of L, Cy, X, n1 and R in the general formula (1) to be described below. The preferred range of Hb' in the general formula (2) is also the same as the preferred range of Hb in the general formula (1) to be described below except that the carbon number of the former falls within a range of from 2 to 6.

Details of the preferred structure of the haze reducer in the present invention, which is represented by the above general formula (1), are described below.

In the general formula (1), X independently represents a hydrogen atom or an alkyl group having from 1 to 4 carbon atoms. The alkyl group having from 1 to 4 carbon atoms, which X may represent, may be linear or branched. For example, there are exemplified a methyl group, an ethyl group, an n-propyl group, an isopropyl group, an n-butyl group. Among them, X is preferably a hydrogen atom, a methyl group, an ethyl group or an n-butyl group, more preferably a hydrogen atom, a methyl group or an ethyl group, even more preferably an ethyl group or a hydrogen atom. Preferably, the general formula (1) has multiple X's.

In the general formula (1), Cy independently represents a cyclic structure-having divalent group which may optionally have a substituent, and is preferably a divalent aromatic hydrocarbon group (hereinafter referred to as an aromatic group) or a divalent heterocyclic group, which may have a substituent, more preferably a divalent aromatic hydrocarbon optionally having a substituent. Preferably, the carbon number of the divalent aromatic hydrocarbon group is from 6 to 22, more preferably from 6 to 14, even more preferably from 6 to 10. Still more preferred is a phenylene group. In case where Cy is a phenylene group, preferably, the group has a chemical bond at the meta-position or the para-position, more preferably at the para-position. The divalent heterocyclic group preferably has a 5-membered, 6-membered or 7-membered heterocyclic ring. More preferred is a 5-membered heterocyclic ring or a 6-membered heterocyclic ring; and most preferred is a 6-membered heterocyclic ring. The hetero atom to constitute the heterocyclic ring is preferably a nitrogen atom, an oxygen atom and a sulfur atom. The heterocyclic ring is preferably an aromatic heterocyclic ring. The aromatic heterocyclic ring is generally an unsaturated heterocyclic ring. More preferred is an unsaturated heterocyclic ring having a largest number of double bonds. Examples of the heterocyclic ring include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazane ring, a tetrazole ring, a pyran ring, a thiine ring, a pyridine ring, a piperidine ring, an oxazine ring, a morpholine ring, a thiazine ring, a pyridazine ring, a pyrimidine ring, a pyrazine ring, a piperazine ring and a triazine ring.

The cyclic structure (preferably a divalent aromatic hydrocarbon group or a divalent heterocyclic group) represented by Cy may have a substituent except the two chemical bonds. The substitute position of the substituent is preferably any other position than the ortho-position relative to the position bonding to the azine bond. In case of n1=1, a more preferred substituent position is the meta-position relative to the position bonding to the azine bond.

Examples of the substituent includes an alkyl group having from 1 to 8 carbon atoms, an alkoxy group, a halogen atom, a cyano group, an ester group and those having the same structure as that of Hb-L- in the general formula (1).

The alkyl group as the substituent of Cy may be linear, branched or cyclic, but is preferably linear or branched. The carbon number of the alkyl group is preferably from 1 to 5, more preferably from 1 to 3. Concretely, there are exemplified a methyl group, an ethyl group, an n-propyl group, an isopropyl group, etc. For the alkyl group moiety of the alkoxy group as the substituent of and the preferred range thereof, referred to is the description of the alkyl group as the substituent of Cy described above. Concretely, there are exemplified a methoxy group, and an ethoxy group. The halogen atom as the substituent of Cy includes a fluorine atom, a chlorine atom, a bromine atom and an iodine atom. Above all, preferred are a chlorine atom and a fluorine atom. Examples of the ester group as the substituent of Cy include groups represented by $R^OCOO-$ or $-COOR^O$. $R^O$ may be an alkyl group having from 1 to 8 carbon atoms. For the description and the preferred range of the alkyl group for $R^O$, referred to are the description and the preferred range of the alkyl group as the substituent of Cy described above. Specific examples of the ester as the substituent of Cy include $CH_3COO-$, $C_2H_5COO-$ and $-COOCH_3$. The preferred range of the substituent having the same structure as that of Hb-L- in the general formula (1) as the substituent of Cy is the same as the combination of the preferred ranges of L and Hb to be described hereinunder. In this case, Cy is preferably di-substituted or tri-substituted with two or three (Hb-L-)s, and these (Hb-L-)s may be the same or different. In case where n1 is 2, multiple Cy's each may have a substituent having the same structure as that of Hb-L- in the general formula (1).

Specific examples of the substituent of the cyclic structure (preferably a divalent aromatic hydrocarbon group or a divalent heterocyclic group) represented by Cy include a methyl group, an ethyl group, a methoxy group, an ethoxy group, a fluorine atom, a chlorine atom, a cyano group, Hb-L- in the general formula (1), etc. Multiple Cy's in the general formula (1) are preferably the same. Above all, especially preferred are a methoxy group, an ethoxy group and Hb-L- in the general formula (1); and even more preferred are Hb-L- in the general formula (1).

In case where the group has Hb-L- in the general formula (1) as the substituent thereof, preferably, the substituent is positioned at the ortho-position relative to the first Hb-L- in the general formula (1). In case where the group in the formula (1) has two (Hb-L-)s as the substituents therein, preferably, both the two are substituted at the ortho-position relative to the first Hb-L- in the general formula (1).

In the general formula (1), L independently represents a single bond, $-O-$, $-CO-$, $-S-$, $-NR-$ (R represents a hydrogen atom or an alkyl group having from 1 to 6 carbon atoms), $-SO_2-$, $-C=N-$, $-C=C-$, $-C\equiv C-$, an alkylene group or a fluoroalkylene group, or a group of a combination of these, and is preferably $-O-$, $-CO-$, $-C=C-$, an alkylene group or a fluoroalkylene group, or a group of a combination of these, more preferably $-O-$, $-CO-$ or an alkylene group, or a group of a combination of these.

The carbon number of the alkylene group and the fluoroalkylene group which L may represent is preferably from 1 to 10, more preferably from 1 to 7, even more preferably from 1 to 4, still more preferably 2 or 3.

The alkyl group which R may represent may be linear or branched. Preferably, the carbon number of the alkyl group which R may represent is from 1 to 3. As the alkyl group, there are exemplified a methyl group, an ethyl group and an n-propyl group.

L may be a group of a combination of the above-described specific groups. The atom-bonding chain length of the entire L is preferably from 1 to 30 atoms, more preferably from 1 to 20 atoms, and particularly preferably from 1 to 10 atoms.

L is preferably $*-L^1-Sp-L^2-\#$ (in which * indicates the bond to Hb and # indicates the bond to Cy). Preferably, $L^1$ and $L^2$ each independently represent a single bond, —O—, —S—, —CO—, —COO—, —OCO—, —COS—, —SCO—, —NR"CO—, —CONR"— (R" represents a hydrogen atom or an alkyl group having from 1 to 6 carbon atoms), more preferably —O—, —S—, —CO—, —COO—, —OCO—, —COS— or —SCO—, even more preferably —O—, —CO—, —COO— or —OCO—. Above all, $L^1$ is preferably —O— or —OCO—, while $L^2$ is preferably —COO— or —OCO—. The alkyl group which R" may represent has the same meaning as the alkyl group which R may represent, and the preferred range of the former is the same as the preferred range of the latter.

Sp represents a single bond, an alkylene group having from 1 to 10 carbon atoms, or a fluoroalkylene group having from 1 to 10 carbon atoms, more preferably a single bond, an alkylene group having from 1 to 7 carbon atoms, or a fluoroalkylene group having from 1 to 7 carbon atoms, even more preferably a single bond, an alkylene group having from 1 to 4 carbon atoms, or a fluoroalkylene group having from 1 to 4 carbon atoms, still more preferably a single bond, or an alkylene group having from 1 to 4 carbon atoms, further more preferably a single bond or an alkylene group having 2 or 3 carbon atoms. The alkylene group or the fluoroalkylene group represented by Sp may be branched or may not be branched, but is preferably a non-branched linear alkylene group or a branched fluoroalkylene group, more preferably a non-branched linear alkylene group.

In the general formula (1), Hb represents a fluoroalkyl group having from 2 to 30 carbon atoms, and is preferably a fluoroalkyl group having from 2 to 20 carbon atoms, more preferably a fluoroalkyl group having from 2 to 10 carbon atoms, even more preferably a fluoroalkyl group having from 2 to 6 carbon atoms. Here, in the fluoroalkyl group, at most two fluorine atoms of the terminal trifluoromethyl group or one fluorine atom of the fluoroalkylene chain may be or may not be substituted with a hydrogen atom. The fluoroalkyl group may be linear, branched or cyclic, but is preferably linear or branched, more preferably linear. Preferred examples of the fluoroalkyl group include those that are entirely a perfluoroalkyl group including the terminal thereof, and those in which the terminal is $CHF_2$ and the other moiety than the terminal is a perfluoroalkylene group. Specifically, preferred are the groups represented by the following general formulae:

F—$(C_pF_{2p})$—

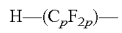

H—$(C_pF_{2p})$—

In the above formulae, p is preferably from 2 to 30, more preferably from 2 to 20, even more preferably from 2 to 10, still more preferably from 2 to 6.

In the general formula (1), n1 independently indicates 1 or 2. When n1 is 2, the multiple structures, as parenthesized, may be the same or different. For example, when n1 is 2, the four parenthesized structures existing in the molecule may be the same or different. In the general formula (1), n1 is preferably 1 from the viewpoint that the miscibility of the alignment agent is good.

The compound represented by the general formula (1) may have a symmetric molecular structure, or the molecular structure thereof may not be symmetric, but is preferably symmetric, more preferably symmetric about a point. Here the symmetry includes any one corresponding to point symmetry, line symmetry, or rotation symmetry; and the asymmetry includes any one not corresponding to any of point symmetry, line symmetry, or rotation symmetry. Here, multiple Hb's, L's, Cy's, X's and n1's, if any, in the formula (1) each may be the same or different. However, since the haze reducer represented by the general formula (1) is preferably symmetric about a point as described above, it is desirable that the groups on the left side and the right side of the core represented by —CR(X)=N—N=C(X)— in the formula form a symmetric structure. Specifically, it is desirable that the combination of Hb, L, Cy, X and n1 on the left side of the core represented by —CR(X)=N—N=C(X)— is the same as the combination of Hb, L, Cy, X and n1 on the right side of the core.

The compound represented by the general formula (1) is a compound including a combination of the above-described fluoroalkyl group (Hb), the linking group (-L-Cy- and -Cy-L-), the substituent X and the divalent azine skeleton of the core moiety. The two fluoroalkyl groups (Hb) existing in the molecule are preferably the same.

Also preferably, the linking groups -L-Cy- and -Cy-L- existing in the molecule are the same. However, when n1 is 2, it is desirable that the linking groups (-L-Cy-)'s differ from each other; and similarly, the groups (-Cy-L-)'s also differ from each other. It is desirable that the terminal group Hb-L- (preferably Hb-L-Sp-$L^2$-) is a group represented by any of the following general formulae:

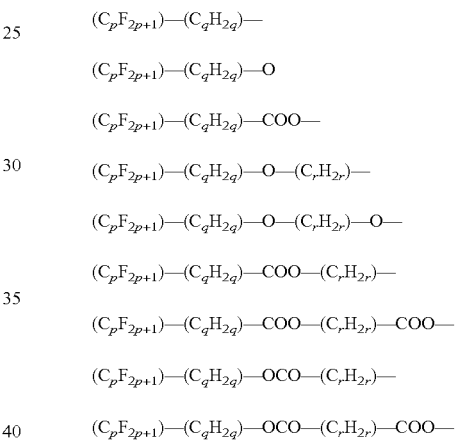

$(C_pF_{2p+1})$—$(C_qH_{2q})$—

$(C_pF_{2p+1})$—$(C_qH_{2q})$—O—

$(C_pF_{2p+1})$—$(C_qH_{2q})$—COO—

$(C_pF_{2p+1})$—$(C_qH_{2q})$—O—$(C_rH_{2r})$—

$(C_pF_{2p+1})$—$(C_qH_{2q})$—O—$(C_rH_{2r})$—O—

$(C_pF_{2p+1})$—$(C_qH_{2q})$—COO—$(C_rH_{2r})$—

$(C_pF_{2p+1})$—$(C_qH_{2q})$—COO—$(C_rH_{2r})$—COO—

$(C_pF_{2p+1})$—$(C_qH_{2q})$—OCO—$(C_rH_{2r})$—

$(C_pF_{2p+1})$—$(C_qH_{2q})$—OCO—$(C_rH_{2r})$—COO—

In the above formulae, p is preferably from 2 to 30, more preferably from 2 to 20, even more preferably from 2 to 10, still more preferably from 2 to 6. q is preferably from 0 to 20, more preferably from 0 to 10, even more preferably from 0 to 5. (p+q) is preferably from 3 to 30. r is preferably from 1 to 10, more preferably from 1 to 4.

As the fluorine-containing alignment control agent, also preferred are compounds represented by the following general formula (I):

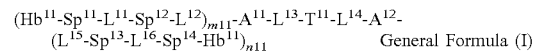

$(Hb^{11}\text{-}Sp^{11}\text{-}L^{11}\text{-}Sp^{12}\text{-}L^{12})_{m11}\text{-}A^{11}\text{-}L^{13}\text{-}T^{11}\text{-}L^{14}\text{-}A^{12}\text{-}$
$(L^{15}\text{-}Sp^{13}\text{-}L^{16}\text{-}Sp^{14}\text{-}Hb^{11})_{n11}$   General Formula (I)

In the general formula (I), $L^{11}$, $L^{13}$, $L^{13}$, $L^{14}$, $L^{15}$ and $L^{15}$ each independently represent a single bond, —O—, —S—, —CO—, —COO—, —OCO—, —COS—, —SCO—, —NRCO—, or —CONR— (R in the general formula (I) represents a hydrogen atom or an alkyl group having from 1 to 6 carbon atoms). Since —NRCO— and —CONR— have an effect of reducing the solubility of the compound and tend to increase the haze in film formation, preferred are —O—, —S—, —CO—, —COO—, —OCO—, —COS— and —SCO—. From the viewpoint of the stability of the compound, more preferred are —O—, —CO—, —COO— and —OCO—. The alkyl group which R may represent may be linear or branched. The carbon number of the group is preferably from 1 to 3; and there are exemplified a methyl group, an ethyl group and an n-propyl group.

$Sp^{11}$, $Sp^{12}$, $Sp^{13}$ and $Sp^{14}$ each independently represent a single bond or an alkylene group having from 1 to 10 carbon atom, preferably a single bond or an alkylene group having from 1 to 7 carbon atoms, more preferably a single bond or an alkylene group having from 1 to 4 carbon atoms. However, the hydrogen atom of the alkylene group may be substituted with a fluorine atom. The alkylene group may be branched or may not be branched, but is preferably a non-branched linear alkylene group. From the viewpoint of producing the compound, it is desirable that $Sp^{11}$ and $Sp^{14}$ are the same and $Sp^{12}$ and $Sp^{13}$ are the same.

$A^{11}$ and $A^{12}$ each represent a trivalent or tetravalent aromatic hydrocarbon. Preferably, the carbon number of the trivalent or tetravalent aromatic hydrocarbon group is from 6 to 22, more preferably from 6 to 14, even more preferably from 6 to 10, still more preferably 6. The trivalent or tetravalent aromatic hydrocarbon group represented by $A^{11}$ and $A^{12}$ may have a substituent. Examples of the substituent include an alkyl group having from 1 to 8 carbon atoms, an alkoxy group, a halogen atom, a cyano group and an ester group. For the description and the preferred ranges of these groups, referred to is the corresponding description of T described below. The substituent for the trivalent or tetravalent aromatic hydrocarbon group represented by $A^{11}$ and $A^{12}$ includes, for example, a methyl group, an ethyl group, a methoxy group, an ethoxy group, a bromine atom, a chlorine atom, a cyano group, etc. A molecule having many perfluoroalkyl moieties therein can well align liquid crystal molecules even though its amount added is small, and therefore addition of such a molecule could bring about haze reduction. Preferably, therefore, $A^{11}$ and $A^{12}$ each are a tetravalent group so that the molecule could have a majority of perfluoroalkyl groups therein. From the viewpoint of easy production of the compound, preferably, $A^{11}$ and $A^{12}$ are the same.

$T^{11}$ represents a divalent group represented by any of the following, or represents a divalent aromatic heterocyclic group.

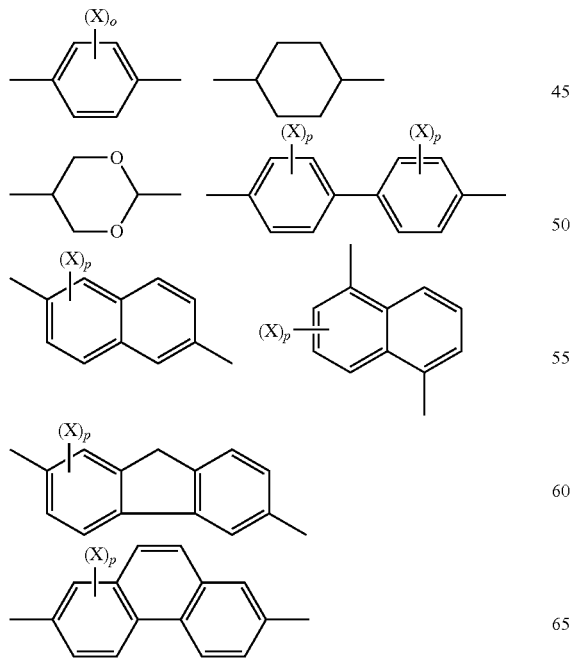

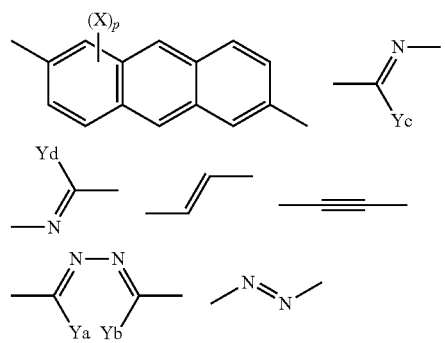

(X in the above $T^{11}$ represents an alkyl group having from 1 to 8 carbon atoms, an alkoxy group, a halogen atom, a cyano group or an ester group; Ya, Yb, Yc and Yd each independently represent a hydrogen atom or an alkyl group having from 1 to 4 carbon atoms.) More preferably, $T^{11}$ represents:

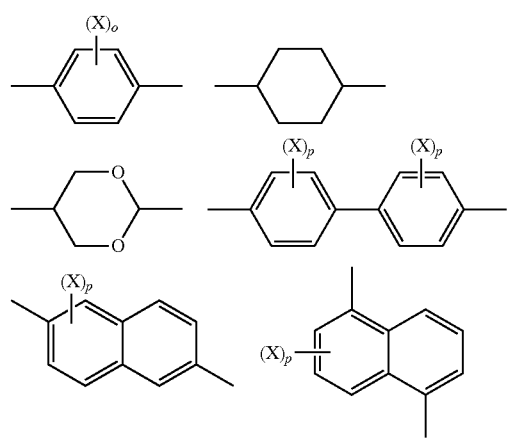

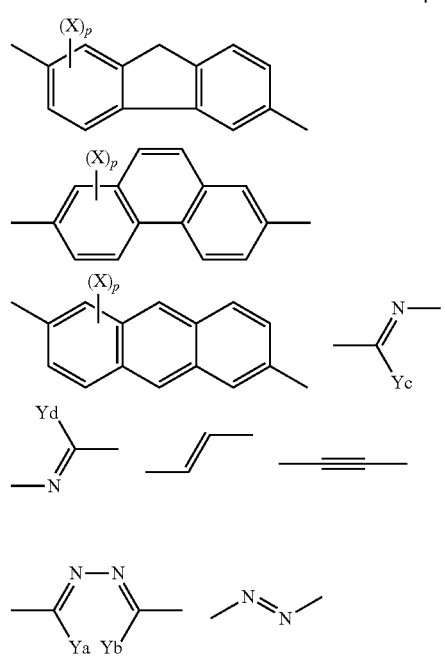

Even more preferably, $T^{11}$ represents:

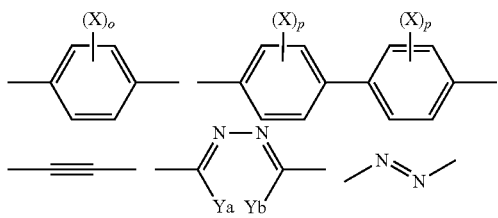

Still more preferably, $T^{11}$ represents:

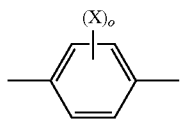

The carbon number of the alkyl group which X in the above $T^{11}$ may represent is from 1 to 8, preferably from 1 to 5, more preferably from 1 to 3. The alkyl group may be linear, branched or cyclic, but is preferably linear or branched. Preferred examples of the alkyl group include a methyl group, an ethyl group, an n-propyl group, an isopropyl group, etc. Of those, preferred is a methyl group. For the description and the preferred range of the alkyl moiety of the alkoxy group which X in the above $T^{11}$, referred to are the description and the preferred range of the alkyl group which X in the above $T^{11}$ may represent. The halogen atom which X in the above $T^{11}$ may represent includes a fluorine atom, a chlorine atom, a bromine atom and an iodine atom. Preferred are a chlorine atom and a bromine atom. As the ester group which X in the above $T^{11}$ may represent, there is exemplified a group represented by R'COO—. R' may be an alkyl group having from 1 to 8 carbon atoms. For the description and the preferred range of the alkyl group which R' may represent, referred to are the description and the preferred range of the alkyl group which X in the above $T^{11}$ may represent. Specific examples of the ester group include $CH_3COO$— and $C_2H_5COO$—. The alkyl group with from 1 to 4 carbon atom, which Ya, Yb, Yc and Yd each may represent, may be linear or branched. For example, there are exemplified a methyl group, an ethyl group, an n-propyl group, an isopropyl group, etc.

Preferably, the divalent aromatic heterocyclic group has a 5-membered, 6-membered or 7-membered heterocyclic ring. More preferred is a 5-membered or 6-membered ring; and most preferred is a 6-membered ring. The hetero atom to constitute the heterocyclic ring is preferably a nitrogen atom, an oxygen atom and a sulfur atom. The heterocyclic ring is preferably an aromatic heterocyclic ring. The aromatic heterocyclic ring is generally an unsaturated heterocyclic ring. More preferred is an unsaturated heterocyclic ring having a largest number of double bonds. Examples of the heterocyclic ring include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazane ring, a tetrazole ring, a pyran ring, a thiine ring, a pyridine ring, a piperidine ring, an oxazine ring, a morpholine ring, a thiazine ring, a pyridazine ring, a pyrimidine ring, a pyrazine ring, a piperazine ring and a triazine ring. The divalent heterocyclic group may have a substituent. For the description and the preferred range of the substituent, referred to is the description relating to the substituent which the trivalent or tetravalent aromatic hydrocarbon for the above $A^1$ and $A^2$ may have.

$Hb^{11}$ represents a perfluoroalkyl group having from 2 to 30 carbon atoms, preferably a perfluoroalkyl group having from 3 to 20 carbon atoms, more preferably a perfluoroalkyl group having from 3 to 10 carbon atoms. The perfluoroalkyl group may be linear, branched or cyclic, but is preferably linear or branched, more preferably linear.

m11 and n11 each independently indicate from 0 to 3, and m11+n11≥1. Multiple parenthesized structures, if any, may be the same or different, but are preferably the same. m11 and n11 in the general formula (I) are defined by the valence of the above A11 and A212, and the preferred ranges thereof are also defined by the valence of A11 and A212.

o and p contained in $T^{11}$ each independently indicate an integer of 0 or more. When the formula has 2 or more o's and p's, then multiple X's maybe the same or different. Preferably, o in T11 is 1 or 2. Preferably, p in $T^{11}$ is an integer of from 1 to 4, more preferably 1 or 2.

The compound represented by the general formula (I) may have a symmetric molecular structure, or may be asymmetric. Here the symmetry includes any one corresponding to point symmetry, line symmetry, or rotation symmetry; and the asymmetry includes any one not corresponding to any of point symmetry, line symmetry, or rotation symmetry.

The compound represented by the general formula (I) is a compound including a combination of the above-described perfluoroalkyl group ($Hb^{11}$), the linking groups -(-$Sp^{11}$-$L^{11}$-$Sp^{12}$-$L^{12}$)$_{m11}$-$A^{11}$-$L^{13}$- and -$L^{14}$-$A^{12}$-($L^{15}$-$Sp^{13}$-$L^{16}$-$Sp^{14}$-)$_{n11}$-, and the divalent group T preferably having an excluded volume effect. The two perfluoroalkyl groups ($Hb^{11}$)'s existing in the molecule are preferably the same; and the linking groups -(-$Sp^{11}$-$L^{11}$-$Sp^{12}$-$L^{12}$)$_{m11}$-$A^{11}$-$L^{13}$- and -$L^{14}$-$A^{12}$-($L^{15}$-$Sp^{13}$-$L^{16}$-$Sp^{14}$)$_{n11}$- existing in the molecule are also preferably the same. Preferably, the terminal $Hb^{11}$-$Sp^{11}$-$L^{11}$-$Sp^{12}$- and -$Sp^{13}$-$L^{16}$-$Sp^{14}$-$Hb^{11}$ each are a group represented by any of the following general formulae:

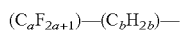

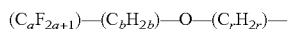

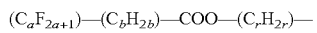

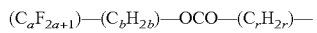

In the above formulae, a is preferably from 2 to 30, more preferably from 3 to 20, even more preferably from 3 to 10. b is preferably from 0 to 20, more preferably from 0 to 10, even more preferably from 0 to 5. a+b is from 3 to 30. r is preferably from 1 to 10, more preferably from 1 to 4.

The terminal $Hb^{11}$-$Sp^{11}$-$L^{11}$-$Sp^{12}$-$L^{12}$- and -$L^{14}$-$Sp^{13}$-$L^{16}$-$Sp^{14}$-$Hb^{11}$ in the general formula (I) each are preferably a group represented by any of the following general formulae:

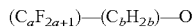

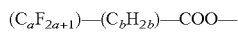

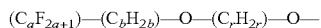

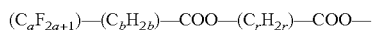

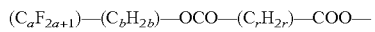

In the above formulae, the definitions of a, b and r are the same as the definitions thereof given above.

The amount of the fluorine-containing horizontal alignment agent to be added to the IR reflection layer that constitutes the liquid crystal film for use in the laminate of the present invention is preferably from 0.01 to 10% by mass relative to the polymerizable liquid crystal compound therein more preferably from 0.01 to 5% by mass, even more preferably from 0.01 to 1% by mass, still more preferably from 0.01 to 0.09% by mass, further more preferably from 0.01 to 0.06% by mass.

In the IR reflection layer that constitutes the liquid crystal film for use in the laminate of the present invention, more preferably, the fluorine-containing horizontal alignment agent contains a perfluoroalkyl group from the viewpoint of controlling the amount to be added of the fluorine-containing horizontal alignment agent to fall within the above range, and more preferably, the agent contains a perfluoroalkyl group having from 3 to 10 carbon atoms.

(5) Other Components

The liquid crystal mixture of the present invention may contain, if desired, a solvent, an optically-active compound containing an asymmetric carbon atoms (chiral agent) and any other additive (for example, cellulose ester), in addition to the compound represented by the above-described general formulae (Ia) and (Ib), the fluorine-containing horizontal alignment control agent and the polymerization initiator.

Solvent:

As the solvent of the liquid crystal mixture of the present invention, preferred is use of an organic solvent. Examples of the organic solvent include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone, cyclohexanone), ethers (e.g., tetrahydrofuran, 1,2-dimethoxyethane). Preferred are alkyl halides and ketones. Two or more different types of organic solvents may be used here as combined.

Optically-Active Compound (Chiral Agent):

It is desirable that the liquid crystal mixture of the present invention exhibits a cholesteric liquid crystal phase, and for this, the mixture preferably contains an optically-active compound. However, when the above-described rod-shaped liquid crystal compound is a molecule having an asymmetric carbon atoms, then the mixture could stably form a cholesteric liquid crystal phase even though an optically-active compound is not added thereto. The optically-active compound maybe selected from various types of known chiral agents (for example, described in Liquid crystal Device Handbook, Chap. 3, Sec. 4-3, TN, STN Chiral Agents, p. 199, edited by the Japan Society for the Promotion of Science, No. 142 Committee, 1989). An optically-active compound generally contains an asymmetric carbon, but an axial asymmetric compound or a planar asymmetric compound may also be employable here as a chiral agent. Examples of the axial asymmetric compound or the planar asymmetric compound include binaphthyl, helicene, paracyclophane and their derivatives. The optically-active compound (chiral agent) may have a polymerizable group. In case where the optically-active compound has a polymerizable group and where the rod-shaped liquid crystal compound to, be used here along with the optically-active compound also has a polymerizable group, the polymerization reaction of the polymerizable optically-active compound and the polymerizable rod-shaped compound gives a polymer having a recurring unit derived from the rod-shaped liquid crystal compound and the recurring unit derived from the optically-active compound. In this embodiment, it is desirable that the polymerizable group which the polymerizable optically-active compound has is the same type of the polymerizable group which the polymerizable rod-shaped liquid crystal compound has. Accordingly, it is desirable that the polymerizable group of the optically-active compound is also an unsaturated polymerizable group, an epoxy group or an aziridinyl group, more preferably an unsaturated polymerizable group, even more preferably an ethylenic unsaturated polymerizable group.

The optically-active compound may be a liquid crystal compound.

Preferably, the amount of the optically-active compound in the liquid crystal mixture of the present invention is from 1 to 30 mol % relative to the liquid crystal compound to be in the mixture. It is desirable that the amount of the optically-active compound to be used is smaller as capable of reducing the influence of the compound on the liquid crystallinity. Consequently, the optically-active compound that is used here as a chiral agent is preferably one having a high torsion strength in order to attain the intended helical pitch torsion alignment even though its amount is small. As the chiral agent having such a high torsion strength, for example, there are described the chiral agents described in JP-A 2003-287623, and these are favorably used in the present invention.

[Film]

The film of the present invention includes a liquid crystal film obtained by fixing a cholesteric liquid crystal phase formed by polymerizing the cholesteric liquid crystal mixture of the present invention.

It is preferable that the film of the present invention include a support, or a liquid crystal film obtained by fixing the cholesteric liquid crystal phase formed by polymerizing the cholesteric liquid crystal mixture of the present invention on the support.

The film may be formed according to a method of coating with the liquid crystal mixture of the present invention. The liquid crystal mixture of the present invention may be applied onto an alignment film to form a liquid crystal layer thereon, thereby producing an optically-anisotropic device. The film of the present invention preferably exhibits optical anisotropy.

Coating with the liquid crystal mixture of the present invention may be attained in known methods (e.g., extrusion coating method, direct gravure coating method, reverse gravure coating method, die coating method, bar coating method, and spin coating method). Preferably, the liquid crystal molecules are fixed while the alignment state thereof is maintained as such. Preferably, the fixation is attained by polymerization of the polymerizable group introduced into the liquid crystal molecule.

The polymerization includes thermal polymerization using a thermal polymerization initiator and photopolymerization using a photopolymerization initiator. Preferred is photopolymerization.

Preferably, UV rays are sued for photoirradiation for polymerization of the liquid crystal molecule. Preferably, the irradiation energy is from 20 $mJ/cm^2$ to 50 $J/cm^2$, more preferably from 100 to 800 $mJ/cm^2$. For promoting the photopolymerization, the photoirradiation may be attained under heat. Preferably, the thickness of the liquid crystal layer is from 0.1 to 50 μm, more preferably from 1 to 30 m, most preferably from 2 to 20 μm. The amount of the haze reducer represented by the above-described general formula (1) to be in the liquid crystal layer is preferably from 0.1 to 500 mg/m$^2$, more preferably from 0.5 to 450 mg/m$^2$, even more preferably from 0.75 to 400 mg/m$^2$, most preferably from 1.0 to 350 mg/m$^2$.

One example of the production method includes at least the following:

(A) applying the composition containing an alignment control agent and a polymerizable (curable) liquid crystal compound onto the surface of a support such as a transparent thermoplastic resin film or the like, and making a state of a cholesteric liquid crystal phase, (B) promoting the curing reaction of the liquid crystal mixture of the present invention through irradiation with UV rays to thereby fix the cholesteric liquid crystal phase to form an IR reflection layer.

Figure 4:
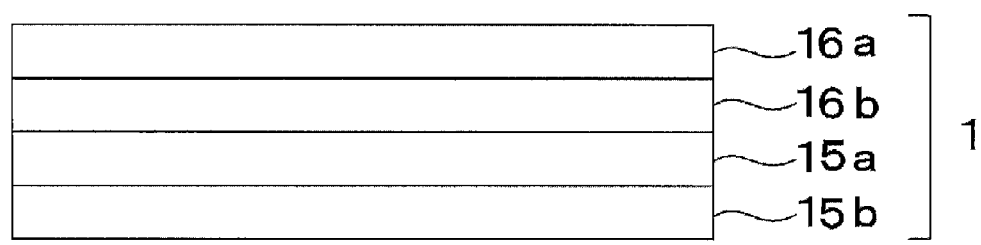
FIG. 4 is a schematic view showing a cross section of one example of the liquid crystal layer contained in the film of the present invention in which the cholesteric liquid crystal phase is fixed.

The process (A) and (B) are repeated four times on one surface of the support, thereby forming on the support a liquid crystal layer having a cholesteric liquid crystal phase fixed therein as shown in FIG. 4 (in FIG. 4, the support is not shown). Further repeating the process gives a liquid crystal film (IR reflection layer) in which the number of the laminated layers is increased and in which a cholesteric liquid crystal phase is fixed.

Preferably, the undercoat layer is formed on the surface of the support such as a transparent thermoplastic resin film or the like, by coating. The coating method is not specifically defined, for which employable is any known method.

The alignment layer may be provided according to a means of rubbing treatment of an organic compound (preferably, polymer), oblique vapor deposition of an inorganic compound, formation of a layer having microgrooves, etc. Further, there is known an alignment layer capable of being given an alignment function through impartation thereto of an electric field or impartation thereto of a magnetic field or through photoirradiation. Preferably, the alignment layer is formed by rubbing the surface of a polymer film. Also preferably, the alignment film is peeled away along with the support to be described below.

Process (A)

In the above process (A), first, the liquid crystal mixture of the present invention is applied onto the surface of a substrate or onto the surface of the underlying IR reflection layer. The liquid crystal mixture of the present invention is preferably prepared as a coating liquid by dissolving and/or dispersing the materials in a solvent. Coating with the coating liquid may be attained in various methods such as a wire bar coating method, an extrusion coating method, a direct gravure coating method, a reverse gravure coating method, a die coating method, etc. Also employable here is an inkjet apparatus where the liquid crystal mixture of the present invention is jetted out through the nozzle to form a coating film.

Next, the liquid crystal mixture of the present invention applied to the surface to be a coating film is processed to be a cholesteric liquid crystal phase. In the embodiment where the liquid crystal mixture of the present invention is prepared as a coating liquid that contains a solvent, the coating film is dried and the solvent is removed, whereby the coating film may be converted into a state having a cholesteric liquid crystal phase. For making the coating film to have a transition temperature at which the coating film is converted into a cholesteric liquid crystal phase, the coating film may be optionally heated. For example, once the coating film is heated up to a temperature of the isotropic phase thereof, and then it is cooled down to a cholesteric liquid crystal phase transition temperature, whereby the coating film could be stably converted into a state of cholesteric liquid crystal phase. The liquid crystal phase transition temperature of the liquid crystal mixture of the present invention is preferably within a range of from 10 to 250° C. from the viewpoint of the production aptitude, more preferably from 10 to 150° C. When the temperature is lower than 10° C., then the production process would require a cooling process for lowering the coating film to a temperature range in which the film could exhibit a liquid crystal phase. On the other hand, when the temperature is higher than 200° C., the process would require a high temperature in order that the coating film could be in an isotropic liquid state at a further higher temperature than the temperature range in which the film could be once a liquid crystal phase, and such is unfavorable from the viewpoint of heat energy wasting, substrate deformation, degradation, etc.

Process (B)

Next, in the process (B), the coating film that has become a state of a cholesteric liquid crystal phase is cured through irradiation with UV rays. For UV irradiation, usable is a light source of a UV lamp or the like. In this process, the coating film is irradiated with UV rays whereby the liquid crystal mixture of the present invention is cured and the cholesteric liquid crystal phase is thereby fixed to form an IR reflection layer.

The energy dose in irradiation with UV rays is not specifically defined. In general, preferred is a dose of from 100 mJ/cm$^2$ to 800 mJ/cm$^2$. The time for which the coating film is irradiated with UV rays is not also specifically defined. The time may be determined from the viewpoint of both the sufficient strength of the cured film and the productivity thereof.

For accelerating the curing reaction, the UV irradiation may be carried out under heat. Preferably, the temperature in irradiation with UV rays is kept in a range of a liquid crystal phase temperature so as not to disturb the liquid crystal phase of the film. The oxygen concentration in the atmosphere participates in the degree of polymerization, and therefore, in case where the reaction could not secure the desired degree of polymerization in air and where the film strength is therefore insufficient, it is desirable that the oxygen concentration in the atmosphere is reduced according to a nitrogen-purging method or the like. The oxygen concentration is preferably 10% or less, more preferably 7% or less, and most preferably 3% or less. The reaction yield of the curing reaction (for example, polymerization reaction), which is promoted through irradiation with UV rays, is preferably 70% or more, more preferably 80% or more, and still more preferably 90% or more from the viewpoint of holding the mechanical strength of the layers, suppressing the outflow of unreacted substances from the layers and the like. In order to improve the reaction yield, a method for increasing the radiation dose of UV rays or polymerization in a nitrogen atmosphere or under heating conditions is effective. In addition, it is also possible to use a method in which the composition is temporarily polymerized, and then held in a higher temperature state than the polymerization temperature, thereby further progressing the reaction through thermal polymerization or a method in which UV rays are radiated again (in this case, UV rays should be radiated under the conditions satisfying the present invention) The reaction yield can be measured by comparing the absorption intensities in the IR vibration spectra of the reactive group (for example, polymerizable group) before and after the reaction.

In the above process, the cholesteric liquid crystal phase is fixed to form the IR reflection layer. Here, regarding the "fixed" state of the liquid crystal phase, a condition where the alignment of the liquid crystal compound that exhibits the cholesteric liquid crystal phase is maintained as such is a most typical and preferred embodiment. However, not limited thereto but concretely, the fixed state means that the layer has no more fluidity in a temperature range of generally from 0° C. to 50° C., but from −30° C. to 70° C. in a more severe condition, and can continue to stably keep the fixed alignment state thereof without providing any change in the alignment state by any external field or external force. In the present invention, the alignment state of the cholesteric liquid crystal phase is fixed by the curing reaction that is promoted through irradiation with UV rays.

In the present invention, it is enough that the optical properties of the cholesteric liquid crystal phase are maintained in the layer, and finally the liquid crystal mixture in the IR reflection layer would not need to exhibit any more the liquid crystallinity. For example, the liquid crystal mixture is polymerized to have an increased molecular weight through the curing reaction to thereby have no more liquid crystallinity.

Other important properties of the laminate of the present invention and the laminated glass of the present invention to be described below in use thereof for an IR reflection plate are the visible light transmittance and the haze thereof. It is possible to provide IR reflection plates exhibiting a preferred visible light transmittance and a preferred haze by suitably selecting the materials and controlling the production conditions in accordance with the intended use of the IR reflection plates. For example, in an embodiment of use that requires a high visible light transmittance, there may be provided an IR reflection plate which has a visible light transmittance of 90% or more and of which the reflectance of the infrared light satisfies the above-described reaction.

(Other Constituent Layers of Film)

In addition to the above-described configuration, the film of the present invention may have a non-light-reflective layer containing an organic material and/or an inorganic material. Examples of the non-light-reflective layer usable in the present invention include an adhesion-improving layer and an adhesive layer that facilitate adhesion of the film to other members (for example, glass plates).

Other examples of the non-light-reflective layer usable in the present invention may include an undercoat layer that may be provided in forming the IR reflection layer of the cholesteric liquid crystal phase, and an alignment layer that is used in forming the IR reflection layer for more accurately defining the alignment direction of the liquid crystal compound.

Adhesive Layer:

As described above, the film of the present invention may have an adhesive layer.

Not going against the spirit of the present invention, the adhesive for use in the present invention may be any general adhesive including acrylic materials, polyesters, polyurethanes, polyolefins, polyvinyl alcohols, etc. Of those, especially preferred for use in the present invention are polyesters and acrylic materials; and even more preferred are acrylic materials.

The adhesive may be a commercially-available one; and examples of the adhesive preferred for use in the present invention include Sanritz's PET-W and Panac's PD-S1.

The thickness of the adhesive layer may be, for example, from 0.1 to 5.0 μm.

Adhesion-Improving Layer:

The adhesion-improving layer has a function of improving the adhesion between the IR reflection layer and the adhesive layer. The material usable for forming the adhesion-improving layer includes a polyvinyl butyral (PVB) resin. The polyvinyl butyral resin is a type of polyvinyl acetal that is formed through reaction of polyvinyl alcohol (PVA) and butylaldehyde in the presence of an acid catalyst, and has a recurring unit having the following structure.

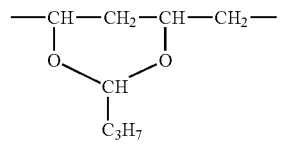

The adhesion-improving layer may also be a so-called undercoat layer that includes an acrylic resin, a styrene/acrylic resin, an urethane resin, a polyester resin or the like. The adhesion-improving resin of the material may be formed by coating. Some commercially-available films may have an undercoat layer formed therein, and such commercial products may be used as the substrate in the present invention. Further, a UV absorbent, an antistatic agent, a lubricant, a blocking inhibitor or the like may be added to the adhesion-improving layer.

The thickness of the adhesion-improving layer is preferably from 0.1 μm to 5.0 μm.

Undercoat Layer:

The film of the present invention may have an undercoat layer on the side of the IR reflection layer. In general, the IR reflection layer is provided preferably on the support; and this is because, depending on the type of the support used in the case, it is often desirable that the IR reflection layer is provided on the undercoat layer formed on the support.

Examples of the material usable in forming the undercoat layer include acrylate copolymer, polyvinylidene chloride, styrene-butadiene rubber (SBR), aqueous polyester, etc. In an embodiment where the surface of the undercoat layer is stuck to an interlayer film, it is desirable that the adhesion between the undercoat layer and the interlayer film is good; and from the viewpoint, it is desirable that the undercoat layer contains a polyvinyl butyral resin in addition to the above-described material. In addition, since the adhesion power of the undercoat layer must be suitably controlled as described above, it is desirable that the layer is cured with a suitable curing agent, for example, with a dialdehyde such as glutaraldehyde, 2,3-dihydroxy-1,4-dioxane or the like, or with boric acid or the like. The amount of the curing agent to be added is preferably from 0.2% by mass to 3.0% by mass of the dry mass of the undercoat layer.

Preferably, the thickness of the undercoat layer is from 0.05 μm to 0.5 μm.

Alignment Layer:

The film of the present invention may have an alignment layer between the liquid crystal layer and the interlayer film; however, in the production method for the laminate of the present invention where the support is peeled, the layer may be peeled away together with the support.

When the IR reflection layer of the cholesteric liquid crystal phase is formed, the alignment layer is necessary to be adjacent to the IR reflection layer, and therefore, it is preferable that the alignment layer be provided between the IR reflection layer of the cholesteric liquid crystal phase and the substrate or the undercoat layer. However, the undercoat layer may additionally have the function of the alignment layer. As the case may be, the alignment layer may be provided between the IR reflection layers.

(Liquid Crystal Film Formed by Fixing Cholesteric Liquid Crystal Phase)

As described above, the film of the present invention has a liquid crystal layer in which a cholesteric liquid crystal phase is fixed (the layer may be hereinafter abbreviated as a liquid crystal layer).

In the present invention, it is desirable that the laminate has four or more liquid crystal layers each having a fixed cholesteric liquid crystal phase therein. Specifically, it is desirable that the liquid crystal layer includes four or more layers each having a fixed cholesteric liquid crystal phase therein. FIG. 4 shows one example of the laminate configuration of the liquid crystal layer with a cholesteric liquid crystal phase fixed therein, in which 1 is the liquid crystal layer having a cholesteric liquid crystal phase fixed therein, and 15a, 15b, 16a and 16b each indicate an IR reflection layer.

Preferably, the IR reflection layers 15a, 15b, 16a and 16b are liquid crystal layers each with a cholesteric liquid crystal phase fixed therein, and also preferably, these layers exhibit a selective reflection characteristic of reflecting light having a specific wavelength. In one embodiment of the present invention, the helical direction of the cholesteric liquid crystal phase is opposite to each other in the neighboring IR reflection layers 15a and 15b, and the two layers are the same in point of the reflection center wavelength $\lambda_{15}$ thereof. Similarly, in the neighboring IR reflection layers 16a and 16b, the helical direction of the cholesteric liquid crystal phase is opposite to each other, and the two layers are the same in point of the reflection center wavelength $\lambda_{16}$ thereof. In this embodiment, the constituent layers satisfy $\lambda_{15} \neq \lambda_{16}$, and therefore, the IR reflection layers 15a and 15b selectively reflect the left-handed circularly-polarized light and the right-handed circularly-polarized light at a predetermined wavelength $\lambda_{15}$, while the IR reflection layers 16a and 16b selectively reflect the left-handed circularly-polarized light and the right-handed circularly-polarized light at a wavelength $\lambda_{16}$ that differs from the wavelength $\lambda_{15}$, and as a whole, the liquid crystal layer of this embodiment exhibits a broadband reflection characteristic.

In FIG. 4, the selective reflection center wavelength $\lambda_{15}$ of the IR reflection layers 15a and 15b may fall, for example, in a range of from 1010 to 1070 nm, while the selective reflection center wavelength $\lambda_{16}$ of the IR reflection layers 16a and 16b may fall, for example, in a range of from 1190 to 1290 nm; or that is, the two may differ from each other. Using such two pairs of IR reflection layers, of which the selective reflection wavelength differently falls within the above-described range, improves the IR reflection efficiency of the laminate structure. The spectral distribution of sunlight energy intensity shows a general tendency of such that the shorter wavelength has a higher energy level, while the spectral distribution in an IR wavelength region has two energy intensity peaks at a wavelength of from 950 to 1130 nm and at a wavelength of from 1130 to 1350 nm. Consequently, using at least one pair of IR reflection layers of which the selective reflection center wavelength falls within a range of from 1010 to 1070 nm (more preferably from 1020 to 1060 nm) and at least one pair of IR reflection layers of which the selective reflection center wavelength falls within a range of from 1190 to 1290 nm (more preferably from 1200 to 1280 nm) makes it possible to more efficiently reflect light corresponding to the two peaks, and, as a result, the heat shieldability of the laminate structure of the type can be thereby improved more.

The helical pitch of the cholesteric liquid crystal phase of which the reflection center wavelength falls within the above-described IR region is, in general, a wavelength $\lambda_{15}$ of 650 nm to 690 nm, and a wavelength $\lambda_{16}$ of 760 nm to 840 nm. Further, the thickness of each IR reflection layer is 1 µm to 8 µm (preferably, 3 µm to 7 µm). However, the thickness is not limited to these ranges. It is possible to form an IR reflection layer having a desired helical pitch by adjusting the kind, the concentration, and the like of materials (mainly, a polymerizable liquid crystal compound and a chiral agent) to be used to form a layer. The thickness of the layer can be adjusted to be within a desired range by adjusting the coating amount.

As described above, it is preferable that, in the neighboring IR reflection layers 15a and 15b, the helical direction of the cholesteric liquid crystal phase be opposite to each other, and similarly, in the neighboring IR reflection layers 16a and 16b, the helical direction of the cholesteric liquid crystal phase be opposite to each other. In this manner, providing the IR reflection layers, in which the directions of the cholesteric liquid crystal phase are opposite to each other but which are the same in at the point of the selective reflection center wavelength thereof, near to each other secures reflection of both the left-handed circularly-polarized light and the right-handed circularly-polarized light at the same wavelength.

For example, in the case where the light having passed through the IR reflection layer 16b (which has reflected the right-handed circularly-polarized light having a wavelength $\lambda_{16}$ and transmitted only the left-handed circularly-polarized light having that wavelength) does not pass through 16b but passes through 15a or 15b of which the selective reflection center wavelength is not $\lambda_{16}$, the left-handed circularly-polarized light component at a wavelength of $\lambda_{16}$ shall pass through the cholesteric liquid crystal layer that differs in point of the size of the helical pitch. In this case, the left-handed circularly-polarized light component at a wavelength of $\lambda_{16}$ is, though only slightly, influenced by the optical rotation of the cholesteric liquid crystal phase in the other IR reflection layers, therefore providing a change that the wavelength of the left-handed circularly-polarized light component would be shifted. Naturally, this phenomenon is not limited to the "left-handed circularly-polarized light component at a wavelength of $\lambda_{16}$, or that is, the phenomenon is a change that may occur in any case where a certain circularly-polarized light at a wavelength passes through a cholesteric liquid crystal phase having a different helical pitch. The present inventors made various investigations and, as a result, though Heuristic data, have found that, when one circularly-polarized light component is, while not reflected by the cholesteric liquid crystal layer having a predetermined helical pitch, to pass through any other cholesteric liquid crystal layer having a different helical pitch, and when the number of the layers through which the light passes is 3 or more, the negative influence on the circularly-polarized light component that passes through the layers would be augmented and, after that, even when the circularly-polarized light could reach the cholesteric liquid crystal layer that could reflect the light, the reflectance of the layer greatly decreases. In the present invention, even when the pair of IR reflection layers which are the same in point of the selective reflection center wavelength but which differ from each other in point of helical directions are not disposed adjacent to each other, the configuration could benefit from the advantageous effects of the present invention; but preferably, the number of the other IR reflection layers to be arranged between the pair of IR reflection layers (that is, an IR reflection layer which is formed by fixing a cholesteric liquid crystal phase having a different helical pitch and which differs in point of the selective reflection center wavelength) is 2 or less. Needless to say, it is preferable that the pair of IR reflection layers be adjacent to each other.

In the configuration of the present invention having a λ/2 layer therein, it is desirable that the liquid crystal layer with the cholesteric liquid crystal phase fixed therein is a laminate of two or more layers. This configuration is composed of liquid crystal layer with cholesteric liquid crystal phase fixed therein: λ/2 layer: liquid crystal layer with cholesteric liquid crystal phase fixed therein, and as a whole, this is a laminate of four or more cholesteric liquid crystal layers.

The embodiment of the cholesteric liquid crystal phase is not limited to the above-described embodiment. The layer may have a laminate configuration of 5 or more IR reflection layers laminated on one surface of a substrate, or may have a laminate configuration having, on both surfaces of a substrate, at least one pair of IR reflection layers (at least 5 layers in total). In addition, the layer may also have another configuration embodiment that has at least two pairs of IR reflection layers each having the same reflection center wavelength.

The thickness of each IR reflection layer that constitutes the liquid crystal film to which the cholesteric liquid crystal phase is fixed is preferably from 1 μm to 10 μm and more preferably from 2 μm to 7 μm. The total thickness of the liquid crystal layer is preferably from 10 m to 50 μm and more preferably from 20 μm to 40 μm.

(Characteristics of Film)

In the method for producing the laminated glass of the present invention to be described below, the thermal shrinkage of the liquid crystal layer in which the cholesteric liquid crystal phase is fixed, before and after the process of heating and pressing the laminate of the present invention in which the liquid crystal layer is sandwiched between the above-described glass plates, is preferably from 0.1 to 5% in the range of the heating temperature during the stage, more preferably from 0.1 to 3%, even more preferably from 0.5 to 2%.

Through varying depending on the number of the laminated IR reflection layers, the thickness of the film is preferably from 5 to 100 μm, more preferably from 10 to 50 μm, even more preferably from 20 to 40 μm.

In the present invention, the material for the liquid crystal layer in which the cholesteric liquid crystal phase is fixed may be a brittle one. Such a brittle liquid crystal layer includes, for example, the IR reflection layer of the above-described cholesteric liquid crystal layer.

(Support)

In the process of producing the laminate sandwiched between the glass plates in the production method of the present invention, it is desirable that the resin film includes a support of a transparent thermoplastic resin film or the like, from the viewpoint of stably forming the IR reflection layer of the liquid crystal layer in which the cholesteric liquid crystal phase is fixed. However, the support may remain or may not remain in the laminate of the present invention or in the laminated glass of the present invention to be described hereinunder.

Above all, in the laminate of the present invention or in the laminated glass of the present invention to be described below, it is desirable that the support does not remain in the film of the present invention. Specifically, in the laminate of the present invention or in the laminated glass of the present invention to be described below, it is desirable that the liquid crystal film in which the cholesteric liquid crystal phase is fixed is kept in contact with the first interlayer film to be described below and that the liquid crystal film in which the cholesteric liquid crystal phase is fixed is also kept in contact with the second interlayer film to be described below. However, the laminate of the present invention or the laminated glass of the present invention to be described below may have a support or any other thermoplastic resin between the liquid crystal layer in which the cholesteric liquid crystal phase is fixed and the second interlayer film therein; and the embodiment of the type could also sufficiently enjoy the advantageous effects of the present invention.

Not specifically defined at all, the support may be any one support having a self-supporting capability and capable of supporting the above-described IR reflection layers. In particular, in the case where multiple light reflection films are laminated to form an IR reflection layer, the support may include underlying IR reflection layers and laminating IR reflection films in order on the underlying IR reflection layers.

In the production method of the present invention, preferably, the support is plastic, from the viewpoint of roll-to-roll production of the support.

The support may or may not be transparent. Above all, the support is preferably a transparent thermoplastic resin film. However, in the case where the support is peeled away in the production method of the present invention, the support may not be transparent. The haze of the support is preferably at most 3%, and more preferably at most 1%. The support maybe a special retardation plate such as a λ/2 plate or the like to be produced in a controlled process, or may also be a polymer film or the like which has a great in-plane retardation fluctuation level, concretely, in terms of the plate retardation Re(1000) fluctuation at a wavelength of 1000 nm, the support may be a polymer film or the like which has an Re(1000) fluctuation level of at least 20 nm, and even up to at least 100 nm and which is therefore useless as predetermined retardation plates. In addition, the in-plane retardation of the support is not also specifically defined, and for example, a retardation plate or the like having an in-plane retardation Re(1000) at a wavelength of 1000 nm from 800 nm to 13000 nm is employable here.

Preferably, the support for use in the present invention is rigid enough to be resistant to pressure bonding thereof to the first and second interlayer films of polyvinyl butyral resin films or the like, or in the case where the support remains in the resin film, resistant to the contraction or elongation of the polyvinyl butyral resin during formation of laminated glass; and it is preferable that the Young's modulus of the support be approximately from 100 times to 1000 times that of the polyvinyl butyral resin. Having the configuration, the resin film including the peripheral part thereof can be prevented from being cracked or wrinkled, and therefore the reflection unevenness of the laminated glass to be obtained can be more effectively inhibited.

On the other hand, in the laminated glass of the present invention, the problems caused by a support are not generated by employing the configuration free from the support, which is preferable. In this case, the rigidity of the support is not particularly limited, and an arbitrary support can be used.

As the polymer film having a high visible light transmittance, there are described polymer films for various optical films for use as members of display devices such as liquid crystal display devices, etc. Examples of the transparent thermoplastic resin film include, for example, those including, as the main ingredient thereof, polyesters such as polyethylene terephthalate (PET), polybutylene terephthalate, polyethylene naphthalate (PEN), etc.; polycarbonate (PC), polymethyl methacrylate; polyolefins such as polyethylene, polypropylene, etc.; polyimide, triacetyl cellulose (TAC), etc. Of those, preferred are films including, as the main ingredient thereof, polyethylene terephthalate and/or triacetyl cellulose.

The material to form the support is determined, depending on whether or not the support is an optically isotropic support or an optically anisotropic support. For an optically isotropic support, in general, used is glass or cellulose ester. For an optically anisotropic support, in general, used is synthetic polymer (e.g., polycarbonate, polysulfone, polyether sulfone, polyacrylate, polymethacrylate, norbornene resin). However, as described in EP 0911656 A2, it is possible to produce an optically-anisotropic (high-retardation) cellulose ester film according to (1) use of a retardation enhancer, (2) reduction in the degree of acetylation of cellulose acetate or (3) film production in a cooling dissolution method. Preferably, the support formed of a polymer film is produced according to a solvent casting method.

For obtaining an optically anisotropic support, preferably, a polymer film is stretched. In producing an optically monoaxial support, employable is any ordinary monoaxial stretching treatment or biaxial stretching treatment. For producing an optically biaxial support, preferred is unbalanced biaxial stretching treatment. In unbalanced biaxial stretching treatment, a polymer film is stretched in a certain direction at a predetermined stretch ratio (for example, by from 3 to 100%, preferably from 5 to 30%), and then further stretched in the direction perpendicular to the former direction at a stretch ratio higher than the former stretch ratio (for example, by from 6 to 200%, more preferably from 10 to 90%). The stretching treatment in two directions may be carried out at the same time. Preferably, the stretching direction (in unbalanced biaxial stretching, the direction in which the stretch ratio is higher) and the in-plane slow axis of the stretched film could be substantially the same directions. Preferably, the angle between the stretching direction and the slow axis is less than 10°, more preferably less than 5°, most preferably less than 3°.

The optically anisotropic support may be given a desired retardation and can be used as a λ/2 plate. In this case, the retardation is preferably from 350 nm to 700 nm, more preferably from 400 to 650 nm.

Preferably, the thickness of the support is from 30 μm to 200 μm, more preferably from 100 to 200 μm. Using the support that has the thickness falling within the range makes it possible to stably produce the above-described IR reflection layer. In case where the laminate sandwiched between glass plates contains the support, the resin film including its peripheral part can be prevented from being cracked or wrinkled, and therefore the laminated glass to be obtained can be effectively prevented from being troubled by reflection unevenness.

For improving the adhesion of the support to the overlying layers (adhesive layer, alignment layer or optically anisotropic layer), the support may undergo surface treatment (e.g., glow discharge treatment, corona discharge treatment, UV treatment, flame treatment). A UV absorbent may be added to the support. An adhesive layer (undercoat layer) may be formed on the support. The adhesive layer is described in JP-A 7-333433. The thickness of the adhesive layer is preferably from 0.1 to 2 μm, more preferably from 0.2 to 1 μm.

(Use of Film of Invention)

One embodiment of the film of the present invention is an optically anisotropic film, in which the alignment (for example, horizontal alignment, vertical alignment, hybrid alignment, etc.) of the liquid crystal phase of the polymerizable composition of the present invention is fixed. The film of the type is used as a reflection film, an optical compensatory film in liquid crystal display devices, etc.

One embodiment of the film of the present invention is a film, in which the cholesteric liquid crystal phase of the polymerizable composition of the present invention is fixed and which exhibits a selective reflection characteristic to light falling within a predetermined wavelength region. The film exhibiting the selective reflection characteristic at an IR wavelength region (wavelength of 800 nm to 1300 nm) is bonded to a building or a windshield of an vehicle, or incorporated in laminated glass, and used as a heat shielding member.

In addition, the film of the present invention can also be used in other various applications, for example, as polarizing elements, selective reflection films, antireflection films, view angle compensation films, holography, alignment films and the like that are constituent elements of optical devices.

[IR Reflection Plate]

The IR reflection plate of the present invention contains the film of the present invention.

Preferably, the IR reflection plate of the present invention contains a λ/2 plate. Not specifically defined, the λ/2 plate may be any one suitably selected in accordance with the intended use thereof.

The ½ wavelength plate is, for example, obtained by stretching a film of a transparent resin.

Not specifically defined, the transparent resin may be any one having a whole light transmittance of at least 80% as a 0.1-mm film thereof, and there are described acetate resin such as triacetyl cellulose, and polyester resin, polyether sulfone resin, polycarbonate resin, linear polyolefin resin, alicyclic structure-having polymer resin, acrylic resin, polyvinyl alcohol resin, polyvinyl chloride resin, etc. Above all, preferred are polycarbonate resin and alicyclic structure-having polymer resin. Concretely, the alicyclic structure-having polymer resin includes (1) norbornene polymer, (2) monocyclic olefin polymer, (3)cyclic conjugated diene polymer, (4) vinyl-alicyclic hydrocarbon polymer, and hydrogenated derivatives thereof.

If desired, any known additive, such as antioxidant, heat stabilizer, light stabilizer, UV absorbent, antistatic agent, dispersant, chlorine scavenger, flame retardant, crystallization nucleating agent, antiblocking agent, antifogging agent, mold release agent, pigment, organic or inorganic filler, neutralizing agent, lubricant, decomposing agent, metal inactivator, antifouling agent, antimicrobial agent, thermoplastic elastomer and the like, may be added to the resin.

In addition, as the ½ wavelength plate, also usable here are one prepared by applying a liquid crystal compound onto a transparent resin, and aligning and fixing it thereon; an inorganic crystal such as quartz, sapphire or the like; and a structural birefringent plate prepared by working the surface of a resin or glass substrate to make it have fine irregularities thereon.

In place of the glass plates between which the IR reflection plate is sandwiched, also usable here are a glass-substitute resin shaped articles, as well as combination of glass-substitute resin shaped articles with glass. Examples of the glass-substitute resin include polycarbonate resin, acrylic resin, methacrylic resin, etc. Also usable here are those prepared by coating such a glass-substitute resin with a hard coat layer. Examples of the hard coat layer include an acrylic hard coat material, a silicone hard coat material, a melamine hard coat material, and those prepared by dispersing inorganic particles of silica, titania, alumina, zirconia or the like in those hard coat materials.

[Laminate]

The laminate of the present invention is formed by the use of the IR reflection plate of the present invention, and has an interlayer film on the outermost layer of any one liquid crystal film formed by fixing the cholesteric liquid crystal phase of the IR reflection plate. Preferably, the laminate of the present invention contains an interlayer film on both the outermost layers of the IR reflection plate of the present invention, from the viewpoint of facilitating the production of laminated glass.

(Interlayer Film)

Preferably, the laminate of the present invention contains an interlayer film. More preferably the laminate of the present invention further contains a second interlayer film. In an ordinary laminated glass, the first and the second interlayer films on both sides of the liquid crystal layer therein have the same thickness; however, the present invention is not limited to the production method for the laminate for the laminated glass of that embodiment. In the present invention, there can be produced a laminate of an embodiment where the thickness of the first interlayer film differs from that of the second interlayer film. In this, the composition of the first interlayer film may be the same as or may differ from that of the second interlayer film.

The thermal shrinkage of the first and second interlayer films before and after the process of thermally pressing the laminate under heat is preferably from 1 to 20% at the heating temperature during the time, more preferably from 2 to 15%, particularly preferably from 2 to 10%.

Preferably, the thickness of the first and second interlayer films is from 100 to 1000 μm each, more preferably from 200 to 800 μm, even more preferably from 300 to 500 μm. The first and second interlayer films may be thickened by laminating multiple sheets.

Regarding the standard of the brittleness of the first and second interlayer films, it is desirable that the elongation at break of each film in a tensile test is from 100 to 800%, more preferably from 100 to 600%, even more preferably from 200 to 500%.

Resin:

Preferably, the first and second interlayer films are resin interlayer films. Preferably, the resin interlayer films are resin films of which the main component is a polyvinyl acetal resin. The polyvinyl acetal resin film is not particularly limited, for which, for example, herein usable are preferably those described in JP-A-6-000926 and JP-A-2007-008797. Of the polyvinyl acetal resin film, more preferred for use in the present invention is a polyvinyl butyral resin film. Not specifically defined, the polyvinyl butyral resin film may be any resin film in which the main component is polyvinyl butyral. Any polyvinyl butyral resin film as a widely known interlayer film for laminated glass is employable here. Above all, in the present invention, it is preferable that the interlayer film be a resin interlayer film containing polyvinyl butyral or ethylene vinyl acetate as a main component and it is particularly preferable that the interlayer film be a resin interlayer film containing polyvinyl butyral as a main component. The resin of the main component is meant to indicate the resin that accounts for at least 50% by mass of the resin interlayer film.

Additive:

Within a range not departing from the spirit and the scope of the present invention, the first and second interlayer films may contain additive.

The additive includes, for example, heat ray-shielding fine particles, sound-shielding fine particles, and plasticizer. As the heat ray-shielding fine particles and the sound-shielding fine particles, for example, inorganic fine particles and metal fine particles are usable here. Dispersing and mixing such fine particles in the elastic material of the first or second interlayer film provides the intended heat-shielding effect. Simultaneously, the constitution inhibits sound wave propagation, therefore favorably providing an additional vibration attenuating effect. The fine particles are preferably spherical ones, but may not be true-spherical ones. Their shape may be suitably changed or modified. Preferably, the fine particles are dispersed in the interlayer film (preferably PVB), and they may be added to the film by encapsulating in suitable capsules or may be added thereto along with a dispersant. In this case, the amount to be added is not specifically defined. Preferably, the amount is from 0.1 to 10% by mass of the resin component.

As the fine particles, there are described calcium carbonate, alumina, kaolin clay, calcium silicate, magnesium oxide, magnesium hydroxide, aluminum hydroxide, magnesium carbonate, talc, feldspar powder, mica, barite, barium carbonate, titanium oxide, silica, glass beads, etc. One type alone or two or more different types of these may be used here either singly or as combined.

As the heat ray-shielding fine particles, there are described tin-doped indium oxide (ITO), antimony-doped tin oxide (ATO), aluminum-doped zinc oxide (AZO), indium-doped zinc oxide (IZO), tin-doped zinc oxide, silicon-doped zinc oxide, zinc antimonate, lanthanum hexaboride, cerium hexaboride, gold powder, silver powder, platinum powder, aluminum powder, iron, nickel, copper, stainless, tin, cobalt, and alloy powders containing these, etc. As the light-shielding agent, there are described carbon black, red iron oxide, etc. As the pigment, there are described a dark reddish, mixed pigment prepared by mixing four pigments of a black pigment carbon black, a red pigment (C.I. Pigment Red), a blue pigment (C.I. Pigment Blue) and a yellow pigment (C.I. Pigment Yellow), etc.

The plasticizer is not specifically defined. Any known plasticizer generally used as the plasticizer for the interlayer films of the type is employable here. For example, there are described triethylene glycol di-2-ethyl butyrate (3GH), triethylene glycol di-2-ethylhexanoate (3GO), triethylene glycol di-n-heptanoate (3G7), tetraethylene glycol di-2-ehtylhexanoate (4GO), tetraethylene glycol di-n-heptanoate (4G7), oligoethylene glycol di-2-ethylhexanoate (NGO), etc. In general, the plasticizer is used here in an amount of from 25 to 70 parts by mass relative to 100 parts by mass of the main ingredient resin (preferably polyvinyl acetal resin) of the resin interlayer film.

<Process of Thermally Bonding Interlayer Film to Liquid Crystal Layer of Film of the Present Invention>

Preferably, the method for producing the laminate of the present invention includes, after the process of laminating the support/liquid crystal layer/interlayer film in that order, a process of thermally bonding the interlayer film to the liquid crystal layer-attached support. In the production method for the laminate of the present invention, the thermal bonding process is carried out before the support-peeling process to be described below, and therefore in the production method, position gap can be evaded in peeling the support.

The thermal bonding method is not specifically defined, for which employable here is thermal pressure bonding that uses a heating unit, a thermal fusion by laser irradiation, etc. Above all, in the production method for the laminate of the present invention, it is desirable that the process of thermally bonding the liquid crystal layer to the interlayer film is attained by thermal pressure bonding.

The thermal pressure bonding method is not specifically defined. For example, preferred is a method where a heating unit at from 80 to 140° C. is pressed against the film. The heating unit may be a flat or curved one, or may also be a roller. For the thermal pressure bonding, there may be employed multiple heating rollers or heatable flat pinching surfaces, as well as combinations thereof. The thermal pressure bonding may be applied to one side of the support/liquid crystal layer/interlayer film, or that is, may be applied to only one surface thereof; and in the case, one of the rollers for use for the thermal pressure bonding may be a roller or a pinching surface that is not heated. Of the above, it is desirable that, in the production method for the laminate of the present invention, a heating roller is used in the thermal pressure bonding process, and more preferably, a heating roller and a non-heating roller are used as combined.

In the production method for the laminate of the present invention, it is desirable that the thermal pressure bonding process includes a process of thermally bonding the start position of the support at which the support is peeled in the peeling process. Here, it is desirable that the start position of the support at which the support is peeled in the peeling process is concretely within 10 mm from the edge of the support, more preferably within 5 mm, even more preferably within 1.5 mm.

Spot-laminating the laminate of support/liquid crystal layer/interlayer film as laminated in that order, at a desired position could make it possible to prevent position gap in support peeling, and in the present invention, a specific position of the edge of the support that may be a trigger of peeling is laminated, therefore more facilitating the support peeling.

(Details of Method of Thermal Pressure Bonding of Interlayer Film and Liquid Crystal Layer of Liquid Crystal Layer-Attached Support)

Preferably, the interlayer film and the liquid crystal layer of the liquid crystal layer-attached support are thermally bonded under pressure with a thermal pressure bonding roller.

In general, the temperature is room temperature. The temperature of the thermal pressure bonding roller may be, for example, from 60 to 120° C. when the liquid crystal layer 1 and the first interlayer film 3 are adjacent to each other.

In general, the surface of the interlayer film is roughened by embossing in order that air could readily have an escape in bonding. The bonded surface could be smooth, following the surface to which it has been bonded, and therefore could have a bettered optical property; however, the other surface must be kept roughened in order that it is bonded to a glass plates or the like. Accordingly, it is desirable that, of the thermal pressure bonding rollers, the surface of the roller that is to be kept in contact with the interlayer film is roughened so as to secure the roughened surface of the interlayer film. Specifically, it is desirable that at least one surface of the interlayer film is embossed and that the embossed surface of the interlayer film is kept in contact with the liquid crystal layer of the film of the present invention in laminating the layers. After the thermal pressure bonding, the surface of the interlayer film not kept in contact with the liquid crystal layer may be positively embossed.

<Process of Peeling Support from Liquid Crystal Layer>

Preferably, the production method for the laminate of the present invention includes a process of peeling the support from the liquid crystal layer after thermal pressure bonding.

Preferably, in the production method for the laminate of the present invention, peeling the support is initiated at least from one corner of the support. In case where the support peeling is carried out continuously by the use of a peeling roller, it is more desirable that the support peeling is initiated from the entire one side of the support.

<Process of Laminating Second Interlayer Film>

Preferably, the production method for the laminate of the present invention includes a process of laminating a second interlayer film on the side of the liquid crystal layer from which the support has been peeled, after the process of peeling the support therein. Specifically, it is desirable that the laminate of the present invention further has a second interlayer film.

The liquid crystal layer 1 and the second interlayer film 3' may be adjacent to each other, or may have any other constituent layer therebetween. Preferably, however, the liquid crystal layer 1 and the second interlayer film 3' are adjacent to each other. The other constituent layer in the case may be an adhesive layer. In general, the adhesive layer is provided on the side of the second interlayer film.

Preferably, the laminate is thermally bonded under pressure with a thermal pressure bonding roller.

In this case, the temperature is generally room temperature. The temperature of the thermal pressure bonding roller may be from 60 to 120° C., for example, in case where the liquid crystal layer 1 and the second interlayer film are adjacent to each other.

In working it, the laminate including the liquid crystal layer and the interlayer film may be cut with an edge tool, or may be cut by a laser, a water jet or heat.

[Laminated Glass]

The use of the laminated glass of the present invention is not specifically defined. Preferably, the laminated glass is for windowpanes for houses, vehicles, etc.

The laminated glass of the present invention has the laminate of the present invention obtained in the above and at least two glass plates, in which the laminate is inserted into the two glass plates. Preferably, the glass plates are first and second glass plates. Preferred embodiments of the case are described below.

The laminated glass of the present invention may be favorably cut into any desired size, and also in the case, the liquid crystal layer in the laminated glass of the present invention is prevented from being cracked including the peripheral part thereof, and therefore, even when the laminated glass of the present invention is cut into a desired size, wrinkling or cracking could hardly spread in the entire region of the laminated glass.

The method of laminating the laminate of the present invention, which includes the liquid crystal layer and the interlayer film described above, with the first and second glass plates is not specifically defined. The laminate may be inserted into two glass plates according to a known method for the intended lamination.

The laminate thus sandwiched between the glass plates has a configuration of glass plates/interlayer film/liquid crystal layer with cholesteric liquid crystal phase fixed therein/interlayer film/glass plates as laminated in that order.

Figure 2:
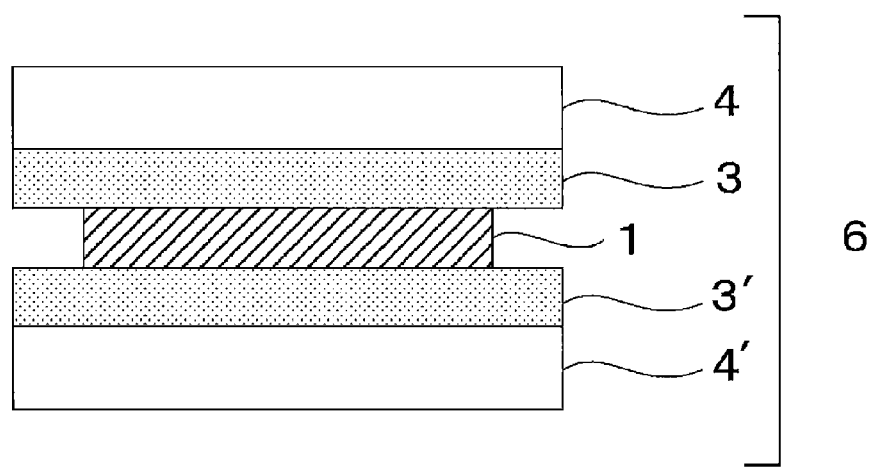
FIG. 2 is a schematic view showing a cross section of another example of the laminated glass of the present invention.
Figure 3:
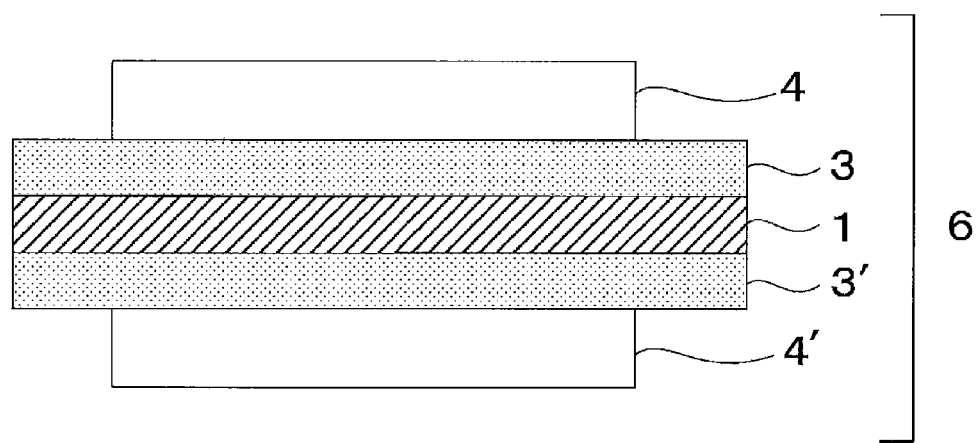
FIG. 3 is a schematic view showing a cross section of another example of the laminated glass of the present invention.

FIG. 1 to FIG. 3 are schematic views showing examples of the configuration of the laminated glass which contains the laminate 7 sandwiched between glass plates and which is obtained according to the production method of the present invention. In FIG. 1 to FIG. 3, 1 is a liquid crystal layer in which the cholesteric liquid crystal phase is fixed; 3 is an interlayer film; 3' is a second interlayer film; 4 is a first glass plates; and 4' is a second glass plates. FIG. 2 shows an embodiment in which, in the laminate 7 sandwiched between the glass plates, the edges of the liquid crystal layer with the cholesteric liquid crystal phase fixed therein are on the inner side than the edges of the glass plates 4 and 4' and the edges of the first interlayer film 3 and the second interlayer film 3'. The edges of the glass plates 4 and 4' may be on the same position as that of the edges of the first interlayer film 3 and the second interlayer film 3', or any of them may protrude from the others.

In the laminate 7 sandwiched between the glass plates, the edges of the liquid crystal layer with the cholesteric liquid crystal phase fixed therein may be on the same position as that of the edges of the glass plates and the edges of the interlayer films, as in FIG. 1. For example, in the configuration of the type where the laminate 7 sandwiched between the glass plates has four sides, the edges of the liquid crystal layer 1 with the cholesteric liquid crystal phase fixed therein are on the same positions as those of the edges of the glass plates 4 and 4' and the edges of the first interlayer film 3 and the second interlayer film 3' in all of the four sides thereof, as in FIG. 2.

On the other hand, the present invention may have another configuration in which the edges of the liquid crystal layer 1 with the cholesteric liquid crystal phase fixed therein protrude from the edges of the glass plates 4 and 4' and the edges of the first interlayer film 3 and the second interlayer film 3' in all of the four sides thereof, as in FIG. 3.

In the laminate sandwiched between the glass plates, the liquid crystal layer 1 with the cholesteric liquid crystal phase fixed therein and the first interlayer film 3 as well as the liquid crystal layer 1 with the cholesteric liquid crystal phase fixed therein and the second interlayer film 3' may adjacent to each other, or may have any other constituent layer therebetween. In case where the liquid crystal layer 1 with the cholesteric liquid crystal phase fixed therein contains a light reflection layer to be described below and when the production method for the laminate of the present invention includes the process of peeling the substrate described above, the laminate may be further thinned. The laminate of the type not containing the transparent plastic support is brittle and therefore it is considered that its production would be difficult, however, the production method of the present invention can solve the problem.

The laminate sandwiched between the glass plates may have a configuration of glass plates/interlayer film/liquid crystal layer with cholesteric liquid crystal phase fixed therein/λ/2 film/liquid crystal layer with cholesteric liquid crystal phase fixed therein/interlayer film/glass plates as laminated in that order. In this case, it is desirable that the helical direction of the liquid crystal layer with the cholesteric liquid crystal phase fixed therein on both sides of the λ/2 film is the same direction when the reflection center wavelength thereof is the same.

(Glass Plates)

In the production method for the laminated glass of the present invention, the glass plates may not have a curvature, but is preferably a curved glass plates. In case where the glass plates does not have a curvature, the peripheral part of the laminated glass maybe often wrinkled or cracked especially when the size of the laminated glass is large; and the production method of the laminated glass of the present invention is favorably applied to the case.

On the other hand, in case where the glass plates is a curved one, the liquid crystal layer with the cholesteric liquid crystal phase fixed therein would be more readily wrinkled or cracked as compared with the other case where the glass plates does not have a curvature. In the production method for the laminated glass of the present invention, especially when the glass plates has a curved surface (that is, when the sheet is a curved glass plates), it is possible to prevent the trouble of wrinkling or cracking.

The two glass plates between which the liquid crystal layer with the cholesteric liquid crystal phase fixed therein is sandwiched may have a different thickness or may be colored. In particular, in case where the laminated glass is used in windshields of vehicles or the like for the purpose of shielding from heat, a colorant component such as metal or the like may be mixed in the glass in such a degree that the visible light transmittance of the resulting laminated glass is not lower than 70% as defined in JIS-R3211; and in general, using green glass effectively enhances the heat shieldability of the laminated glass. Preferably, the color density of the green glass for use herein is controlled to a desired level by controlling the amount of the metal component to be added or by controlling the thickness of the glass.

The curved glass plates may be obtained by heating and bending the soda lime glass prepared according to a float process, at a temperature not lower than the softening point thereof, and it is simple to use here a three-dimensionally curved glass plates obtained by bending.

Regarding the shape thereof, the three-dimensionally curved glass plates is a glass plates of which the radius of curvature differs in different sites therein, such as a spherical glass plates, an oval spherical glass plates or a windshield glass plates for vehicles.

Not specifically defined, the radius of curvature of the curved glass plates is preferably from 0.9 m to 3 m. When the radius of curvature is smaller than 0.9 m, in general, the resin film may be readily wrinkled during lamination. However, according to the production method of the present invention, even though the radius of curvature is less than 0.9 m, the resin film can be prevented from being wrinkled. On the other hand, when the radius of curvature is large, the shape of the glass plate would be nearly flat, and therefore, in general, the resin film would be hardly wrinkled, but the peripheral part of the resin film may be cracked. Consequently, in the production method of the present invention, even the curved glass having a radius of curvature of 3 m or more could enjoy the advantageous effects of the present invention; however, from the viewpoint of preventing the resin film from being cracked and additionally from being wrinkled, the radius of curvature of the curved glass plates for use in the present invention is especially preferably 3 m.

The laminated glass to be obtained according to the laminated glass production method of the present invention includes at least two above-described glass plates. Even though the radius of curvature differs between the two glass plates, the laminated glass production method of the present invention is applicable to the case.

<Process of Pressing Under Heat the Laminate Sandwiched Between Glass Plates>

Preferably, the laminated glass production method of the present invention includes a process of thermally pressing the laminate of the present invention sandwiched between the glass plates.

Bonding the laminate of the present invention sandwiched between the glass plates to the glass plates may be attained, for example, by prebonding them under reduced pressure, using a vacuum bag or the like, at a temperature of from 80 to 120° C. for a period of from 30 to 60 minutes, and thereafter bonding them in an autoclave under a pressure of from 1.0 to 1.5 MPa at a temperature of from 120 to 150° C. thereby giving laminated glass in which the laminate is sandwiched between the two glass plates. If desired, they may be bonded to each other via an adhesive or the like.

In this case, preferably, the pressure is from 1.0 to 1.5 MPa, the temperature is from 120 to 150° C., and the thermally bonding time is from 20 to 90 minutes.

After the thermal bonding, the cooling mode is not specifically defined. While the pressure is suitably purged, the laminated glass to be obtained may be spontaneously kept cooled. In the present invention, it is desirable that the system is cooled while the pressure therein is kept as such after the thermal bonding, from the viewpoint of preventing the laminated glass to be obtained from being wrinkled or cracked. The mode of cooling the system while the pressure is kept as such means that the apparatus is so cooled that the inner pressure inside the apparatus at 40° C. could be from 75% to 100% of the inner pressure inside the apparatus where the laminated glass has been thermally bonded (preferably at 130° C.). The method of cooling the system while the pressure therein is kept as such is not specifically defined so far as the pressure in the system when cooled to 40° C. could fall within the above range. However, preferred is an embodiment where the inner area of the apparatus is gradually cooled with no pressure leak therethrough in such a manner that the inner pressure inside the apparatus could naturally lower with the decrease in the temperature therein, or an embodiment where the system is cooled with further externally pressurizing it in such a manner that the inner pressure inside the apparatus could not lower with the decrease in the temperature therein. In case where the system is cooled while the pressure therein is kept as such, it is desirable that the laminated glass is thermally bonded at from 120 to 150° C. and the left cooled to 40° C. taking from 1 to 5 hours.

Preferably, the method of the present invention includes a process of cooling the system while the pressure therein is kept as such, and then purging the pressure. Concretely, it is desirable that the system is first cooled while the pressure therein is kept as such, and then after the temperature inside the autoclave has reached 40° C. or lower, the system is cooled by purging the pressure.

From the above, it is desirable that the laminated glass production method of the present invention includes a process of sandwiching the laminate of the present invention with at least two glass plates, a process of thermally bonding them under a pressure of from 1.0 to 1.5 MPa at a temperature of from 120 to 150° C., a process of cooling the system while the pressure therein is kept as such, and a process of purging the pressure.

The range of thermally bonding the laminate of the present invention to the glass plates may be the range that covers the entire area of the glass plates, but maybe the peripheral area of the glass plates. Thermally bonding the two at the peripheral area prevents the laminated glass from being wrinkled.

EXAMPLES

The characteristics of the present invention are described more concretely with reference to the following Examples and Comparative Examples. In the following Examples, the material used, its amount and ratio, the details of the treatment and the treatment process may be suitably modified or changed within the range not departing from the spirit and the scope of the present invention. Accordingly, the scope of the present invention should not be limitatively interpreted by the Examples described below.

Examples 1 to 4, and Comparative Examples 1 to 11

Preparation of Cholesteric Liquid Crystal Mixture (R1)

The following compound A, compound B, other polymerizable monomers other than the compounds A and B, fluorine-containing horizontal alignment agent, chiral agent, polymerization initiator, and methyl ethyl ketone as a solvent were mixed to prepare a coating liquid having the composition described below. Thus obtained the coating liquid is referred to as a cholesteric liquid crystal mixture (R1) of Examples and Comparative Examples.
  Compound A listed in following Table 1 amount listed in following Table 1
  Compound B listed in following Table 1 amount listed in following Table 1
  Other polymerizable monomers listed in following Table 1 amount listed in following Table 1
Fluorine-containing horizontal alignment agent shown below 0.04 parts by mass
Chiral agent LC756 (manufactured by BASF Corporation) 3.4 parts by mass
Polymerization initiator IRGACURE 819 (manufactured by Ciba Japan) 3 parts by mass
Solvent (methyl ethyl ketone) amount to make the solute concentration of 25% by mass
  (Compound A)
  Compound 1: compound satisfying the following general formula (Ia)

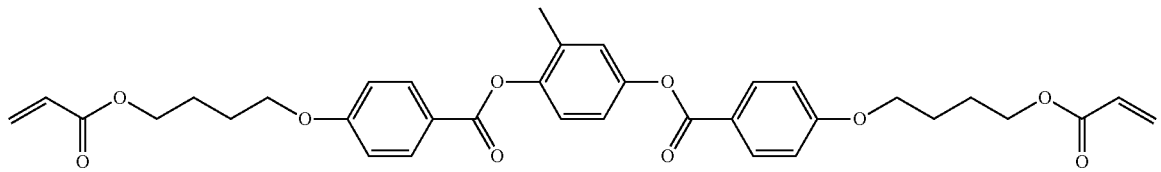

(Compound B)
Compound 3: compound satisfying the following general formula (Ib)

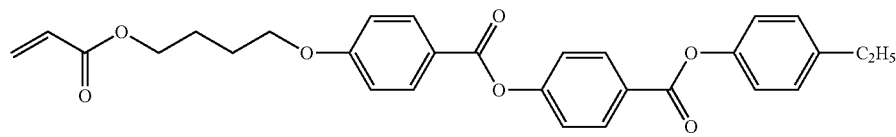

Compound 4: compound not satisfying the following general formula (Ib)

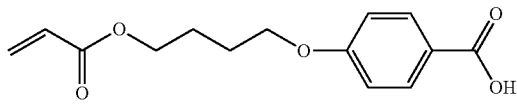

(Other Polymerizable Monomers)
Polymerizable monomer 1: dipentaerythritol hexaacrylate (hexafunctional groups, manufactured by Nippon Kayaku Co., Ltd.)
Polymerizable monomer 2: pentaerythritol tetraacrylate (tetrafunctional groups, manufactured by Shin-Nakamura Chemical Co., Ltd.)
Polymerizable monomer 3: EO-modified trimethylol propane triacrylate (trifunctional groups, manufactured by Osaka Organic Chemical Industry Co., Ltd.)
Polymerizable monomer 4: hexanediol diacrylate (difunctional groups, manufactured by Daicel-Cytec Co., Ltd.)
Polymerizable monomer 5: ethoxyethoxyethyl acrylate (monofunctional groups, manufactured by Osaka Organic Chemical Industry Co., Ltd.)
Fluorine-containing horizontal alignment agent: compound described in JP-A-2005-99248

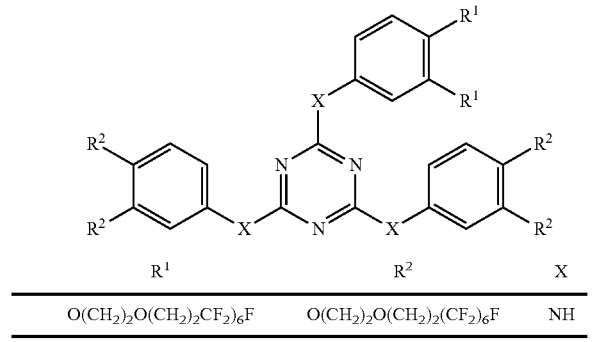

| $R^1$ | $R^2$ | X |
|---|---|---|
| $O(CH_2)_2O(CH_2)_2CF_2)_6F$ | $O(CH_2)_2O(CH_2)_2(CF_2)_6F$ | NH |

Chiral agent (A)

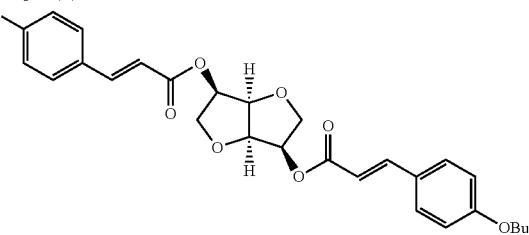

<Preparation of Curable Liquid Crystal Composition for Liquid Crystal Film of Second Layer>
A coating liquid (R2) was prepared in the same manner as the above except that the dose of a chiral agent LC756 of a coating liquid (R1) containing polymerizable liquid crystals of each Example and Comparative Example was changed to 2.7 parts by mass.

<Preparation of Curable Liquid Crystal Composition for Liquid Crystal Film of Third Layer>
A coating liquid (R3) was prepared in the same manner as the above except that the dose of a chiral agent LC756 of the coating liquid (R1) containing polymerizable liquid crystals of each Example and Comparative Example was changed to 2.26 parts by mass.

<Preparation of Curable Liquid Crystal Composition for Liquid Crystal Film of Fourth Layer>
A coating liquid (L4) was prepared in the same manner as the above except that a chiral agent LC756 of the coating liquid (R1) containing polymerizable liquid crystals of each Example and Comparative Example was changed to a chiral agent (A) with a dose of 5.4 parts by mass and the dose of the chiral agent Lc-756 was set to 5.4 parts by mass.

<Preparation of Curable Liquid Crystal Composition for Liquid Crystal Film of Fifth Layer>
A coating liquid (L5) was prepared in the same manner as the above except that the dose of a chiral agent (A) of the coating liquid (L4) containing polymerizable liquid crystals of each Example and Comparative Example was changed to 4.3 parts by mass.

<Preparation of Curable Liquid Crystal Composition for Liquid Crystal Film of Sixth Layer>
A coating liquid (L6) was prepared in the same manner as the above except that the dose of a chiral agent (A) of the coating liquid (L4) containing polymerizable liquid crystals of each Example and Comparative Example was changed to 3.5 parts by mass.

<Production of Film>
(Preparation of Coating Liquid for Undercoat Layer)
A coating liquid for undercoat layer (S1) having the composition shown below was prepared.
Composition of Coating Liquid for Undercoat Layer (S1):

| | |
|---|---|
| Acrylate resin Jurymer ET-410 (by Toa Gosei, solid concentration 30%) | 50 parts by mass |
| Methanol | 50 parts by mass |

(Preparation of Coating Liquid for Alignment Layer)
A coating liquid for alignment layer (H1) having the composition shown below was prepared.
Composition of Coating Liquid for Alignment Layer (H1):

| | |
|---|---|
| Modified polyvinyl alcohol PVA 203 (by Kuraray) | 10 parts by mass |
| Glutaraldehyde | 0.5 parts by mass |
| Water | 371 parts by mass |
| Methanol | 119 parts by mass |

(Coating, Drying and Film Formation)
Using a wire bar, the coating liquid for undercoat layer (S1) was applied onto the surface of a PET film (with no undercoat layer, by Fujifilm, thickness: 50 μm, size 320 mm×400 nm), in such a manner that the thickness thereof after drying could be 0.25 μm. Subsequently, this was heated at 150° C. for 10 minutes, dried and solidified to form an undercoat layer.

Next, also using a wire bar coater, the coating liquid for alignment layer (H1) was applied onto the thus-formed undercoat layer in such a manner that the thickness thereof after drying could be 1.0 μm. Subsequently, this was heated at 100° C. for 2 minutes, dried and solidified to form an alignment layer. The alignment layer was rubbed (with rayon cloth, pressure: 0.1 kgf, number of rotations: 1000 rpm, conveying speed: 10 m/min, rubbing mode: one back-and-forth movement).

Next, using the polymerizable liquid crystal-containing coating liquid (R1) prepared in the above, the cholesteric liquid crystal phase was fixed according to the process described below, thereby producing a liquid crystal film serving as an IR reflection layer, in which the cholesteric liquid crystal was fixed.

(1) Using a wire bar, the coating liquid (R1) was applied onto the PET film at room temperature in such a manner that the thickness thereof after drying could be 3.5 µm.

(2) This was dried at room temperature for 30 seconds to remove the solvent, and heated in an atmosphere at 125° C. for 2 minutes, and then at 95° C. to form a cholesteric liquid crystal phase. Next, using an electrodeless lamp, Heraeus Noblelight Fusion UV Inc.' "D Bulb" (90 mW/cm), this was UV-irradiated at an output of 60% for 6 seconds to 12 seconds to fix the cholesteric liquid crystal phase, thereby forming a liquid crystal film (IR reflection layer) in which the cholesteric liquid crystal phase was fixed.

(3) This was cooled to room temperature to prepare films of Examples and Comparative Examples in which 6 layers of the liquid crystal films of the cholesteric liquid crystal phase were laminated on PET by repeatedly performing the above-described process (1) or (2). The coating was performed such that the thicknesses of the first and fourth layers became 3.5 µm, the thicknesses of the second and fifth layers became 4.3 µm, and the thicknesses of the third and sixth layers became 5.1 µm after drying.

<Evaluation of Cholesteric Liquid Crystal Mixture>

(Crystal Precipitation at the Time of Coating and Drying First Layer)

In manufacturing films of Examples and Comparative Examples, samples which were coated with only the coating liquid (R1) containing a polymerizable liquid crystal for the first layer on the support were prepared. The crystal precipitation of the manufactured samples was evaluated according to the following criteria.

Precisely, the coating liquid was applied continuously using a coating machine, and under the coating condition described in Examples and Comparative Examples, and the samples were checked and evaluated as follows.

A: After continuous coating for 45 minutes, any coating streak caused by precipitation of crystals of the liquid crystal compound in the coating machine, could not be visually confirmed on the coated sample.

B: After continuous coating for 45 minutes, any coating streak caused by precipitation of crystals of the liquid crystal compound in the coating machine, could be visually confirmed on the coated sample.

Obtained results are listed in Table 1 below.

(Reflection Bandwidth of First Layer)

In manufacturing films of Examples and Comparative Examples, samples which were coated with only the coating liquid (R1) containing a polymerizable liquid crystal for the first layer on the support were prepared. The reflection bandwidths of the manufactured samples were evaluated according to the following criteria.

Using a spectrophotometer, the transmission spectrum of each sample was measured, and the wavelength width between both ends at which the reflection peak transmittance is 70% was referred to as the reflection bandwidth.

The evaluation criteria of the reflection bandwidth were set as follows.

A: reflection bandwidth of a sample in which only the first layer was coated in "reflection bandwidth≥Comparative Example 3"

B: reflection bandwidth of a sample in which only the first layer was coated in "reflection bandwidth<Comparative Example 3"

Obtained results are listed in Table 1 below.

<Manufacture of Laminate (Laminated Interlayer Film)>
(Surface Treatment)

The obtained surface of the liquid crystal film of the film on which 6 layers were laminated of Examples and Comparative Examples was washed according to the following procedures.

The laminate produced in the above was dipped in a container containing 2-butanone, and washed therein at 40° C. for 10 minutes.

The periphery of the film of Examples and Comparative Examples, which contained the liquid crystal film formed on PET, was trimmed in such a manner that the cut edge thereof could be in the perpendicular direction. On the other hand, separately as an interlayer film, the periphery of a PVB film embossed on both surfaces thereof was trimmed in such a manner that the cut edge thereof could be in the perpendicular direction. The first interlayer film PVB was laminated on the surface of the sixth layer on the liquid crystal film side of the film of Examples and Comparative Examples to obtain a laminate. Using two lamination hot rollers arranged on both the surface side and the back side on the liquid crystal film side of the obtained laminate, the liquid crystal film-attached support was sandwiched in the position of not 1 mm or less from the end from the entire periphery (4 sides) thereof, and the liquid crystal film and the interlayer film were thus thermally bonded to each other. In this stage, the lamination hot roller on the interlayer film side was controlled at 25° C. in order so that the embosses on the back of the interlayer film could not be crushed, on the other hand, the lamination hot roller on the support (PET) side was controlled at 120° C. in order so that the embosses on the surface of the liquid crystal film side of the interlayer film could be fully crushed to thereby increase the adhesion between the interlayer film 3 and the liquid crystal film 1.

Subsequently, PVB as a second interlayer film was laminated on the surface of the first liquid crystal film exposed by peeling off the support (PET) while the support (PET) was peeled off using a peeling roll from the laminate laminated together with the first interlayer film, and thermally bonded using a heating roller. The obtained laminate was set to a laminate in Examples and Comparative Examples.

<Laminated Glass Production>

The produced laminate was sandwiched between glass in such a manner of glass/interlayer film/liquid crystal film with cholesteric liquid crystal phase fixed therein/second interlayer film/glass, thereby preparing a laminate sandwiched between glass plates. Here the edge of the glass plate and the edge of the interlayer film were at the same position.

In addition, the glass plate used here had a thickness of 2 mm. The radius of curvature of the curved glass plates was from 0.9 m to 3.0 m.

Thus obtained laminate sandwiched between the glass plates was pre-bonded at 95° C. for 30 minutes in vacuum. After the prebonding, the laminate sandwiched between the glass plates was thermally pressed in an autoclave under the condition of 1.3 MPa and 120° C. to produce laminated glass. In that manner, there was produced laminated glass of Examples and Comparative Examples having, as inserted, the laminate produced by sandwiching 6 IR reflection layers of cholesteric liquid crystal phase (liquid crystal layer 1) as formed by coating with 6 layers of coating liquids (R1) to (L6), between two interlayer films 3 and 3' thereinto.

<Evaluation of Laminated Glass>

(Heat Shielding Property: Change in Transmission Spectrum of Cholesteric Liquid Crystal Layer after Heating Process at the Time of Manufacturing Laminated Glass)

The transmission spectrum of the film-shaped sample in Examples and Comparative Examples and the glass-shaped sample in Examples and Comparative Examples were measured. Respectively, the wavelength width between both ends whose transmittance of the reflection peak became 30% in the vicinity of a wavelength of 1250 nm was read, the reflection bandwidth of the film shape was set to the reflection bandwidth (film shape), and the laminated glass shaped reflection bandwidth was set to reflection bandwidth (laminated glass shape). A change Δ of the reflection bandwidth of the transmission spectrum of the cholesteric liquid crystal layer after the heating process during manufacturing laminated glass was performed to obtain a laminated glass shape was calculated as follows.

Change Δ of reflection bandwidth=reflection bandwidth (laminated glass shape)−reflection bandwidth (film shape)

The evaluation criteria of the heat-resistant property was set as follows and the change Δ of the obtained reflection width was evaluated.

A: Change Δ of reflection bandwidth≥−10 nm
B: Change Δ of reflection bandwidth<−10 nm Obtained results were listed in Table 1 below.

<Manufacture and Evaluation of Laminated Glass in Reference Examples 1 and 2>

Using the film of Comparative Examples 1 and 2, laminated glass of Reference Examples 1 and 2 with a configuration of glass/liquid crystal film obtained by fixing cholesteric liquid crystal phase/glass was obtained in the same manner as that of Comparative Example 1 except that PVB as an interlayer film was not laminated without manufacturing a laminate.

In regard to the laminated glass of Reference Examples 1 and 2, evaluation results on the heat-resistant property which was performed in the same manner as that of the laminated glass of Examples and Comparative Examples were listed in Table 1 below.

Further, the evaluation of the cholesteric liquid crystal mixture of Reference Examples 1 and 2 in Table 1 below was the same evaluation of Comparative Examples 1 and 2.

TABLE 1

| | Composition of cholesteric liquid crystal mixture | | | | | | Evaluation of cholesteric liquid crystal mixture | | | Laminated glass |
|---|---|---|---|---|---|---|---|---|---|---|
| | Compound (A) | | Compound (B) | | Other polymerizable monomers | | | Crystal | | Heat-resistant property: Change in transmission spectrum of cholesteric liquid crystal layer after heating process at the time of manufacturing laminated glass |
| | Kind | Addition amount [parts by mass] | Kind | Addition amount [parts by mass] | Kind | Number of functional groups | Addition amount [parts by mass] | Precipitation of coating and drying of first layer | Reflection bandwidth of first layer | Presence of PVB interlayer film | |
| Comparative example 1 | Compound 1 | 80 | Compound 3 | 20 | None | — | — | A | A | Present | B |
| Comparative example 2 | Compound 1 | 65 | Compound 3 | 35 | None | — | — | A | A | Present | B |
| Comparative example 3 | Compound 1 | 100 | None | — | None | — | — | B | Standard | Present | A |
| Comparative example 4 | Compound 1 | 100 | None | — | Polymerizable monomer 1 | 6 | 1 | B | A | Present | A |
| Comparative example 5 | Compound 1 | 100 | None | — | Polymerizable monomer 2 | 4 | 1 | B | A | Present | A |
| Comparative example 6 | Compound 1 | 100 | None | — | Polymerizable monomer 3 | 3 | 1 | B | A | Present | A |
| Comparative example 7 | Compound 1 | 100 | None | — | Polymerizable monomer 4 | 2 | 1 | B | A | Present | A |
| Comparative Example 8 | Compound 1 | 100 | None | — | Polymerizable monomer 5 | 1 | 1 | B | A | Present | A |
| Comparative Example 9 | Compound 1 | 95 | Compound 4 | 5 | None | — | — | B | B | Present | A |
| Example 1 | Compound 1 | 80 | Compound 3 | 20 | Polymerizable monomer 1 | 6 | 1 | A | A | Present | A |
| Example 2 | Compound 1 | 65 | Compound 3 | 35 | Polymerizable monomer 2 | 4 | 1 | A | A | Present | A |
| Example 3 | Compound 1 | 80 | Compound 3 | 20 | Polymerizable monomer 2 | 4 | 1 | A | A | Present | A |
| Example 4 | Compound 1 | 80 | Compound 3 | 20 | Polymerizable monomer 3 | 3 | 1 | A | A | Present | A |
| Comparative Example 10 | Compound 1 | 80 | Compound 3 | 20 | Polymerizable monomer 4 | 2 | 1 | A | A | Present | B |
| Comparative Example 11 | Compound 1 | 80 | Compound 3 | 20 | Polymerizable monomer 5 | 1 | 1 | A | A | Present | B |
| Reference Example 1 | Compound 1 | 80 | Compound 3 | 20 | None | — | — | A | A | Not present | A |
| Reference Example 2 | Compound 1 | 65 | Compound 3 | 35 | None | — | — | A | A | Not present | A |

As listed in Table 1 above, from Examples 1 to 4, with the cholesteric liquid crystal mixture of the present invention, it was understood that the liquid crystal precipitation at the time of manufacturing a film could be suppressed, the characteristic reflection bandwidth of a film to be obtained was wide, and the change of the reflection bandwidth at the time of manufacturing laminated glass by laminating the liquid crystal film obtained by fixing the cholesteric liquid crystal phase of the film to be obtained together with the interlayer film could be suppressed.

On the other hand, with the cholesteric liquid crystal mixture of Comparative Examples 1 and 2 for which other polymerizable monomers not satisfying any one of the general formulae (Ia) and (Ib) were not used, it was understood that the change of the reflection bandwidth at the time of manufacturing laminated glass by laminating the liquid crystal film obtained by fixing the cholesteric liquid crystal phase of the film to be obtained together with the interlayer film was increased.

With the cholesteric liquid crystal mixture of Comparative Examples 3 and 8 for which the compound represented by the general formula (Ib) of the present invention was not used, it was understood that problems of crystal precipitation at the time of coating and drying was generated regardless of the presence or kind of addition of other polymerizable monomers.

With the cholesteric liquid crystal mixture of Comparative Example 9 for which the compound 4 not satisfying the general formula (Ib) of the present invention was used as a second liquid crystal compound, it was understood that problems of crystal precipitation at the time of coating and drying was generated and the reflection bandwidth was narrow.

With the cholesteric liquid crystal mixture of Comparative Examples 10 and 11 for which a difunctional or monofunctional polymerizable monomer was used as other polymerizable monomers not satisfying any one of the general formulae (Ia) and (Ib), it was understood that the change of the reflection bandwidth at the time of manufacturing laminated glass by laminating the liquid crystal film obtained by fixing the cholesteric liquid crystal phase of the film to be obtained together with the interlayer film was increased.

Further, from Reference Examples 1 and 2, in a case where the liquid crystal film obtained by fixing the cholesteric liquid crystal phase of the film of Comparative Examples 1 and 2 is not laminated with the interlayer film, since the heating process of performing lamination with the interlayer film was not included in the process of manufacturing laminated glass, it was understood that the problem of change in the reflection bandwidth of the transmission spectrum of the cholesteric liquid crystal layer was not generated even after the film shape was changed to the glass shape.

Example 11

Samples of laminated glass were produced here in the same manner as above, except that in manufacturing the film in Examples 1 to 4, only the coating liquid (R1) or (R2) was applied, and that in laminated glass manufacture, a laminate of glass/interlayer film/liquid crystal film with cholesteric liquid crystal fixed therein/$\lambda/2$ plate (Nippon Zeon's Zeonoa Film ZF14-100)/second liquid crystal film with cholesteric liquid crystal fixed therein/second interlayer film/glass was produced by lamination in that order as sandwiched between the glass plates.

The thus-produced laminated glass was evaluated for the performance thereof, and it was confirmed that the laminated glass could act as a good heat-shielding glass not having any significant defects or streaks.

Example 12

In Examples 1 to 4, after the heating and pressuring were completed, the resultant was left to be cooled for 3 hours in a state of maintaining the pressure, and the pressure was released when the temperature in the autoclave became 40° C. or lower. At this time, the pressure before releasing was 0.9 MPa.

In regard to the prepared laminated glass, when wrinkles of the polyvinyl butyral resin film and cracks on the film of the IR reflection layer were evaluated, it was understood that both were further improved than those of Examples 1 to 4. In addition, when the reflection unevenness of the laminated glass was visually confirmed, it was understood that both were further improved than those in Examples 1 to 4.

While the present invention has been described in detail and with reference to specific embodiments thereof, it will be apparent to one skilled in the art that various changes and modifications can be made therein without departing from the spirit and scope thereof.

The present disclosure relates to the subject matter contained in International Application No. PCT/JP2013/059096, filed Mar. 27, 2013, and Japanese Application No. 2012-073023, filed Mar. 28, 2012, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

REFERENCE SIGNS LIST

1 LIQUID CRYSTAL LAYER WITH CHOLESTERIC LIQUID CRYSTAL PHASE FIXED THEREIN (OPTIONALLY CONTAINING SUPPORT)
3 INTERLAYER FILM
3' SECOND INTERLAYER FILM
4, 4' GLASS PLATE
6 LAMINATED GLASS
15a IR REFLECTION LAYER OBTAINED BY FIXING CHOLESTERIC LIQUID CRYSTAL PHASE
15b IR REFLECTION LAYER OBTAINED BY FIXING CHOLESTERIC LIQUID CRYSTAL PHASE
16a IR REFLECTION LAYER OBTAINED BY FIXING CHOLESTERIC LIQUID CRYSTAL PHASE
16b IR REFLECTION LAYER OBTAINED BY FIXING CHOLESTERIC LIQUID CRYSTAL PHASE

What is claimed is:

1. A cholesteric liquid crystal mixture, containing a compound represented by the following general formula (Ia), a compound represented by the following general formula (Ib), and a tri- or higher functional polymerizable monomer:

$Z^1-Y^1-A^1-Y^3-M^1-Y^4-A^2-Y^2-Z^2$, General Formula (Ia)

$Z^3-Y^5-A^3-Y^7-M^2-P$ General Formula (Ib)

wherein $Z^1$, $Z^2$ and $Z^3$ each independently represent an acryloyl group or a methacryloyl group; $A^1$, $A^2$ and $A^3$ each independently represent an alkylene group having an atom-bonding chain length of 1 to 12; $M^1$ and $M^2$ each independently represent $(-T^1-Y^8)_n-T^2-$; n indicates 2, multiple $(-T^1-Y^8)$'s may be the same or different; $T^1$ and $T^2$ each independently represent a 1,4-phenylene group, provided that the 1,4-phenylene group may have a substituent; $Y^1$, $Y^2$, $Y^3$, $Y^4$, $Y^5$, $Y^7$ and $Y^8$ each independently represent —O—, —CO—, —O—CO—, —CO—O— or —O—CO—O—; and P represents an alkyl group having 1 to 15 carbon atoms.

2. The cholesteric liquid crystal mixture according to claim 1, wherein the tri- or higher polymerizable monomer is contained in an amount of 0.1% by mass to 10% by mass with respect to the total amount of the liquid crystal compound contained in the cholesteric liquid crystal mixture.

3. The cholesteric liquid crystal mixture according to claim 1, further containing a polymerization initiator.

4. The cholesteric liquid crystal mixture according to claim 1, wherein $T^1$ and $T^2$ in the general formulae (Ia) and (Ib) each independently represent a 1-4-phenylene group, provided that the 1,4-phenylene group may have an alkyl group or an alkoxy group as a substituent.

5. The cholesteric liquid crystal mixture according to claim 1, wherein:
the compound represented by the general formula (Ia) is a compound in which at least one 1,4-phenylene group of the 1,4-phenylene group represented by $T^1$ and $T^2$ has an alkyl group or an alkoxy group, and
the compound represented by the general formula (Ib) is a compound in which $T^1$ and $T^2$ each are an unsubstituted 1,4-phenylene group.

6. A film comprising a liquid crystal film obtained by fixing a cholesteric liquid crystal phase formed by polymerizing a cholesteric liquid crystal mixture, wherein:
the cholesteric liquid crystal mixture contains a compound represented by the following general formula (Ia), a compound represented by the following general formula (Ib), and a tri- or higher functional polymerizable monomer:

$Z^1-Y^1-A^1-Y^3-M^1-Y^4-A^2-Y^2-Z^2$, General Formula (Ia)

$Z^3-Y^5-A^3-Y^7-M^2-P$ General Formula (Ib)

wherein $Z^1$, $Z^2$ and $Z^3$ each independently represent an acryloyl group or a methacryloyl group; $A^1$, $A^2$ and $A^3$ each independently represent an alkylene group having an atom-bonding chain length of 1 to 12; $M^1$ and $M^2$ each independently represent $(-T^1-Y^8)_n-T^2-$; n indicates 2, multiple $(-T^1-Y^8)$'s may be the same or different; $T^1$ and $T^2$ each independently represent a 1,4-phenylene group, provided that the 1,4-phenylene group may have a substituent; $Y^1$, $Y^2$, $Y^3$, $Y^4$, $Y^5$, $Y^7$ and $Y^8$ each independently represent —O—, —CO—, —O—CO—, —CO—O— or —O—CO—O—; and P represents an alkyl group having 1 to 15 carbon atoms.

7. The film according to claim 6, further comprising two or more liquid crystal films obtained by fixing the cholesteric liquid crystal phase therein.

8. The film according to claim 6, wherein a selective reflection characteristic is exhibited in an IR wavelength region.

9. An IR reflection plate, comprising a film comprising a liquid crystal film obtained by fixing a cholesteric liquid crystal phase formed by polymerizing a cholesteric liquid crystal mixture, wherein:
the cholesteric liquid crystal mixture contains a compound represented by the following general formula (Ia), a compound represented by the following general formula (Ib), and a tri- or higher functional polymerizable monomer:

$Z^1-Y^1-A^1-Y^3-M^1-Y^4-A^2-Y^2-Z^2$, General Formula (Ia)

$Z^3-Y^5-A^3-Y^7-M^2-P$ General Formula (Ib)

wherein $Z^1$, $Z^2$ and $Z^3$ each independently represent an acryloyl group or a methacryloyl group; $A^1$, $A^2$ and $A^3$ each independently represent an alkylene group having an atom-bonding chain length of 1 to 12; $M^1$ and $M^2$ each independently represent $(-T^1-Y^8)_n-T^2-$; n indicates 2, multiple $(-T^1-Y^8)$'s may be the same or different; $T^1$ and $T^2$ each independently represent a 1,4-phenylene group, provided that the 1,4-phenylene group may have a substituent; $Y^1$, $Y^2$, $Y^3$, $Y^4$, $Y^5$, $Y^7$ and $Y^8$ each independently represent —O—, —CO—, —O—CO—, —CO—O— or —O—CO—O—; and P represents an alkyl group having 1 to 15 carbon atoms.

10. The IR reflection plate according to claim 9, comprising a λ/2 plate.

11. A laminate which is formed by the use of an IR reflection plate and includes an interlayer film on any one of an outmost layer of a liquid crystal film obtained by fixing the cholesteric liquid crystal phase of the IR reflection plate, wherein:
the IR reflection plate comprises a film which comprises a liquid crystal film obtained by fixing a cholesteric liquid crystal phase formed by polymerizing a cholesteric liquid crystal mixture, and
the cholesteric liquid crystal mixture contains a compound represented by the following general formula (Ia), a compound represented by the following general formula (Ib), and a tri- or higher functional polymerizable monomer:

$Z^1-Y^1-A^1-Y^3-M^1-Y^4-A^2-Y^2-Z^2$, General Formula (Ia)

$Z^3-Y^5-A^3-Y^7-M^2-P$ General Formula (Ib)

wherein $Z^1$, $Z^2$ and $Z^3$ each independently represent an acryloyl group or a methacryloyl group; $A^1$, $A^2$ and $A^3$ each independently represent an alyllene group having an atom-bonding chain length of 1 to 12; $M^1$ and $M^2$ each independently represent $(-T^1-Y^8)_n-T^2-$; n indicates 2, multiple $(-T^1-Y^8)$'s may be the same or different; $T^1$ and $T^2$ each independently represent a 1,4-phenylene group, provided that the 1,4-phenylene group may have a substituent; $Y^1$, $Y^2$, $Y^3$, $Y^4$, $Y^5$, $Y^7$ and $Y^8$ each independently represent —O—, —CO—, —O—CO—, —CO—O— or —O—CO—O—; and P represents an alkyl group having 1 to 15 carbon atoms.

12. The laminate according to claim 11, wherein the interlayer film is a resin interlayer film containing polyvinyl butyral as a main component.

13. A laminated glass comprising a laminate and at least two sheets of glass plates, wherein:
the laminate is inserted into the two sheets of glass,
the laminate is formed by the use of an IR reflection plate and includes an interlayer film on any one of an outmost layer of a liquid crystal film obtained by fixing the cholesteric liquid crystal phase of the IR reflection plate, the IR reflection plate comprises a film which comprises a liquid crystal film obtained by fixing a cholesteric liquid crystal phase formed by polymerizing a cholesteric liquid crystal mixture, and the cholesteric liquid crystal mixture contains a compound represented by the following general formula (Ia), a compound represented by the following general formula (Ib), and a tri- or higher functional polymerizable monomer:

$$Z^1-Y^1-A^1-Y^3-M^1-Y^4-A^2-Y^2-Z^2, \quad \text{General Formula (Ia)}$$

$$Z^3-Y^5-A^3-Y^7-M^2-P \quad \text{General Formula (Ib)}$$

wherein $Z^1$, $Z^2$ and $Z^3$ each independently represent an acryloyl group or a methacryloyl group; $A^1$, $A^2$ and $A^3$ each independently represent an alkylene group having an atom-bonding chain length of 1 to 12; $M^1$ and $M^2$ each independently represent $(-T^1-Y^8)_n-T^2-$; n indicates 2, multiple $(-T^1-Y^8)$'s may be the same or different; $T^1$ and $T^2$ each independently represent a 1,4-phenylene group, provided that the 1,4-phenylene group may have a substituent; $Y^1$, $Y^2$, $Y^3$, $Y^4$, $Y^5$, $Y^7$ and $Y^8$ each independently represent —O—, —CO—, —O—CO—, —CO—O— or —O—CO—O—; and P represents an alkyl group having 1 to 15 carbon atoms.

14. The laminated glass according to claim 13, wherein the laminated glass is used for a windshield for vehicles and glass for building materials.

* * * * *